United States Patent
Peco et al.

(10) Patent No.: US 10,826,751 B2
(45) Date of Patent: Nov. 3, 2020

(54) MANAGEMENT OF FUNCTIONAL INTERCONNECTIONS BETWEEN APPLICATION MODULES ON RESOURCE NODES IN A SOCIAL WEB

(71) Applicant: Telefonaktiebolaget L M Ericsson (publ), Stockholm (SE)

(72) Inventors: Farjola Peco, Solna (SE); Peter Björklund, Stockholm (SE); Joakim Formo, Åkersberga (SE); Marcus Gårdman, Skärholmen (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 769 days.

(21) Appl. No.: 14/220,951

(22) Filed: Mar. 20, 2014

(65) Prior Publication Data

US 2014/0258363 A1 Sep. 11, 2014

Related U.S. Application Data

(63) Continuation of application No. PCT/IB2012/002067, filed on Apr. 2, 2012, which is
(Continued)

(51) Int. Cl.
*H04W 4/70* (2018.01)
*H04L 12/24* (2006.01)
(Continued)

(52) U.S. Cl.
CPC ........ *H04L 41/022* (2013.01); *H04L 41/5064* (2013.01); *H04L 51/32* (2013.01); *H04W 4/08* (2013.01); *H04W 4/70* (2018.02)

(58) Field of Classification Search
CPC .................................................... H04L 41/022
See application file for complete search history.

(56) References Cited

U.S. PATENT DOCUMENTS

| 5,884,029 A | 3/1999 | Brush, II et al. |
| 6,237,006 B1 | 5/2001 | Weinberg et al. |
(Continued)

FOREIGN PATENT DOCUMENTS

| EP | 1646205 A1 | 4/2006 |
| JP | 2005-109746 A | 4/2005 |
(Continued)

OTHER PUBLICATIONS

UPNP Forum, UPNP Device Architecture 1.1, Oct. 15, 2008, pg. 1-136 (Year: 2008).*
(Continued)

*Primary Examiner* — Tonia L Dollinger
*Assistant Examiner* — Joseph M Cousins
(74) *Attorney, Agent, or Firm* — Sage Patent Group

(57) ABSTRACT

A resource node has application modules that are functionally interconnected by an application management proxy node to one another and/or to application modules of another resource node to provide combined functionality to a user. The resource node includes a plurality of the application modules and an application agent. Each of the application modules controls the resource node to provide corresponding defined functionality. The application agent communicates with the application management proxy node to establish functional interconnections between two or more of the application modules of the resource node and/or between at least one of the application modules of the resource node and at least one of the application modules of the other resource node. The application agent translates communication traffic to provide compatible communications between the application modules that are functionality interconnected. Related application management proxy nodes and methods are disclosed.

19 Claims, 38 Drawing Sheets

Related U.S. Application Data a continuation of application No. 13/246,281, filed on Sep. 27, 2011, now Pat. No. 9,237,062, which is a continuation of application No. 12/782,134, filed on May 18, 2010, now Pat. No. 9,491,181.

(60) Provisional application No. 61/290,387, filed on Dec. 28, 2009, provisional application No. 61/292,967, filed on Jan. 7, 2010.

(51) Int. Cl.
*H04L 12/58* (2006.01)
*H04W 4/08* (2009.01)

(56) References Cited

U.S. PATENT DOCUMENTS

| | | | |
|---|---|---|---|
| 8,443,091 | B2 | 5/2013 | Synnergren et al. |
| 2002/0187750 | A1 | 12/2002 | Majumdar |
| 2003/0014499 | A1 | 1/2003 | Mighdoll et al. |
| 2004/0192339 | A1 | 9/2004 | Wilson et al. |
| 2005/0015443 | A1 | 1/2005 | Levine et al. |
| 2005/0086297 | A1* | 4/2005 | Hinks ............... H04L 67/02 709/203 |
| 2005/0198290 | A1* | 9/2005 | Berkey ............... H04L 67/104 709/225 |
| 2005/0220139 | A1* | 10/2005 | Aholainen ........ H04L 29/06027 370/466 |
| 2006/0026305 | A1 | 2/2006 | Illowsky et al. |
| 2006/0123125 | A1* | 6/2006 | Weisman ............ G06F 9/4411 709/227 |
| 2006/0259604 | A1 | 11/2006 | Kotchavi et al. |
| 2007/0014268 | A1 | 1/2007 | Kim et al. |
| 2007/0162583 | A1* | 7/2007 | Takahashi ........... G06F 13/385 709/223 |
| 2007/0192299 | A1 | 8/2007 | Zuckerberg et al. |
| 2007/0237090 | A1* | 10/2007 | Kim ................... H04L 12/2803 370/252 |
| 2008/0034081 | A1* | 2/2008 | Marshall ............. G08C 17/02 709/223 |
| 2008/0114834 | A1 | 5/2008 | Miyazaki |
| 2008/0167937 | A1* | 7/2008 | Coughlin ............ G01C 21/20 705/7.16 |
| 2008/0172458 | A1* | 7/2008 | Middleton ........... G06Q 30/02 709/203 |
| 2008/0252527 | A1 | 10/2008 | Garcia |
| 2008/0256214 | A1 | 10/2008 | Halasz et al. |
| 2009/0083117 | A1 | 3/2009 | Svendsen et al. |
| 2009/0132698 | A1 | 5/2009 | Barnhill, Jr. |
| 2009/0210932 | A1* | 8/2009 | Balakrishnan ......... H04W 4/02 726/5 |
| 2009/0249429 | A1 | 10/2009 | Sullivan et al. |
| 2010/0011361 | A1 | 1/2010 | Millmore et al. |
| 2010/0030881 | A1* | 2/2010 | Moreira Sa de Souza ........... H04L 29/08846 709/223 |
| 2010/0057827 | A1* | 3/2010 | Tawfik ................ H04L 67/16 709/201 |
| 2010/0132049 | A1 | 5/2010 | Vernal et al. |
| 2010/0146146 | A1 | 6/2010 | Welts et al. |
| 2010/0161818 | A1* | 6/2010 | Capuozzo ........... H04L 12/2812 709/229 |
| 2010/0191829 | A1 | 7/2010 | Cagenius |
| 2010/0274815 | A1 | 10/2010 | Vanasco |
| 2010/0280860 | A1 | 11/2010 | Iskold et al. |
| 2011/0090529 | A1 | 4/2011 | Hertling |
| 2011/0113149 | A1 | 5/2011 | Kaal |
| 2011/0145719 | A1 | 6/2011 | Chen et al. |
| 2011/0161478 | A1 | 6/2011 | Formo et al. |
| 2011/0191417 | A1 | 8/2011 | Rathod |
| 2011/0252099 | A1 | 10/2011 | Pattekar et al. |
| 2012/0011233 | A1 | 1/2012 | Dixon et al. |

FOREIGN PATENT DOCUMENTS

| | | | |
|---|---|---|---|
| WO | WO2011/112683 | A1 | 9/2011 |
| WO | WO 2012/093955 | A1 | 7/2012 |

OTHER PUBLICATIONS

Salling Software [online] Salling Media Sync [online] retrieved Jan. 26, 2011 from Internet http://www.salling.com/.

Simplify Media [online] retrieved Jan. 26, 2011 from Internet http://www.simplifymedia.com/.

Botanicalls, [online] retrieved Jan. 26, 2011 from Internet http://www.botanicalls.com/.

Waldner, Jean-Baptiste (2007), Inventer l'Ordinateur du XXIeme Siecle, London: Hermes Science. p. 254 ISBN 274621560; [online] retrieved May 4, 2011 from Internet http://en.wikipedia.org/wiki/Internet_of_things.

International Search Report and Written Opinion of the International Searching Authority, PCT/IB2011/002259, dated Apr. 3, 2012.

EPO: Notice from the European Patent Office dated Oct. 1, 2007concerning business methods; Official Journal of the European Patent Office, vol. 30, No. 11, Nov. 1, 2007, pp. 592-593, XP007905525.

International Search Report and Written Opinion of the International Searching Authority, PCT Application No. PCT/IB2012/002067, dated May 29, 2013.

International Preliminary Report on Patentability, PCT Application No. PCT/IB2012/002067, dated Sep. 27, 2013.

Kovatsch, "Demo Abstract: Human-CoAP Interaction with Copper", Conference Proceedings Article, *2011 International Conference on Distributed Computing in Sensor Systems and Workshops (DCOSS)*, Jun. 27, 2011, 2 pp.

Oliveira et al., "End-to-End Connectivity IPv6 over Wireless Sensor Networks", *2011 Third International Conference on Ubiquitous and Future Networks (ICUFN)*, Jun. 15, 2011, 6 pp.

De Poorter et al., "Enabling direct connectivity between heterogeneous objects in the Internet of things through a network service oriented architecture", retrieved Aug. 2011 from http://link.springer.com/article/10.1186%2F1687-1499-2011-61#, 11 pp.

European Search Report Corresponding to Application No. 12836316.5; dated May 26, 2015, 5 pages.

Japanese Notice of Rejection Corresponding to Patent Application No. 2014-532483, dated Aug. 4, 2015, 5 pages.

Apple, Apple—Airport Express—Features—Music Sharing, [online] retrieved Jan. 26, 2011 from Internet http://www.apple.com/airportexpress/features/airplay.html.

Apple, Apple—Run or workout with Nike + iPod, [online] retrieved Jan. 23, 2011 from Internet http://www.apple.com/ipod/nike/.

\* cited by examiner

FIG. 16

SOCIAL WEB OF THINGS

My Profile    Alerts (0)    Notifications (6)    Requests (0)

(i) Rental Car commented...
- about 18 hours ago
» "Dear Ms Ericsson, I just want to let you know that if you introduce me to Mediaserver and ThePhone you could stream all your movies and music from them to my speakers and screens and also set up for handsfree calling. If you also introduce me to MyMaps and MyNavigator you could access your stored routes and places. You can introduce us here, and we would then be friends until I am returned to Quick Rentals.

[ Add All 4... ]   [ Add some... ]

" ⟵ 2400

(i) Rental Car commented...
- about 18 hours ago
» "Dear Ms Ericsson, I am now ready to pick up at Quick Rentals, Stockholm Centralstation, Stockholm, Sweden. Location

" ⟵ 2402

(i) Calendar commented...
about 18 hours ago
» "How about Friday, February 25th, 2011? Looks free according to me."

(i) Car commented...
about 18 hours ago
» "Ok, so should I book a service at Johnny's Auto Friday Feb 25, 2011 at 8.00AM?

[ Yes, book it ]   [ No, thanks ]

"

FIG. 24 ized that if there is any conflict between a definition in this specification and the incorporated references, the specification will control.

MANAGEMENT OF FUNCTIONAL INTERCONNECTIONS BETWEEN APPLICATION MODULES ON RESOURCE NODES IN A SOCIAL WEB

RELATED APPLICATIONS

This application is a continuation of PCT International Application No. PCT/IB2012/002067, filed Apr. 2, 2012, which itself is a continuation-in-part of U.S. patent application Ser. No. 14/246,281 filed on Sep. 27, 2011, which itself is a continuation-in-part of U.S. patent application Ser. No. 12/782,134 filed on May 18, 2010, which itself claims the benefit of U.S. Provisional Patent Application Ser. No. 61/290,387 filed on Dec. 28, 2009, and 61/292,967 filed on Jan. 7, 2010, the disclosures of all of which are incorporated herein by reference.

TECHNICAL FIELD

The present invention relates generally to networking of resources and, more particularly, to the management of networked resources based on social mapping principles.

BACKGROUND

The Internet continues to evolve to include a "physical internet" consisting of not only computers, but devices, other objects and environments with embedded data-, computation-, sensor-, location-, and communication-interaction capabilities. This potential evolution is often referred to using terminology such as "The Internet of Things", "Machine to Machine Communications", "Ubiquitous Computing", "Pervasive Computing" or "Ambient Intelligence". It has been estimated that every person is surrounded by somewhere between 1000 and 5000 intelligent objects and a global Internet of Things may in a few years consist of 50 to 100,000 billion objects whose location and status will have to be continuously monitored or updated. While the concept of such an Internet of Things may seem simple, its implementation will be far more difficult.

For example, many of today's products which link or connect networked devices are ad-hoc solutions that enable specific limited functionalities or services. Examples include file sharing and remote access software that run on a device or computer and enables remote control and/or makes data or service accessible within a Wide Area Network (WAN), Wireless (W) LAN and/or PAN. Examples of such products include Salling Clicker, Simplify Media, Apple's Airtunes and iTunes Remote for the iPhone, etc. Another category of relevant products includes devices that collect and transmit data, such as products like the wireless pedometer "Nike+ Apple" that measure parameters associated with a person's running, and Botanicalls, which is a sensor that communicates the level of humidity of the soil in a flowerpot to the web.

However, none of today's solutions for networked object interconnectivity provide holistic and unified interaction with a plurality of networked objects, environments, media and/or services based on the interrelations between them. Consequently there is no solution today that provides an intuitive way of understanding the contexts, relationships, ownership, compatibility, history, metadata, status, and dependencies of large numbers of objects that also may or may not be physically present. In addition there is no solution today that successfully supports the users' weak conceptual understanding of digital networks as such, i.e. the mental model of possible interactions and simultaneous interconnectivities within a digital network consisting of numerous devices and/or services.

Accordingly, it would be desirable to provide systems, methods, devices and software associated with the management and interconnectivity of networked resource nodes which overcomes the afore-described challenges by addressing, among other things, management of their associations, data flows, and responses to triggering events.

SUMMARY

The following example embodiments provide a number of advantages and benefits relative to existing resource management software, devices, systems and methods including, for example, using social mapping principles and other operations to functionally interconnect application modules to provide enhanced combined functionality, and streamline interactions between users and the application modules, as well as between the application modules themselves. It will be appreciated by those skilled in the art, however, that the claims are not limited to those embodiments which produce any or all of these advantages or benefits and that other advantages and benefits may be realized depending upon the particular implementation.

An example embodiment is directed to a resource node having application modules that are functionally interconnected by an application management proxy node to one another and/or to application modules of another resource node to provide combined functionality to a user. The resource node includes a plurality of the application modules and an application agent. Each of the application modules is configured to control the resource node to provide corresponding defined functionality. The application agent is configured to communicate with the application management proxy node to establish functional interconnections between two or more of the application modules of the resource node and/or between at least one of the application modules of the resource node and at least one of the application modules of the other resource node. The application agent is further configured to translate communication traffic to provide compatible communications between the application modules that are functionality interconnected.

Another example embodiment is directed to an application management proxy node that manages communications between application modules on a plurality of resource nodes that are connected to at least one network. The application management proxy node comprises an identity mapping module and a protocol translation module. The identity mapping module that maintains information that identifies the application modules, identifies functional capabilities of the application modules, and identifies functional interconnections established between identified ones of the application modules. The protocol translation module is configured to receive communication traffic from a source one of the application modules. The protocol translation module also identifies, using the information maintained by the identity mapping module, one or more destination ones of the application modules having functional interconnections to the source application module. The protocol translation module translates the communication traffic to provide translated traffic that is compatible for use by the one or more destination ones of the application modules, and outputs the translated traffic to the one or more destination ones of the application modules.

Another example embodiment is directed to a method by an application management proxy node that manages interconnections between application modules on a plurality of resource nodes that are connected to at least one network. The method comprises maintaining information that identifies the application modules, identifies functional capabilities of the application modules, and identifies functional interconnections established between identified ones of the application modules. Communication traffic is received from a source one of the application modules. The information maintained by the identity mapping module is used to identify one or more destination ones of the application modules having functional interconnections to the source application module. The communication traffic is translated to provide translated traffic that is compatible for use by the one or more destination ones of the application module. The translated traffic is communicated to the one or more destination ones of the application modules.

Other resource nodes, application management proxy nodes, and methods according to embodiments of the invention will be or become apparent to one with skill in the art upon review of the following drawings and detailed description. It is intended that all such additional resource nodes, application management proxy nodes, and methods be included within this description, be within the scope of the present invention, and be protected by the accompanying claims. Moreover, it is intended that all embodiments disclosed herein can be implemented separately or combined in any way and/or combination.

BRIEF DESCRIPTION OF THE DRAWINGS

The accompanying drawings, which are incorporated in and constitute a part of the specification, illustrate one or more embodiments and, together with the description, explain these embodiments. In the drawings:

FIGS. 16-18 illustrate example information that can be displayed to a user to authorize and establish data flows between resource nodes according to example embodiments;

FIGS. 22-24 illustrate examples of information that can be displayed to a user to manage resource nodes and data flows therebetween using friendship requests according to example embodiments;

DETAILED DESCRIPTION

Figure 1:
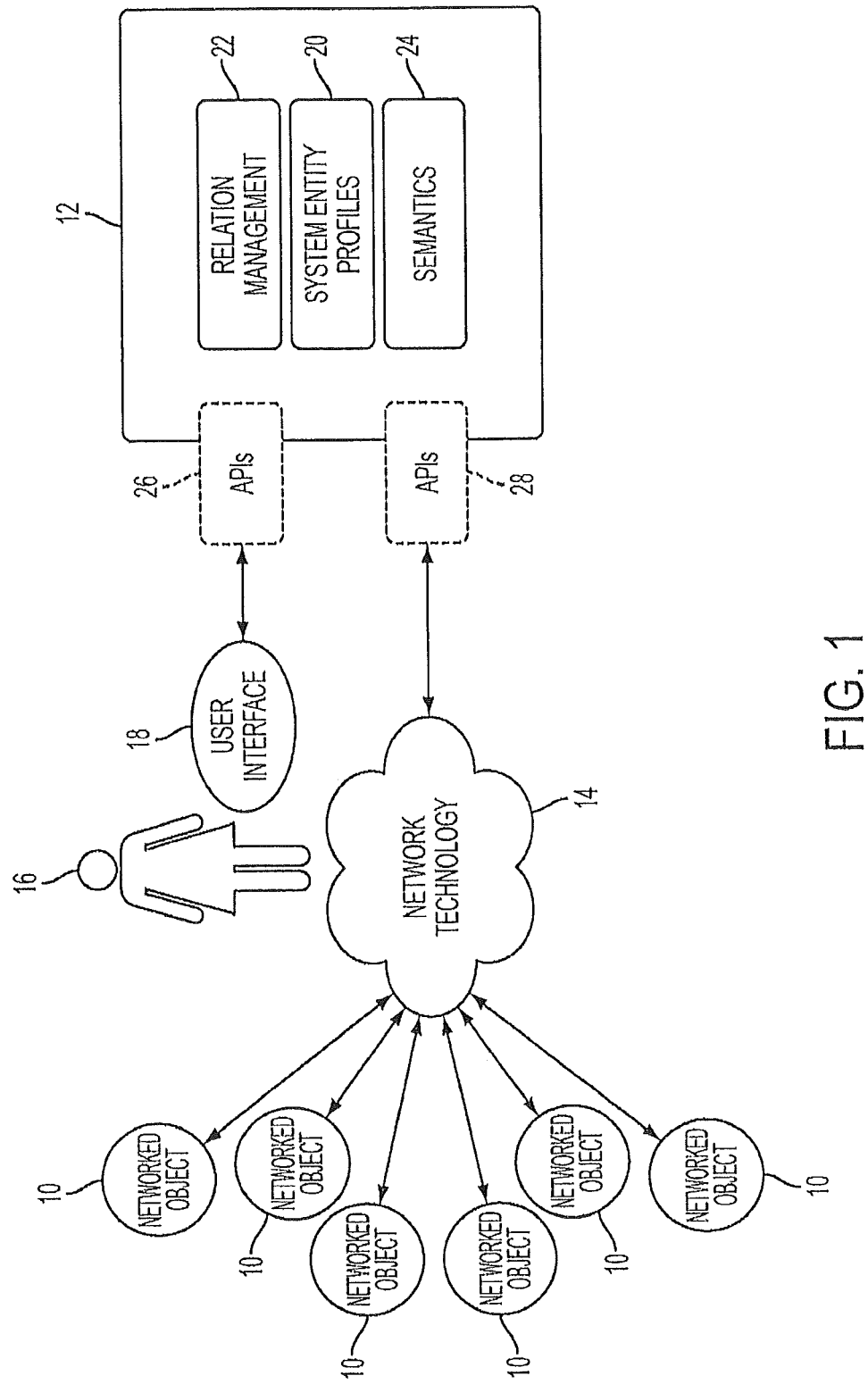
FIG. 1 illustrates a plurality of networked objects managed by a system according to an example embodiment.

The following detailed description of the example embodiments refers to the accompanying drawings. The same reference numbers in different drawings identify the same or similar elements. Also, the following detailed description does not limit the invention. Instead, the scope of the invention is defined by the appended claims.

According to example embodiments, systems, methods, devices and software (computer programs) for management of, and interaction with, networked objects are based on social mapping principles. Such example embodiments provide for holistic management of a plurality of networked objects including, for example, electronic devices, sensors, computers, services and users. Moreover, example embodiments provide a presentation layer where each networked object is represented by a unique and identifiable profile that contains information about each object's system characteristics. By making the relationship between networked objects, as well as relationships between networked objects and users, analogous to, e.g., social mapping principles like "friendship" (i.e. a notion of trust or ownership relationship and access control), example embodiments make objects' relations intuitive to understand for the users. Example embodiments utilize a recognizable resemblance to a social network in order to enable users to form a holistic mental model of potentially large numbers of networked nodes with simultaneous interconnections and interrelations with each other.

Prior to discussing detailed signaling mechanisms which facilitate such networks of objects according to example embodiments, a high level architectural view of the system followed by several examples will be described with respect to FIGS. 1 and 2 to provide more context for the reader regarding the resulting systems as they can be experienced by users. Starting with FIG. 1, the system architecture at a high level according to example embodiments is illustrated. Therein, a plurality of networked objects 10 is connected to the system 12 via a variety of network technologies 14, e.g., the Internet, a WAN, etc. The users 16 can access the services provided by the system 12 via user interfaces 18 whose implementation which will vary depending upon, for example, the context and the end user device on which the particular user interface 18 is running, e.g., mobile devices, computers, laptops, televisions or other devices.

The system 12 which manages the networked objects 10 can, for example, be implemented, at least in part, as server-based software. Persons that are using the system 12, i.e., the users 16, are represented and identified as entities in the system 12 by unique user profiles in the system. The networked objects 10 can also be represented and identified in the system 12 by unique profiles. Networked objects 10 include, but are not limited to: consumer electronics, digitally tagged objects, computer devices, mobiles, sensors, buildings, vehicles or even companies, brands, services and physical locations. Both the profiles that represent users 16 and network objects 10 in the system 12 are jointly referred to herein as system entity profiles 20.

Data associated with the plurality of networked objects 10 and users 16 is received by the system 12. The system 12 creates system entity profiles 20 for each networked object 10 and user 16. The system entity profiles 20 may include, but are not limited to, information about name, technical specifications, manufacturer, capability, location, history and other metadata associated with the respective networked object 10 or user 16. According to example embodiments it is also possible to aggregate multiple networked objects under a common profile, i.e., not all objects necessarily have their own individually unique IDs or system entity profiles 20 in the system. For example, if a user connects 20 location sensors at home this group of location sensors may be identified in the system as one home location sensor. This aggregation can be performed, for example, at the GW to the system 12 or in the backend system.

The system 12 also includes a relation management function 22 which coordinates the interactions between the networked objects 10 by applying social management principles, e.g., using the afore-described friendship analog. The system 12 issues queries, described in more detail below, in order to establish relationships between system entities 10 and 16 by, for example, sending a system entity's profile 20 to a potentially relevant system entity based on the profile data and network access credentials of the receiving system entity. A relationship is established by the relation management function 22 based on the confirmation from the user(s) 16 or the system entity itself, i.e. multiple system entities can establish relationships with a single system entity. System entities can share temporal and permanent relationships with other system entities. Many separated and simultaneous network sites can exist, and the information and communication can be, according to example embodiments, limited to a specific group of system entities defined by their relationship to each other. There can also be temporal or permanent connections between system entities belonging to different network sites.

The semantics function 24 includes functionality that allows, e.g., device manufacturers, to establish devices with a brand-dependent semantic interaction language where applicable. For example, a Sony TV could communicate in 'Sony language' (e.g. 'like' other Sony devices or content, relate to Sony PS games or Sony brand etc.) Other semantic layers are also possible, see e.g., the toaster or solar panel examples in the user interface screen of FIG. 3 described below. Semantics can also be user-defined (e.g., reflecting a certain level of maturity in operating a device translating into complexity of the user interface). Additional semantic layers could also include, for example, types of jargon or even slang. The semantics function 24 can also provide a natural language translator/interpreter/generator, i.e., a mechanism which translates machine signals or languages into languages which are more meaningful to humans.

The system 12 may interface with its objects 10 and users 16 through a set of Application Programming Interfaces (APIs) 26 and 28 in order to establish relationships using social mapping principles and also to exercise those relationships in performance of various task requests. Different user interaction paradigms can be used in order to manage the query/confirmation procedure. A user 16 could for example confirm a relationship query transmitted to it by the relation management function 22 of the system 12 by pressing a button in a graphical user interface, or both the query and confirmation of a relationship between two system entities could be done in one operation by physically bringing together the objects, using Near Field Communication (NFC) or a similar mechanism.

To better understand the usefulness of networking objects and users using social mapping principles according to an example embodiments, consider the following usage scenario involving remote control of a television. Assuming that both the user 16 and a TV (one of the networked objects 10) have already been set up with the system 12 and are therefore represented by system entities with corresponding system entity profiles 20, the user 16 can for example send a task request, for example via user interface 18 and API 26 to the TV's system entity (operative within system 12) requesting the system 12 to record a certain TV program. The system entity in system 12 associated with the TV will accept and acknowledge this instruction, even if the TV is in fact not capable of recording anything itself if it has a predetermined type of relationship, e.g., is friends with, another networked object 10 which can perform the requested service.

For example, suppose that the system entity of the TV has a friendship relationship with the system entity of a video recorder. In this case, the system entity of the TV can take responsibility for the request from the user 16 and relay the command to the system entity of the video recorder, which could, for example, be a representation of a physical device, a software functionality in the system, or a service provided via the network. The networked object video recorder 10 will actually execute the job, i.e., which is essentially 'subcontracted' to it by the TV's system entity in system 12, and the user 16 will receive a confirmation from the TV's system entity (again via API 26 and user interface 18) that the requested task will be performed, and later on that it has been successfully completed.

As another example, consider an example embodiment wherein a user buys a network attached storage device (NAS) for his or her home media repository. When the NAS is connected to the user's home LAN, the NAS is discovered via a predetermined procedure (e.g., Universal Plug and Play (UPnP), Bonjour, Digital Living Room Network Alliance (DLNA) or a similar mechanism) and a notification about the new device is delivered to the system 12. The system 12 creates a system entity profile 20 for the new device and sends a request to the user's application interface 18, e.g., on his or her mobile phone, to accept (or reject) the connection of the system entity of the new device. Once the user confirms that the NAS is permitted to join the group of system entities present in his or her 'Social Web of Things', other devices (such as media players) that are already part of this friendship related group and have the capabilities to establish a service relationship with this device, can use the NAS as media source.

Figure 2:
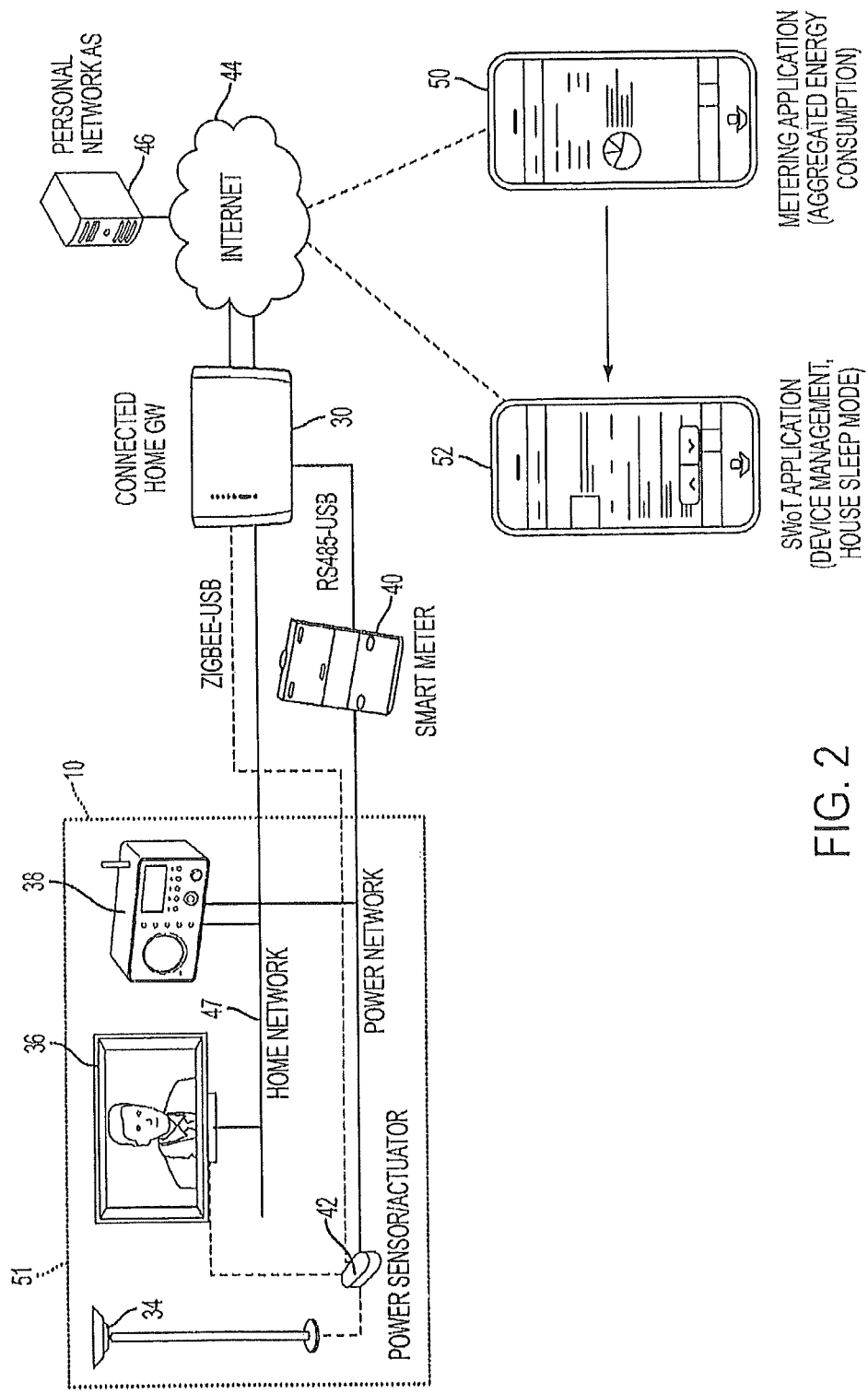
FIG. 2 depicts another plurality of network objects being managed in accordance with another example embodiment.

Yet another example is illustrated in FIG. 2. Therein, the system 12 is, at least in part, implemented as a home gateway (GW) 30. In this example, the networked objects 10 include various power consuming devices including, e.g., a light, 34, a television 36, and a radio 38 which are connected both to the GW 30 and to a power network. In this context, a Personal Network (PN) can be considered to include a set of networked objects with which a particular user (or group of users, e.g., a family) has a relationship. A power meter 40 provides the GW 30 with information about power consumption on the network and one or more power sensor/actuators 42 can be used to monitor and/or control the networked objects 10.

The GW 30 is also connected to an outside network, e.g., the Internet 44, which enables it to communicate with an application server (AS) 46. This AS 46 can, for example, perform other functions of the system 12 described above if those functions are not performed in the GW 30. Alternatively, or additionally, AS 46 can perform other functions that are available to the owner/user associated with the network 47. Various external applications can also interface with the system via GW 30. For example, a metering application can be running on a user's device 50 to monitor and display the aggregated energy consumption associated with the devices at his or her home 51. Alternatively, or additionally, the user 16 can manage the devices 34, 36 and 38 via an application running on his or her mobile phone 52. More details associated with an example gateway 30 and AS 46 which can be used to implement the example embodiment of FIG. 2 are described below with respect to FIG. 6.

Figure 3:
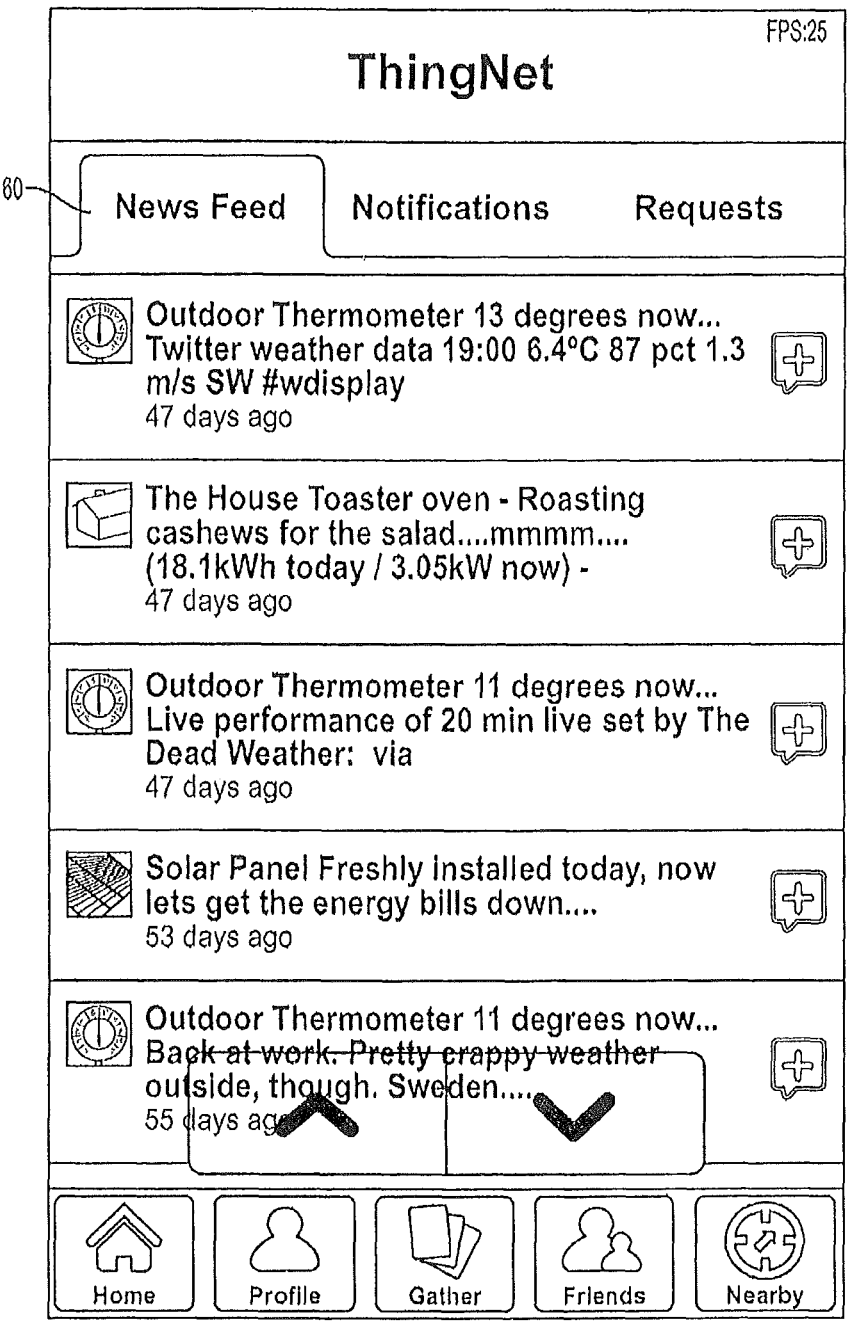
FIG. 3 shows an example user interface which can be used in accordance with an example embodiment.

A more detailed, yet purely illustrative user interface 18 which can, for example, operate on a mobile phone or other end user terminal device and permit a user 16 to interact with the system 12 is shown in FIG. 3. Therein, a plurality of rows of items associated with a currently in focus News Feed tab 60 of the user interface 18 are shown, each of which provides, for example, information provided from a networked object 10. Other features (in FIG. 3 indicated as tabs), not currently in focus, can provide the user 16 with information relating to notifications from the system 12 related to networked objects 10 and requests, e.g., requests by a device to become a "friend" to the user and join the system entities associated with that user 16. Along the bottom of this example user interface 18 are a number of selectable user interface elements including, for example, a "Home" element which returns the user to the presently viewed screen, a "Profile" element which enables the user 16 to access the system entity profiles 20, a "Gather" element which provides a mechanism for the user to interact with information aggregated from various networked objects, e.g., the total power consumption of devices in a household or the aggregated media base of a user from various media servers, a "Friends" element which, when actuated, lists the networked objects that have already established friend relationships with this user and a "Nearby" element which when actuated, displays information regarding networked objects that are near to the user's mobile phone or terminal device and their relationship to the user.

As mentioned previously, the system 12 according to example embodiments can establish different hierarchical levels of relationship between the system entities which the system 12 manages using social mapping principles so as to be more user friendly and to make it easier for a user 16 to relate to the managed network objects 10. For example, a top level relation could be "the owner"; a relational description in the system when a person owns an object. A networked object 10 could have several owners. In some cases, a system entity associated with one networked object 10 or user 16 (i.e., a device or a persona) may need to have administrative rights, and be in control of access or use of, another networked object 10, even if the system entity is not the owner of that networked object. In this case, example embodiments provide a relation designation referred to herein as "best friend", i.e., someone that is closer, has better access and more privileges than the level below; i.e., "friends". Networked objects may also be present in a system which do not have any of these preferred relationships with the users or other networked objects and are herein referred to as "strangers". Moreover, it will be appreciated that although three different levels of preferred relationships for networked objects are described above, that different implementations of these example embodiments may use more or fewer such levels to implement social mapping principles for networked object management. A summary of example relational descriptors and their associated functional characteristics is provided below in Table 1.

TABLE 1

| Relational Descriptor | Characteristics |
| --- | --- |
| Owner | The user or networked object which possesses this relational descriptor in a stored system profile relative to another networked object has administrative rights to configure that networked object as well as best friend access rights to that networked object. |
| Best Friend | The user or networked object which possesses this relational descriptor in a stored system |

TABLE 1-continued

| Relational Descriptor | Characteristics |
| --- | --- |
| | profile relative to another networked object has the highest level of access rights (but no administrative rights) with respect to that networked object. For example, a user or networked object which is best friends with a particular networked object can expect to receive higher bandwidth/QoS priority for their task requests than other users or networked objects which have a less favored relationship, e.g., friends or strangers |
| Friend | The user or networked object which possesses this relational descriptor in a stored system profile relative to another networked object has the second highest level of access rights with respect to that networked object. For example, as compared to users or networked objects which are considered to be strangers toward a given networked object, friends can accept task requests from other friends without requiring an owner or user to first authorize the request. Friends will have lower priority than best friends in terms of bandwidth and QoS with respect to task requests. |
| Stranger | The user or networked object which possesses this relational descriptor in a stored system profile relative to another networked object has no established relationship with that networked object. Tasks requests from a stranger may need to be authorized by an owner or user, or may be rejected outright. |

Relation management function 22 of system 12 establishes and manages these different levels of relationship between networked objects 10 and users 16. For example, networked objects 10 and users 16 (or networked objects 10 and other networked objects 10) which are designated as friends are interconnected and have reciprocal access to each other's information/data/functionality. Devices which are friends are set by the system 12 to help each other, execute requested tasks for each other and inform each other about their status, but according to example embodiments they cannot administer each other. A 'friend' relation can have a temporal quality (e.g., rental car, hotel room, etc.) or may be permanent. The social mapping paradigm described above can be further extended to include additional levels which are easily distinguished by users, for example, 'friends of friends' or peripheral 'acquaintances'. Networked devices which have this latter relationship relative to other devices or users are not, according to some example embodiments, directly connected with those other devices or users, but could, for example, be present in the form of their functionality or service they provide. The value of such relations as they are used in systems and methods which manage networked objects using social mapping principles according to example embodiments is explained in more detail below.

Any system entity associated with system 12 can be aware of functionality provided by networked objects 10 with whom it has a predetermined relationship or level of friendship, e.g., the functionality of networked objects 10 which is managed by that system entity's best friends' friends. Consider the previously described example with the TV and the video recorder (e.g., VCR), in a scenario where the TV relays the task to the VCR, but the VCR for some reason was unavailable or incapable of executing the requested task (e.g., recording a TV program). In this case, the TV (or more precisely the system entity in system 12 which corresponds to the TV) may be aware of other options for performing the requested task, e.g., other networked nodes that have the needed capability but with which it may or may not have a direct friend relationship. If those other options are not directly available to the TV, it may be possible that such functionality could be made available to the TV utilizing the friendship relations of others to ask for a specific favor. For example, if the TV's owner/best friend (e.g., user/human 16 or networked object 10) has a friend that is connected to a system entity that can provide the functionality needed, the system 12 can send a message to that system entity requesting that, e.g., the requested program be recorded and stored.

To develop the latter example scenario further, suppose that the TV (networked object 10) and/or its corresponding system entity in system 12 is aware that a friend (i.e., a person, in another household) of its owner (and/or best friend) have the needed functionality in his or her network. Then, the TV could be set to ask its owner if it is permitted to contact the owner's friend to ask for the needed favor (e.g., recording and storing a specific TV program). If the TV's owner's friend agrees to this, perhaps even based on predetermined criteria like remaining/maximum storage space and time, a device that is able execute the requested functionality could make this functionality available to the TV. Moreover, even if the TV in network A is not a friend of the recording device in network B (e.g., these two networked objects may not even 'see' each other through the network, but instead only transmit/request signals associated with the favor that is requested/provided) it may still be able to relay the task of recording of the TV program to the recording device in network B, possibly upon authorization from a system entity having a sufficiently high friendship relation with that recording device.

In order to provide the underlying signaling, logic and lower level architecture needed to accomplish these various scenarios which use social mapping principles applied to managed networked objects, a personal networking (PN) architecture can be used as will now be described with respect to FIGS. 4-6 below. However it will be appreciated by those skilled in the art that other types of lower level architecture than those described below could be used instead to accomplish the higher level functionality described above in accordance with FIGS. 1-3. According to these example embodiments, a PN architecture shown generally in FIG. 4 connects consumer devices (sometimes called Personal Network Entities, PNEs, herein or networked objects 10 as described above) that reside in a local network; through gateway devices (PNE Cluster Gateways) to server-side enablers (Personal Network Application Server, PNAS) and from there optionally to $3^{rd}$ Party Service and Content Providers. Note, however, that the PNE cluster gateways can be implemented as physical, standalone nodes or, alternatively, as logical functions which are physically implemented on one or more of the networked objects themselves. In the latter case, networked objects may not need to communicate via GW devices per se.

Therein, the cluster layer 80 is the lowest layer, where services are not under control of the PN system according to this example embodiment. A PNE Cluster, e.g., cluster 82, includes a set of devices and a PNE Cluster Gateway (e.g., as shown in FIG. 2) where the gateway communicates with the devices locally. A PNE Cluster 82 also includes the services that are hosted by the devices and the PNE cluster gateway, e.g., gateway 30 in FIG. 2. Each PNE Cluster 82 is assumed, according to this example embodiment, to communicate over a gateway and is hence identifiable and addressable via this gateway. A PNE Cluster Gateway communicates with the PNAS over wide-area networks and with devices within the PN Cluster 82 over local access networks. A PNE device or networked object 10 may be part of two or more PNE Clusters 82. A service in this cluster layer 80 may be provided in a non-personalized way, as for example a DLNA service including services provided locally by a device and services provided by a 3$^{rd}$ Party. Services in this layer are directly accessible from the PNE Cluster Gateway.

Figure 4:
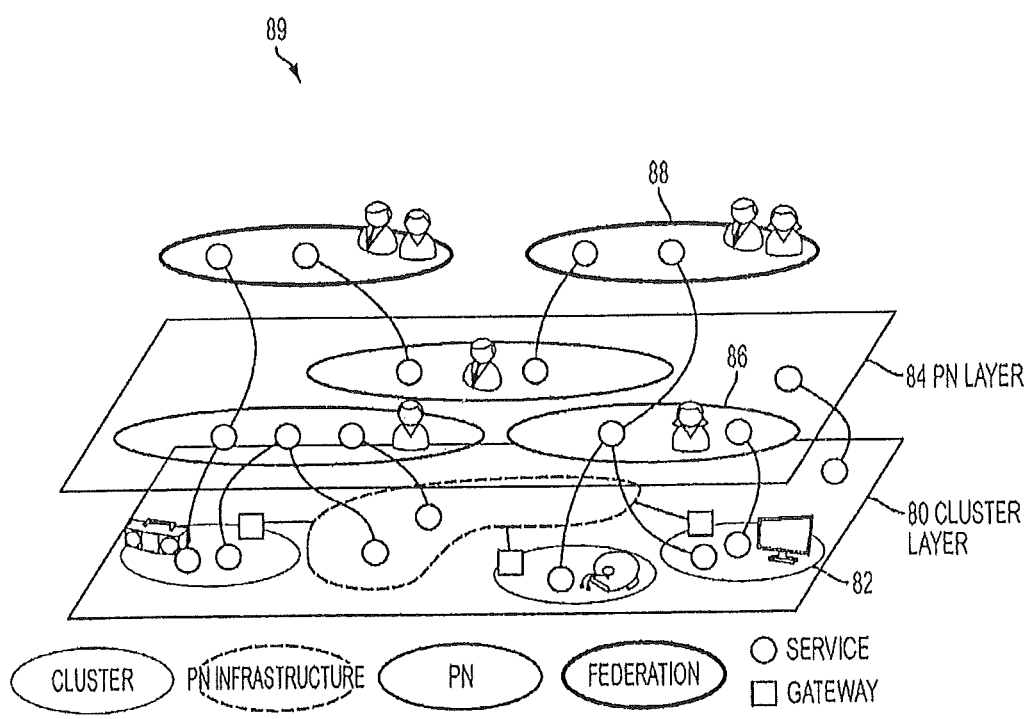
FIG. 4 illustrates an example layered architecture which can be used in accordance with an example embodiment.

Moving up in the hierarchy of layers shown in FIG. 4, the PN Layer 84 manages services that are under control of the PN system. According to this example embodiment, the PN system is responsible primarily for device and service management in PNs, management of users and association to PNs, authentication and authorization of a service requester, filtering on the context information exposure, and management of watchers on the events in PNs. A Personal Network (PN) 86 can be defined as an overlay network consisting of one or multiple PNE Clusters 82. A PN 86 is assigned to a single PN user who is called the PN owner in this example embodiment. A PN 86 enables the owner to consume a service within the PN regardless of the cluster in which the service exists, e.g., as described above using friendship relations. The PN owner may consume a service provided by a 3$^{rd}$ party or by other PNs by a device in the PN. PN 86 also enables the owner to expose the devices and services within the PN to 3$^{rd}$ party Service Providers and consumers in a controlled way, managing for example access restriction, privacy protection and service abstraction from the devices, e.g., by using the social mapping conventions described above with respect to FIGS. 1-3. A service in this PN layer 84 may access context information aggregated within the PN, for example for service personalization. The PN architecture assumes that each device, service, PNE cluster, and the PN is identifiable and addressable.

Services from different PNs may form an overlay service network called a PN federation 88. A PN federation 88 facilitates sharing of devices and services among multiple PNs 86, while privacy and security can be maintained across the whole PN federation 88. Thus, the PN Federation Layer 89 provides a mechanism for grouping PN services and service requesters under a single federation policy. Each PN 86 taking part in a PN Federation 88 can have its own policies to control what devices and services in the PN are made available to the other PNs in the PN Federation. In other words the set of devices and services available in a PN Federation is not always equal to the set of all devices and services in the participating PNs.

Figure 5:
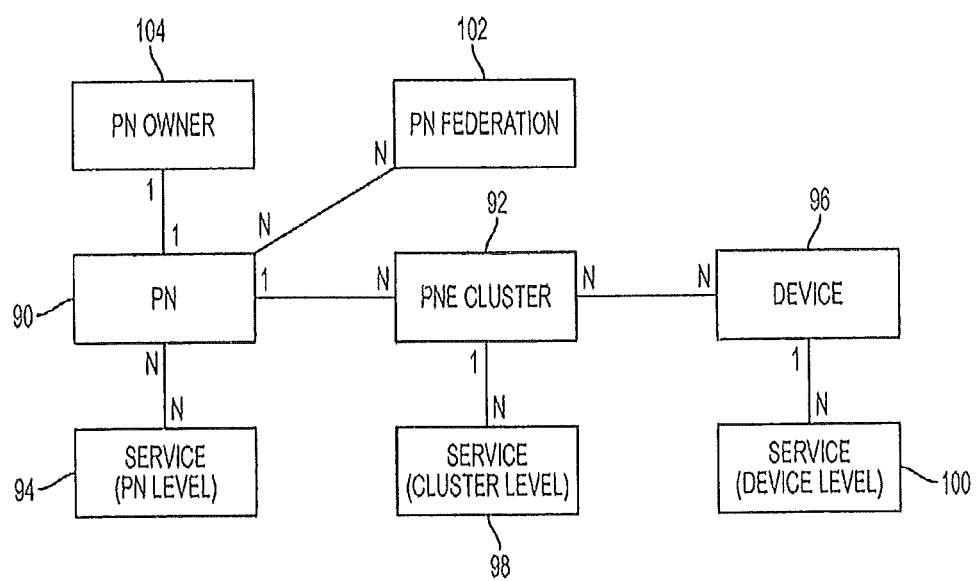
FIG. 5 shows example relationships between architectural elements in accordance with an example embodiment.

FIG. 5 shows an example relationship among the different entities described above with respect to the example embodiment FIG. 4, e.g., which entities relate to other entities in either a 1:1 relationship or a 1:many (N) relationship. Therein, one PN 90 can include multiple PNE Clusters 92 and PN-level Services 94. One PNE Cluster 92 can include multiple devices 96 and Cluster-level services 98. A device can include multiple device-level services 100. It will be appreciated that as used in this context, N can be a number which is equal zero or be a number which is greater than zero. A PN 90 can belong to N PN Federations 102, which in turn can include N PNs 90. As mentioned above, a PN owner 104 typically has a one to one relationship with his or her own PN 90. The services 94, 98 and 100 illustrated in FIG. 5 typically can be categorized as shown below in Table 2.

TABLE 2

| Service Types | | |
|---|---|---|
| Type | Description | Example |
| PN level | A service that is associated with a PN and is not a cluster level service. | A VoD service that the user has associated his PN to consume the service by a specific device in the PN. A composite service that utilize services provided by clusters. |
| Cluster level | A service that is provided by a PNE cluster gateway | A composite service to control a DLNA device according to a room occupancy sensor. |
| Device level | A service that is provided by a device | Media Renderer service of DLNA device |
| External | Service that is provided by an external entity | Google Map |

Regarding the identities of the various entities described above with respect to FIGS. 4 and 5, the identity of a device 96, i.e., a networked object 10, can be for example provided by the device manufacturer, e.g., a MAC address. However, device identities could also be provided in other ways, e.g., on an IP level by a home DNS service or using explicit names, e.g., entered into the system by user configuration. Device-level services 100 are identifiable inside the respective device 96, which means that the cluster-level service is able to identify the device level service 100 by using a combination of the device 96's identity and the identity of the device level service 100. The identity of a cluster-level service 98 identifies the service uniquely within the cluster. In conjunction with the PNE cluster 92's identity, a PN level service 94 is able to identify the cluster-level service 98.

The identity of a PN-level service 94 identifies the service uniquely within the PN 90. In conjunction with a PN 90's identity, service requesters are able to identify a PN-level service 94 if there is a Service Level Agreement (SLA) in place between the PN and the service requesters.

Figure 6:
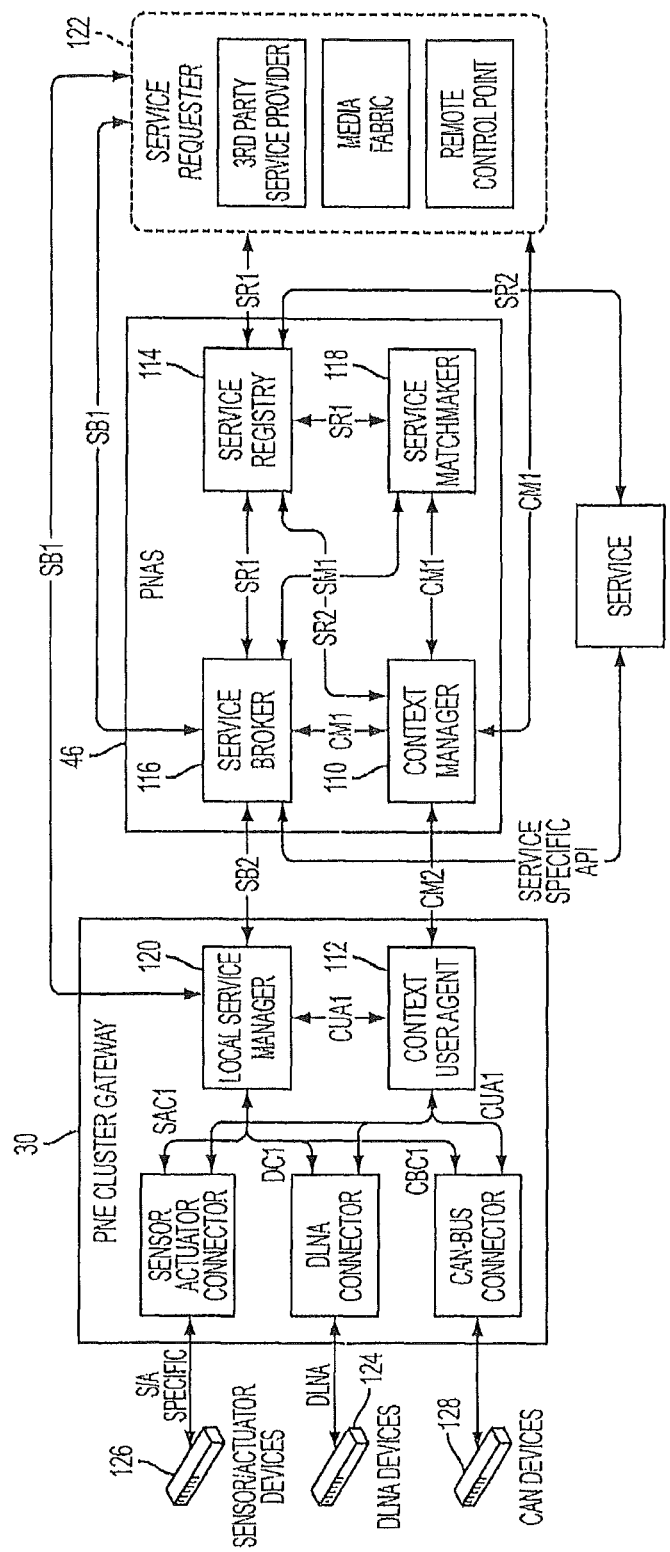
FIG. 6 illustrates a more detailed architectural schematic for implementing management of networked objects using social principles according to an example embodiment.

FIG. 6 provides a more detailed architectural view of a gateway 30, an associated PN AS 46 and their interactions with a service requester according to an example embodiment which can be used to jointly provide management of networked objects using social mapping principles. Table 3 below provides a brief description of each of the logical interfaces illustrated in FIG. 6.

TABLE 3

| Short description of each logical interface | | |
|---|---|---|
| Interface | Owner | Description |
| CM1 | Context Manager | PN enablers and any 3$^{rd}$ party may retrieve and update the PN context information. |
| CM2 | Context Manager | The Context User Agent uploads to the Context Manager the context information generated in the cluster, and it downloads the entire or a part of the PN context information from the |

TABLE 3-continued

Short description of each logical interface

| Interface | Owner | Description |
| --- | --- | --- |
| | | Context Manager when necessary. |
| SB1 | Service Broker | The Service Requester invokes services in the Service Broker. |
| SB2 | Service Broker | The Service Broker invokes a service in the Local Service Manager. |
| SR1 | Service Registry | $3^{rd}$ party SPs or PN enablers query for the registered services in the Service Registry. |
| SR2 | Service Registry | $3^{rd}$ party SPs or PN enablers register services in the Service Registry |
| SM1 | Service Matchmaker | PN enablers request service matchmaking and receive the result. |
| CUA1 | Context User Agent | Connectors and services in the Local Service Manager request population and retrieval of the context information. |
| SAC1 | Sensor Actuator Connector | Services in the LSM invoke services on the Service Actuator Connector |
| DC1 | DLNA Connector | Services in the LSM invoke services on the DLNA Connector |
| CBC1 | CAN Bus Connector | Services in the LSM invoke services on the CAN Bus Connector |

As seen in FIG. 6, context management is provided in order to determine device capabilities, friendship relations and user situations to, in turn, be able to make intelligent adaptations of the media delivered in response to a service request. These adaptations can range from selection of variants (e.g., low-res thumbnails to mobiles; hi-res widescreen to HDTV's, hi-res with interaction to users who have a mobile phone and a TV at the same time) to various types of transcoding, including content adaptation (i.e. personalization). A PN 90 according to example embodiments is associated with context information where the information related to the devices and services in the PN are stored. Context Management is the function according to example embodiments that aggregates the context information from each cluster in the PN 90 and exposes it to a context consumer. Service Providers, Content Providers and end users are context consumers. The Context Management function authenticates and authorizes accesses to the context information and filters the information to be exposed so that the end user and the operator can control the information to be exposed.

More specifically, a context manager 110 is provided in the PN AS 46 (and counterpart context user agent 112 in the gateway 30). According to example embodiments, there are two approaches to process context information. One is to store the information in the original format provided by each device standard and to require that any context consumers understand this format. The alternative is to store the context information using a unified model. The latter has an advantage in that it enables the context manager 110 to generate comprehensive context information based on the elementary information from different types of devices such as DLNA devices 124, sensor/actuator devices 126, and CAN devices 128, while the former enables utilization of existing standards as much as possible. In either implementation, context management implies interacting with database-backed systems. Thus, according to one example embodiment, the context management system 110, 112 contains the following databases:

1. A device capability database (e.g., defining what type of media a PS3 can handle or which media formats and streaming protocols are supported by a iPhone 3.0). This database typically needs to be manually populated primarily because it is difficult to automatically derive this information, the database typically only needs to be created once, and typically can be created by the manufacturer (e.g., referenced by the device, in the same way as UAProf).

2. A service required capabilities database which describes what a service would require to be meaningfully consumed. This database typically is also created only once, by the service provider (or a proxy for the service provider, like the operator).

3. A database or list indicating which devices and user-provided services are available in particular user situations, also known as the "personal network" (this data structure can typically be populated automatically, e.g., via a discovery process, at least in the DLNA-case) and to which of the device types and situational parameters those services match. This data structure may be updated seldomly (e.g., when a device is "paired" or "discovered") and can be created by the gateway 30.

4. A database or list indicating what the other parameters of the situation are, e.g., sensor readings which are semi-persistent, such as the location. This data structure can, for example, be updated several times of day and can be created by the gateway 30 or by the operator and attached to the database representation (in the case of location, for instance).

5. A database, list or other data structure indicating the current status of a particular device or personal network (e.g., if the PN has the same constraints throughout, and can be represented by the PNE Cluster GW). Current bandwidth and other situational parameters, such as ambient temperature, light level, physical orientation, etc. can be stored in this data structure which will get updated relatively often, e.g., by the gateway 30.

This data enables the gateway 30 and/or the PN AS 46 according to example embodiments to intelligently adapt service provision as described above in the example service request scenarios which involve "friend" devices or, more generally, task requests which involve networked objects having at least a predetermined relationship level in a given hierarchical implementation of relationship levels. Note that not all of this information is necessary to every application or service request. Thus, the application of service which needs the information can query the databases containing this information (which may or may not be present at the same location, e.g., in the same operator database). Alternatively, there can be a proxy provided for the information which is queried. The latter approach has several advantages, for instance the ability to integrate with existing systems (e.g. XDMS) very easily; and the user can determine a policy for what is delivered to whom. The query itself can take various forms, for instance, a SPARQL or XQUERY query; a web services document submitted to a URL (REST or SOAP-wise), an ISC request, etc.

In addition to context management in support of networked object management employing social mapping principles, various functions in support of service management are also shown in FIG. 6. Therein, the example PN architecture enables a PN owner to expose services from his or her PN so that they are accessible by a service requester such as a service provider, a contents provider and end users other than the PN owner. The exposed service may be described in a device-independent way, which makes it possible for the PN owner to decide by which device he wants to receive the service. The exposed service may require certain capabilities on the service consumers so that an inappropriate device or application is not proposed to the PN owner as a consumer of the service. For example, when a media rendering service exposed by a PN invokes a request for rendering a video or audio clip, the PN owner receives a notification with a list of candidate devices that are located nearby and are capable of consuming the given media, enabling the user to choose which device to use.

Hence, the Service Management function in the PN architecture of the example embodiment of FIG. 6 mediates between the Service Requester and the user, keeping the balance between fine-grained service delivery and protecting the user's privacy. In this example, the Service Management function includes the Service Registry 114, the Service Broker 116, the Service Matchmaker 118 and the Local Service Manager 120. The Service Registry 114 is the single point of contact for other PN enablers or a Service Requester 122 to find the requested service. The Service Broker 116 and the Local Service Manager 120 host services that are accessed by a Service Requester 122. The Service Matchmaker 118 compares the requirement of the services in the Service Registry 114 with device capability and other context information of the PN, and the matched service and device pairs are stored in the context information of the PN. A Service may be a composite service which looks up other services in the Service Registry 116, executes them and aggregates the results. A constituent service of a composite service may be a service provided by a service provider or a service provided by a PN.

Each PNE cluster 92 has a (and, according to some example embodiments, only one) PNE Cluster Gateway 30 which collects information from the devices 10 in the cluster, such as statuses, service information and event occurrences, and forwards this information to the Context Management function. The Service Management function receives requests for services provided by the devices in the cluster or the PNE cluster gateway itself, dispatches the requests and collects the results to be returned to the Service Requesters 122.

Figure 7A:
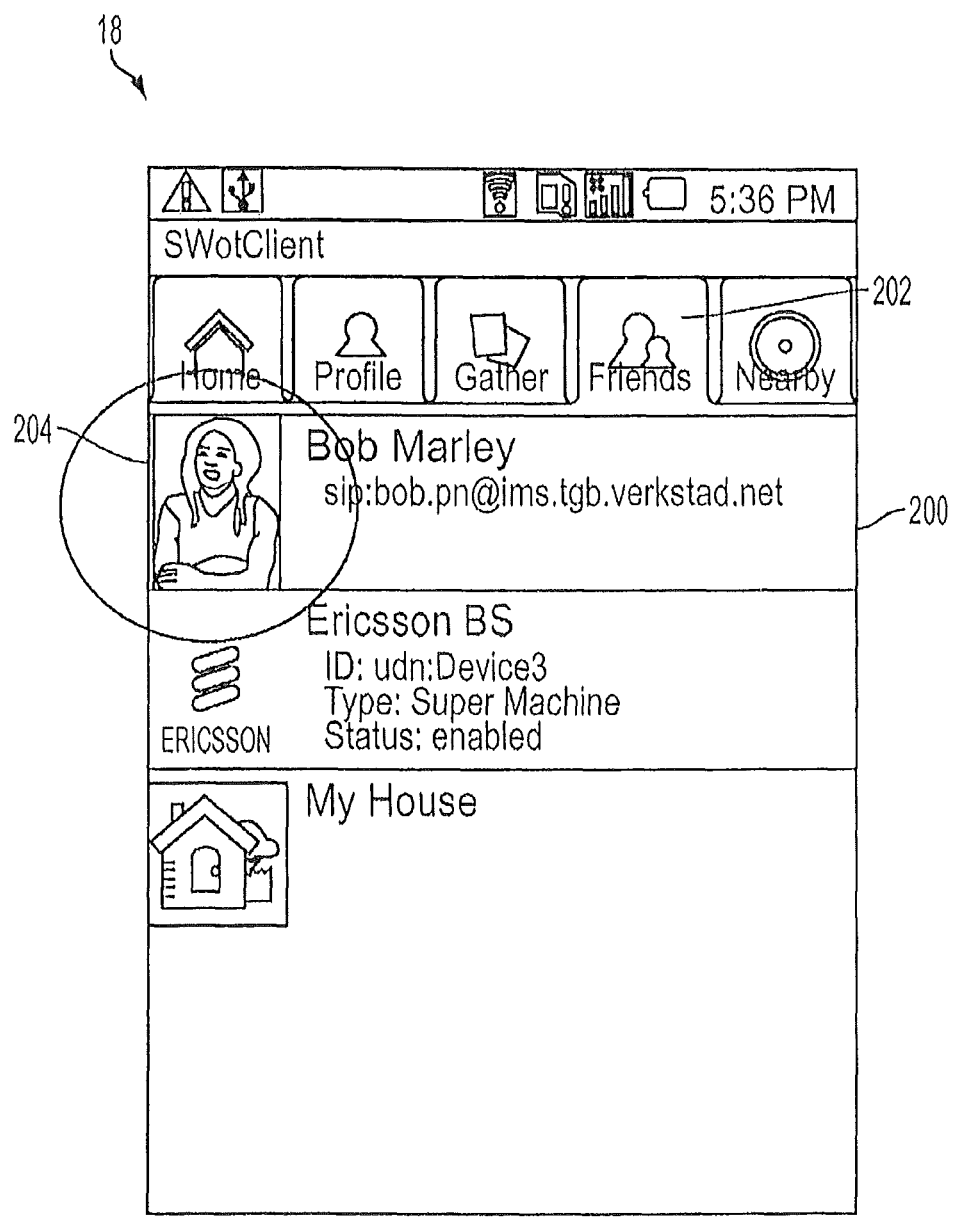
FIGS. 7(a)-7(c) show user interfaces associated with other example embodiments.
Figure 7B:
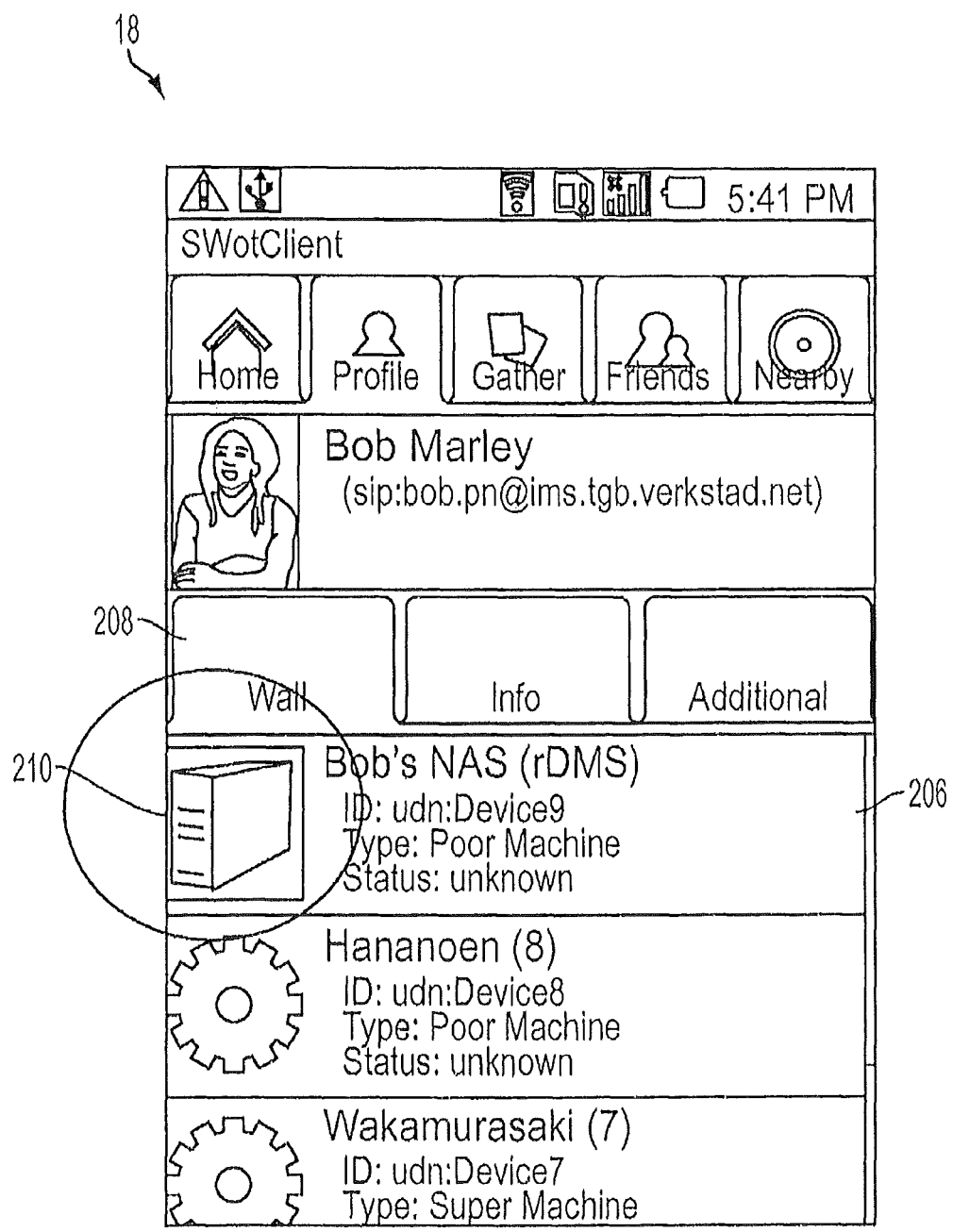
Figure 7C:
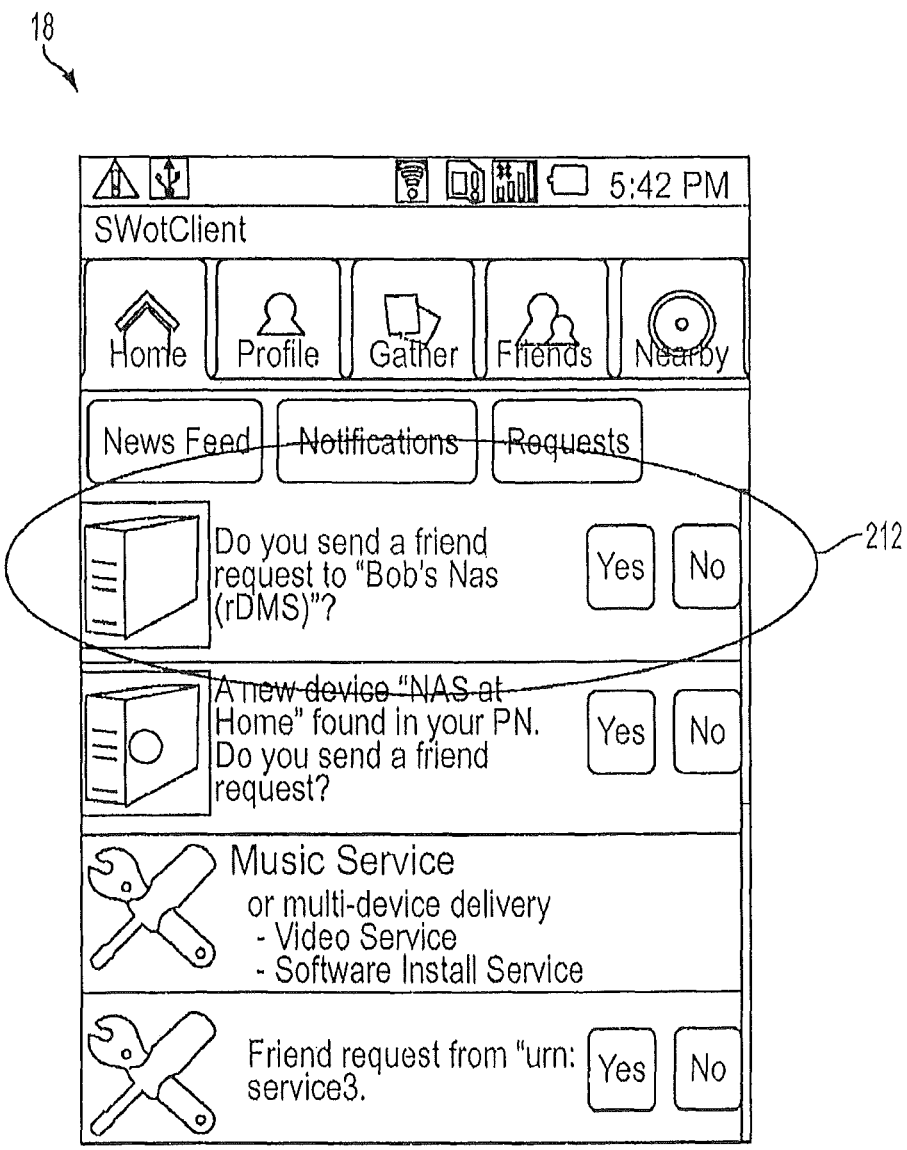

Using the architecture described above with respect to FIGS. 4-6, the aforedescribed management of networked object using social mapping principles can be implemented. Another example of such interactivity will now be described with respect to the user interface screens associated with a user interface 18 shown in FIGS. 7(*a*)-7(*c*). Starting with user interface screen 200 in FIG. 7(*a*), a user 16 (Alice) of a PN 90 can see another user 16 (Bob) in her friend list (displayed by actuating Friends tab 202) because Bob and Alice are mutual friends. By clicking on Bob's icon 204, Alice can further check Bob's networked object information as shown in FIG. 7(*b*). Therein, an entry 206 associated with Bob's NAS appears in the wall 208 since devices and services owned by Bob which have been designated by Bob as having an "open" setting can be seen by his friends, hence Alice can see Bob's NAS on the wall 208. By clicking on (or otherwise selecting) the icon 210 associated with Bob's NAS, Alice is prompted by the SWoT UI to be friends with Bob's NAS as seen in FIG. 7(*c*). Alice is guided to the notification tab under the home page, and sees that she receives a notification 212 saying "Do you want to send a friend request to "Bob's NAS"? According to this example, suppose that Alice selects "Yes" as she is interested in being able to access the device, e.g., to enable her to access Bob's NAS to search for interesting media content. This message will then be relayed to the relation management function 22 to establish the friend relationship between Alice and Bob's NAS device as described above. Alternatively, an explicit request by Alice to access Bob's NAS could be treated as an implicit request to establish a friend relationship with Bob's NAS, which could then be accepted or rejected by Bob.

Figure 8:
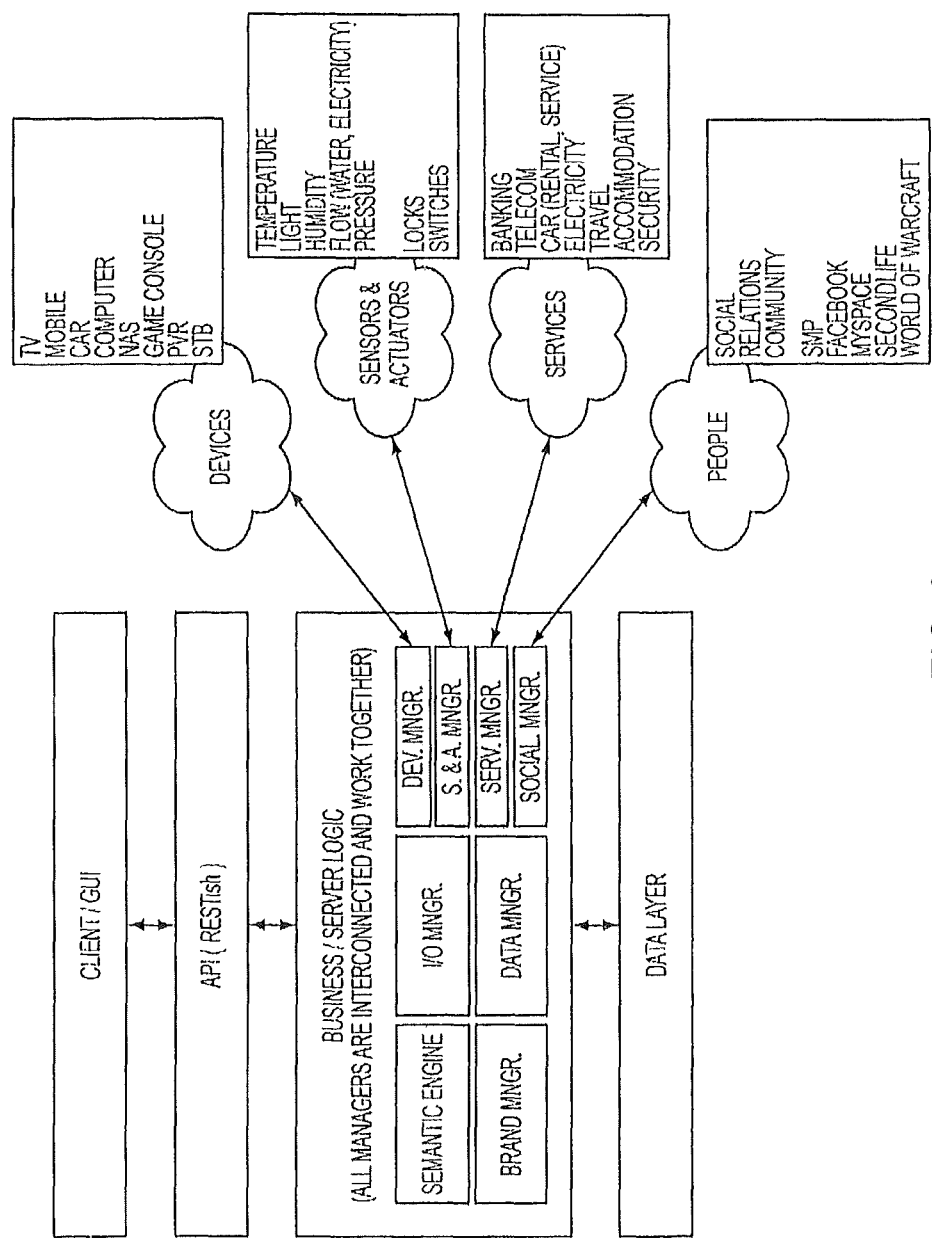
FIG. 8 depicts another architecture for providing management of networked objects using social mapping principles according to an example embodiment.

FIG. 8 depicts another high level view of architectures associated with managing networked objects using social mapping principles according to example embodiments, including a number of examples of devices, sensors and actuators, services and people that may be associated with such management systems and methods. From the foregoing description, it will be appreciated that devices and servers are involved in implementing such systems. By way of example, rather than limitation, an example of a (mobile) device 700 and a server 600 will now be described with respect to FIGS. 9 and 10, respectively.

Figure 9:
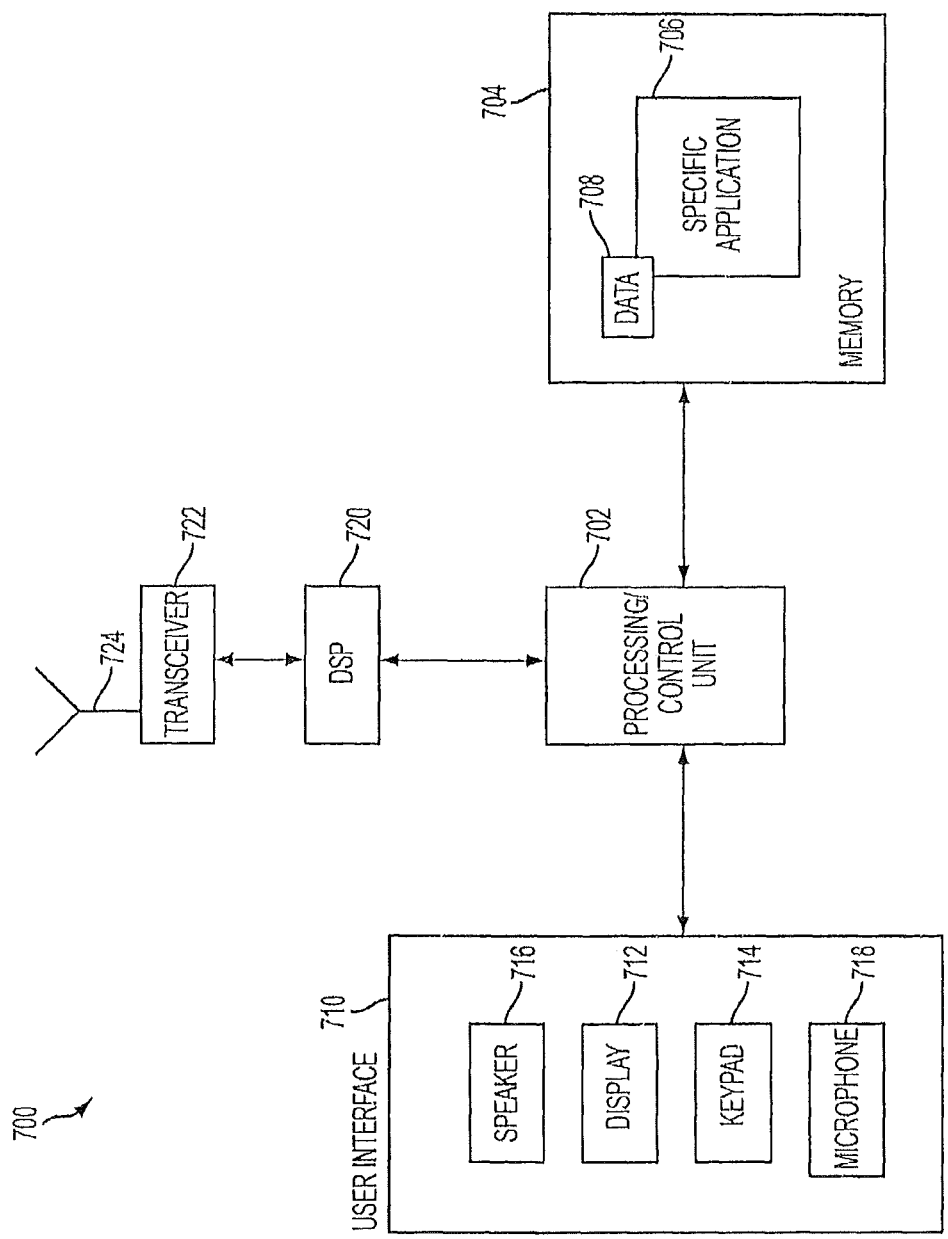
FIG. 9 illustrates an example mobile device which can be used in conjunction with example embodiments.

Starting with FIG. 9, an example networked object or terminal device which runs user interface 18 can be a mobile device such as the example mobile computing arrangement 700 which may include a processing/control unit 702, such as a microprocessor, reduced instruction set computer (RISC), or other central processing module. The processing unit 702 need not be a single device, and may include one or more processors. For example, the processing unit 702 may include a master processor and associated slave processors coupled to communicate with the master processor. The processing unit 702 may control the basic functions of the networked object or mobile terminal as dictated by programs available in the storage/memory 704. Thus, the processing unit 702 may execute the functions described above to, e.g., enable friend devices to communicate with one another. More particularly, the storage/memory 704 may include an operating system and program modules for carrying out functions and applications on the mobile terminal. For example, the program storage may include one or more of read-only memory (ROM), flash ROM, programmable and/or erasable ROM, random access memory (RAM), subscriber interface module (SIM), wireless interface module (WIM), smart card, or other removable memory device, etc. The program modules and associated features may also be transmitted to the mobile computing arrangement 700 via data signals, such as being downloaded electronically via a network, such as the Internet.

One of the programs that may be stored in the storage/memory 704 is a specific program 706. As previously described, the specific program 706 may be a client application which interacts with the system 12 to, for example, receive and authorize friend requests, send task requests and receive task results, or display information about networked objects 10 with which the user has a friend, best friend or owner relationship. The program 706 and associated features may be implemented in software and/or firmware operable by way of the processor 702. The program storage/ memory 704 may also be used to store data 708, such as the various authentication rules, or other data associated with the present example embodiments. In one example embodiment, the programs 706 and data 708 are stored in non-volatile electrically-erasable, programmable ROM (EE-PROM), flash ROM, etc. so that the information is not lost upon power down of the mobile terminal 700.

The processor 702 may also be coupled to user interface 710 elements associated with the mobile terminal. The user interface 710 of the mobile terminal may include, for example, a display 712 such as a liquid crystal display, a keypad 714, speaker 716, and a microphone 718. These and other user interface components are coupled to the processor 702 as is known in the art. The keypad 714 may include alpha-numeric keys for performing a variety of functions, including dialing numbers and executing operations assigned to one or more keys. Alternatively, other user interface mechanisms may be employed, such as voice commands, switches, touch pad/screen, graphical user interface using a pointing device, trackball, joystick, or any other user interface mechanism.

The mobile computing arrangement 700 may also include a digital signal processor (DSP) 720. The DSP 720 may perform a variety of functions, including analog-to-digital (A/D) conversion, digital-to-analog (D/A) conversion, speech coding/decoding, encryption/decryption, error detection and correction, bit stream translation, filtering, etc. The transceiver 722, generally coupled to an antenna 724, may transmit and receive the radio signals associated with a wireless device.

The mobile computing arrangement 700 of FIG. 9 is provided as a representative example of a computing environment in which the principles of the present example embodiments may be applied. From the description provided herein, those skilled in the art will appreciate that the present invention is equally applicable in a variety of other currently known and future mobile and fixed computing environments. For example, the specific application 706 and associated features, and data 708, may be stored in a variety of manners, may be operable on a variety of processing devices, and may be operable in mobile devices having additional, fewer, or different supporting circuitry and user interface mechanisms. It is noted that the principles of the present example embodiments are equally applicable to devices which are non-mobile terminals, i.e., landline computing systems.

Figure 10:
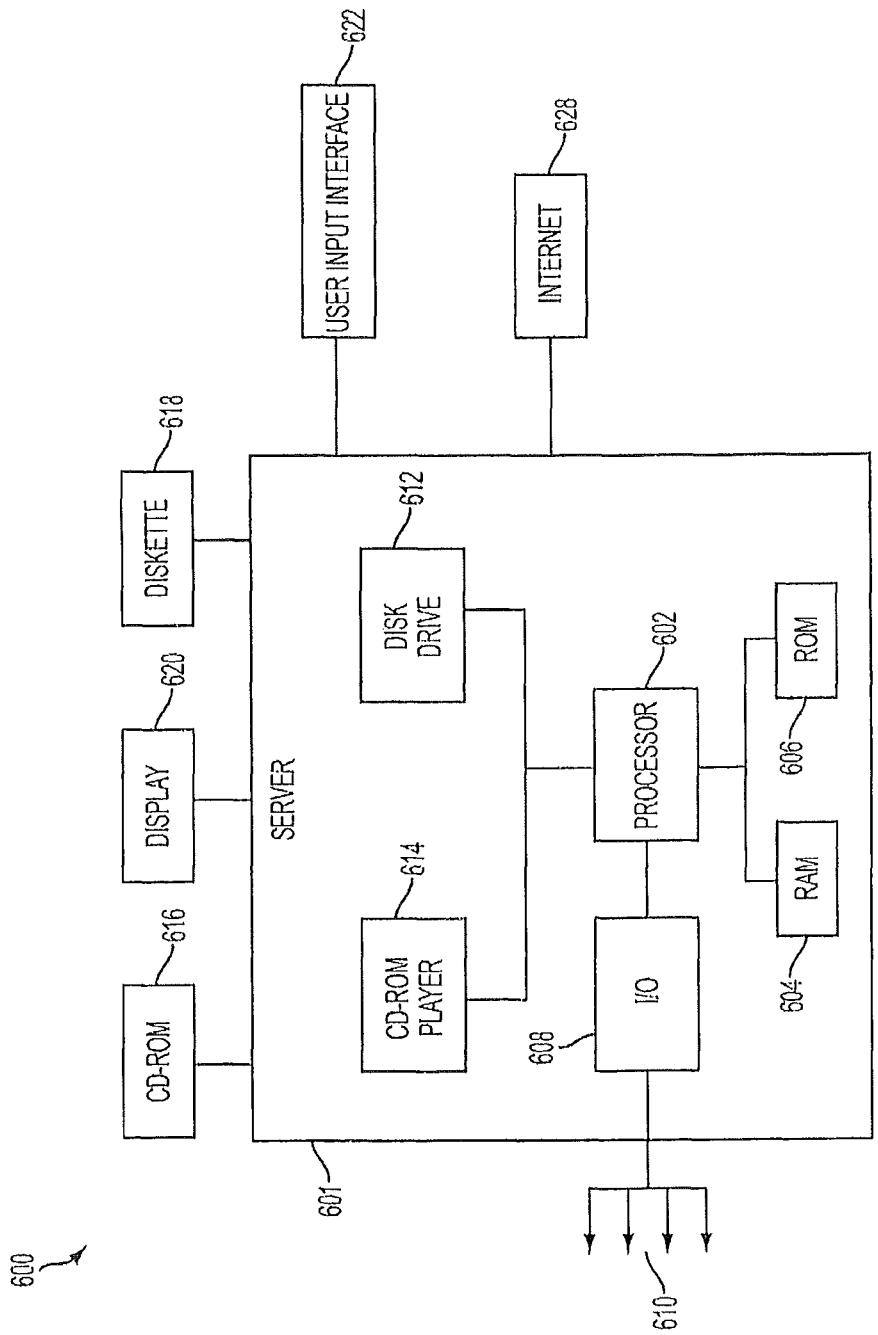
FIG. 10 illustrates an example server device which can be used in conjunction with example embodiments.

An example of a representative computing system capable of carrying out operations in accordance with the servers or gateways of the example embodiments is illustrated in FIG. 10. Hardware, firmware, software or a combination thereof may be used to perform the various steps and operations described herein. The computing structure 600 of FIG. 10 is an example computing structure that may be used in connection with such a system.

The example computing arrangement 600 suitable for performing the activities described in the example embodiments may include server 601, which may correspond to any of servers or gateways described herein, e.g., PN AS 46 or gateway 30. Such a server 601 may include a central processor (CPU) 602 coupled to a random access memory (RAM) 604 and to a read-only memory (ROM) 606. The ROM 606 may also be other types of storage media to store programs, such as programmable ROM (PROM), erasable PROM (EPROM), etc. The processor 602 may communicate with other internal and external components through input/output (I/O) circuitry 608 and bussing 610, to provide control signals and the like. The processor 602 carries out a variety of functions as is known in the art, as dictated by software and/or firmware instructions. For example, when computing arrangement 600 is operating as a PN Cluster gateway 30, the I/O circuitry 608 and bussing 610 can provide at least two network connections, i.e., one for the PN Cluster network, and one for the wide-area network.

The server 601 may also include one or more data storage devices, including hard and floppy disk drives 612, CD-ROM drives 614, and other hardware capable of reading and/or storing information such as DVD, etc. In one embodiment, software for carrying out the above discussed steps, e.g., to establish friend relations between networked objects, may be stored and distributed on a CD-ROM 616, diskette 618 or other form of media capable of portably storing information. These storage media may be inserted into, and read by, devices such as the CD-ROM drive 614, the disk drive 612, etc. The server 601 may be coupled to a display 620, which may be any type of known display or presentation screen, such as LCD displays, plasma display, cathode ray tubes (CRT), etc. A user input interface 622 is provided, including one or more user interface mechanisms such as a mouse, keyboard, microphone, touch pad, touch screen, voice-recognition system, etc.

The server 601 may be coupled to other computing devices, such as the landline and/or wireless terminals and associated watcher applications, via a network. The server may be part of a larger network configuration as in a global area network (GAN) such as the Internet 628, which allows ultimate connection to the entities described above.

Figure 11:
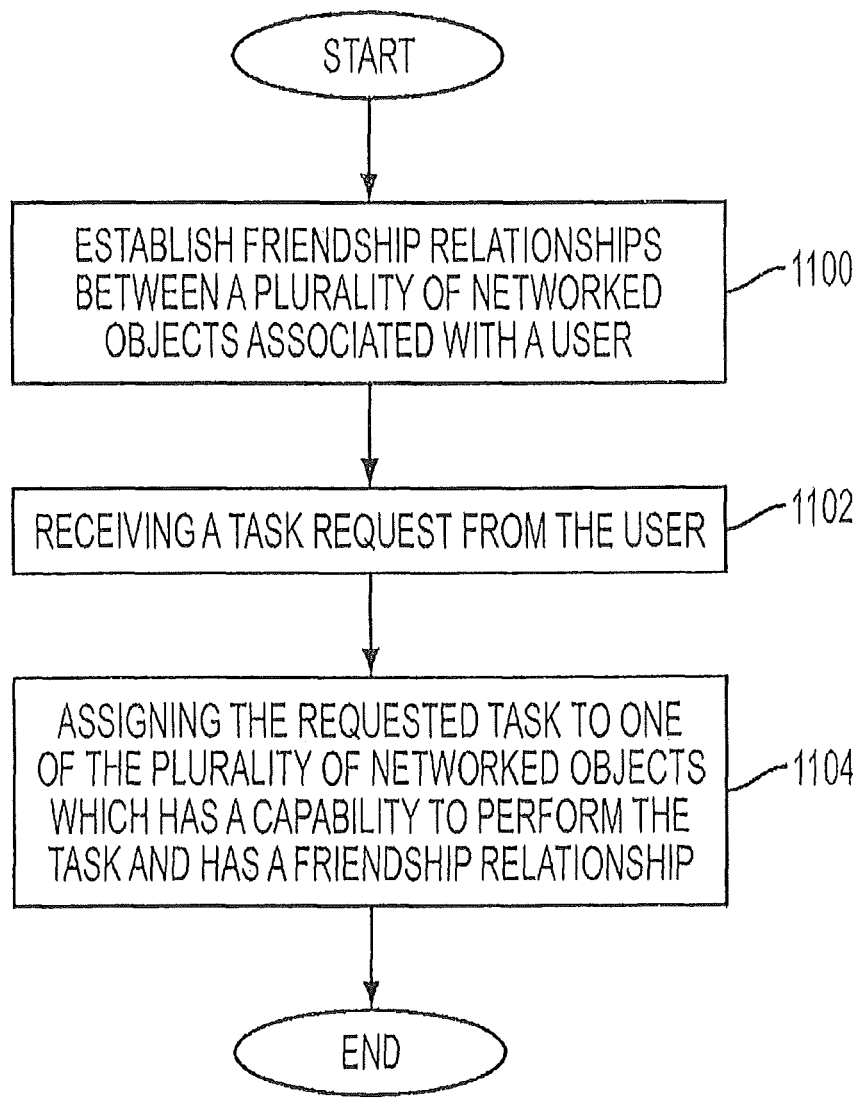
FIG. 11 is a flowchart depicting operations and methods for managing networked objects according to an example embodiment.

Although the features and elements of the present example embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a general purpose computer or a processor. For example, FIG. 11 depicts a flowchart which illustrates a method of managing networked objects according to an example embodiment. Therein, at step 1100, friendship relationships are established between a plurality of networked objects, each of the plurality of networked objects being associated with a user. The network management system receives a task request at step 1102. In response, the network management system assigns the requested task to one of the plurality of networked objects which has a capability to perform the requested task and which has an established friendship relationship with the user.

Figure 12:
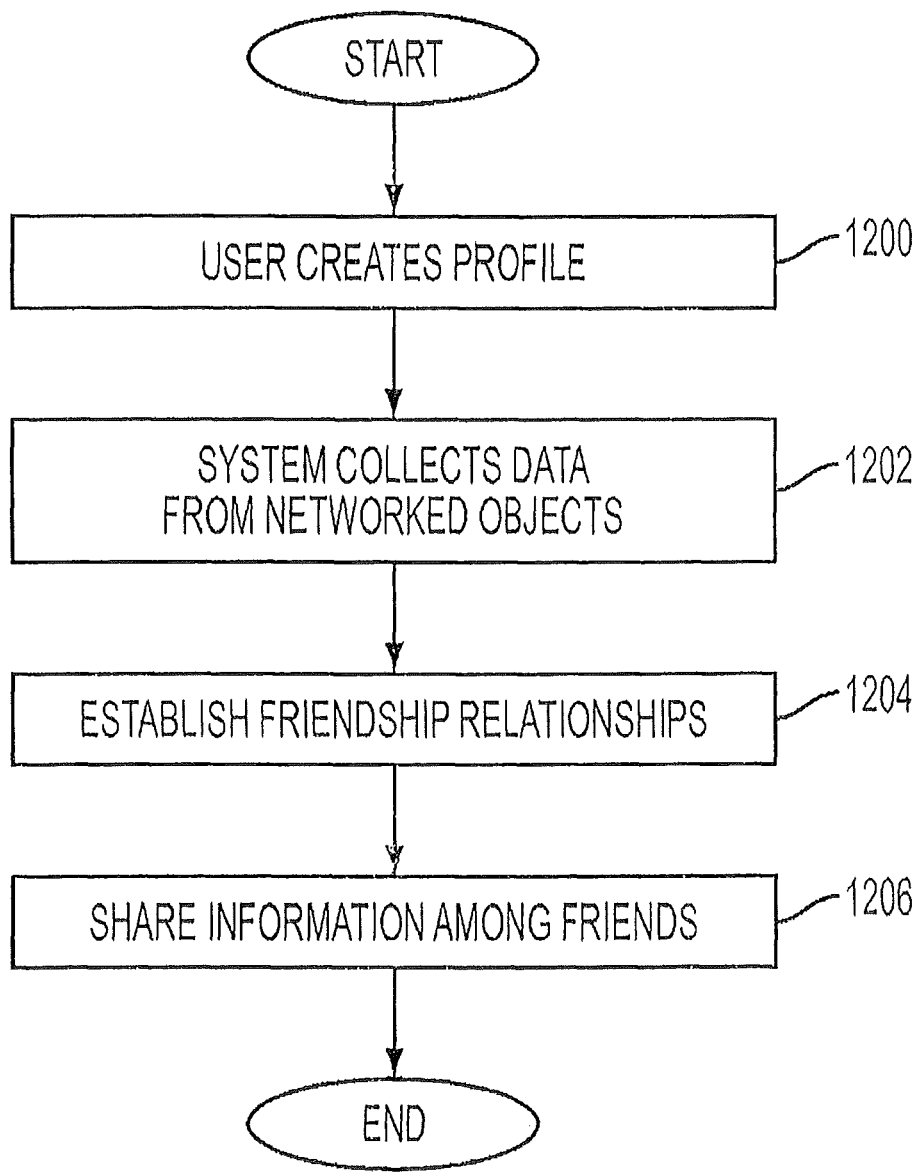
FIG. 12 is a flowchart depicting other operations and methods for managing networked objects according to an example embodiment.

According to another example embodiment, generalized systems and methods for networking objects using social mapping principles can operate as shown in the flowchart of FIG. 12. Therein, at step 1200, a user joins and installs the service and creates a profile that reflects the identity of the user. Data for the user profiles could be imported or aggregated from existing user profiles of known web-based social network services such as Facebook, MySpace, and LinkedIn, or from the users' data connected to a subscription with an operator. Groups of users could be created among users living within the same household, or other attributes that the user has decided to share. User profiles can be made visible and linked with the profiles of other users of a group if the users wish to do so.

At step 1202, the system collects data from objects which are presently networked together and unique entity profiles for each device are created (based on, for example, the kind of device, its functionality, brand characteristics, location, etc.). The users connect their own system entity to system entities of networked objects, for example by creating a connection through the client application user interface or physically bringing together NFC/RFID enabled devices. The objects' system entities connect to each other's profiles, i.e., establish a level of friendship relation as described above, either automatically (based on the kind of device, its functionality, brand, location, etc.) or as managed by a user (authorized to do so and that has connected his/her user profile to the device) at step 1204.

Once System Entity A has established a friendship relation with System Entity B, other system entities that System Entity A already has a relation to can also establish a relation with System Entity B, and vice versa. For example, suppose that the system sends data about the new relation to already connected system entities associated with both A and B, optionally filtered by criteria such as device capabilities, brand, location etc. The new system entity (A or B in this example) can respond to such queries e.g. by auto-confirmation, thereby establishing a relation to the existing devices. Alternatively, all such connections can be manually managed in the user's client application, or the user could define a set of rules for auto-confirmation.

As mentioned above, such relations may have a temporal characteristic or parameter. For example, temporary relations to system entities such as those associated with borrowed or rented networked objects, or guest-users can be set up for a specific period of time, alternatively based on the proximity of another specific user, within a certain area, along a certain route or other criteria. The temporary connected entities will then only be available when fulfilling the pre-defined criteria mentioned above, and the system entity is otherwise inaccessible, although it may still be visible to the temporary connected system entities. A temporary connection can be approved- or initiated by the system or by the owner/provider/administrator of the system entity that will have a temporal connection.

Connected users and objects' system entities according to example embodiments may have reciprocal presence in each other's profiles. Information about status, logged activities, other connections, mutual connections etc. can be made available for connected users and system entities. The user, or a networked object's system entity, can for example send data or a notification that calls for a certain response, to the system or to a specific system entity or group of system entities.

Each system entity can be made aware of its connected system entities profiles, including but not limited to data about their functionality, dependencies, current status as well as previous and future planned (timer set) events, capabilities, mandate and responsibilities. This enables functionality and interaction such as that exemplified by the TV and the video recorder scenario described above. Moreover, the kind of subcontracting, functional outsourcing or 'favors' described in that TV and video recorder example could, in some cases, be executed automatically between the system entities of objects, without the interaction of a user. These activities are collectively referred to in FIG. 12 by step 1206 which indicates that all of this type of information can be shared among those networked objects 10 which are, at least, friends with one another.

As yet another example of this type of architecture and functionality according to an example embodiment, consider a sensor cluster represented in the system as a plant's system entity sends data to the system about its status, for example that it the temperature is high and humidity very low. The system could interpret this status as not ideal for the plant, and the system could notify the system entity of the blinds in the window where the plant is located that it could potentially provide a solution to this reported problem by closing, creating shadow for the plant. After closing, the blinds will send a notification (as a threaded response to the plant's status) that states that it has attempted to solve the plant's problem. The user can monitor, participate or intervene with the interaction between the system entities via the user interface.

From the foregoing, it will be apparent that example embodiments provide intuitive, understandable and unified interaction with networked devices and services as well as between their users, owners, manufacturers, vendors or providers. Such embodiments support and enhance the users' conceptual understanding of a digital network, as well as provide easy access to each device and service via a user interface. Example embodiments greatly ease the configuration, monitoring, maintenance and management of networked products and services and can also help make home automation more intelligent and transparent, but at the same time understandable and non-intrusive for the users.

The ease of use, accessibility and understandable concept according to these example embodiments could lower the threshold for the users to buy or add services to the system. This could create a new platform for delivering digital as well as physical services of all kinds. The system also opens up new opportunities for branding as it provides a way for manufacturers of products and services to manage and customize the characteristics that define the system entities that represent each product they manufacture in the system. Manufacturers can submit data to the system that for example define what kind of expression and behavior system entities of a certain product should have, and also what kind of relationship it should have with other system entities that are related to or affiliated via the brand of their manufacturers.

Numerous embodiments have been explained above that apply social mapping principles to manage resource nodes which are connected to one or more networks. Resource nodes are also referred to herein as "networked objects." Some further embodiments described below are directed to managing data flows between resource nodes, and can include generating recommendations for data flows between resource nodes that can be accepted or declined by users.

Figure 13:
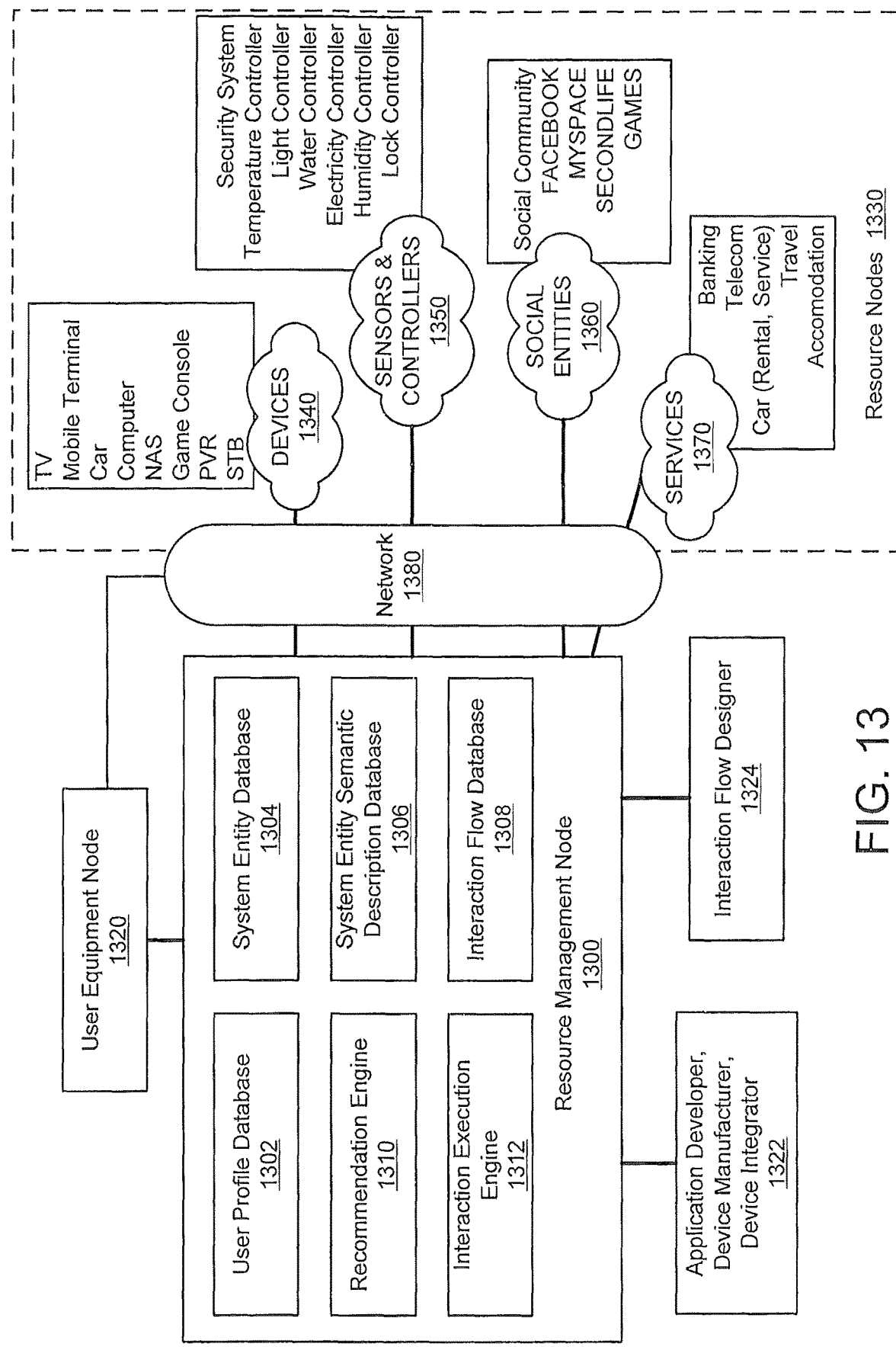
FIG. 13 depicts another architecture that includes a resource management node that manages a plurality of resource nodes connected to at least one network using operations and methods according to some embodiments.

FIG. 13 depicts another system architecture that includes a resource management node 1300 that manages a plurality of resource nodes 1330 connected to at least one network 1380 (e.g., a personal network (PN), a public network (Internet), etc.) using operations and methods according to some embodiments. Referring to FIG. 13, the resource nodes 1330 can include, but are not limited to, electronic devices 1340, electronic sensors and controllers 1350, electronic social entities 1360, and electronic services 1370. Example electronic devices 1340 can include televisions, mobile communication terminals, cars, computers, network attached storage (NAS), game consoles, personal video recorders (PVRs), and set-top boxes (STBs). Example electronic sensors and controllers 1350 can include security systems, temperature controllers, light controllers, water controllers, electricity controllers, humidity controllers, and/or door lock controllers. Example electronic social entities 1360 can include computer systems that provide social community interactions between users, such as Facebook, MySpace, and LinkedIn, SecondLife, and on-line gaming applications. Example electronic services 1370 can include computer systems that provide banking services, telecommunication services, car rental services, car repair services, travel services, and accommodation services.

As will be explained in further detail below, the resource management node 1300 is configured to manage interactions between users and the resource nodes 1330, and to manage data flows between the resource nodes 1330. Users may operate one or more user equipment nodes 1320 to provide instructions to, and receive information from, the resource management node 1300. The user equipment node 1320 may correspond to the above-described user interface 18 of FIG. 1, the above-described mobile device 700 of FIG. 9, and/or any other user interface equipment operable by a user to provide instructions to the resource management node 1300 and/or to receive and display or otherwise communicate information from the resource management node 1300 to the user.

The resource management node 1300 can include a user profile database 1302, system entity database 1304, a system entity semantic description database 1306, interaction flow database 1308, a recommendation engine 1310, and/or an interaction execution engine 1312. Although separate functional elements have been illustrated within the resource management node 1300, one or more of the functional elements may be combined or may be split into two or more functional elements. Moreover, some or all of the functionality that is described as residing within one or more elements of the resource management node 1300 may alternatively or additionally reside within one or more of the resource nodes 1330 and/or within other components of the system. Accordingly, functional components of the resource management node 1300 can be separate from, and communicatively connected to, the resource nodes 1330 and/or some of the function components may reside within one or more of the resource nodes 1330.

As used herein, the term database is used in a general sense to refer to a collection of digital data having known relational structures. Example databases include low complexity data lists and higher complexity object-oriented relational data structures.

Figure 15:
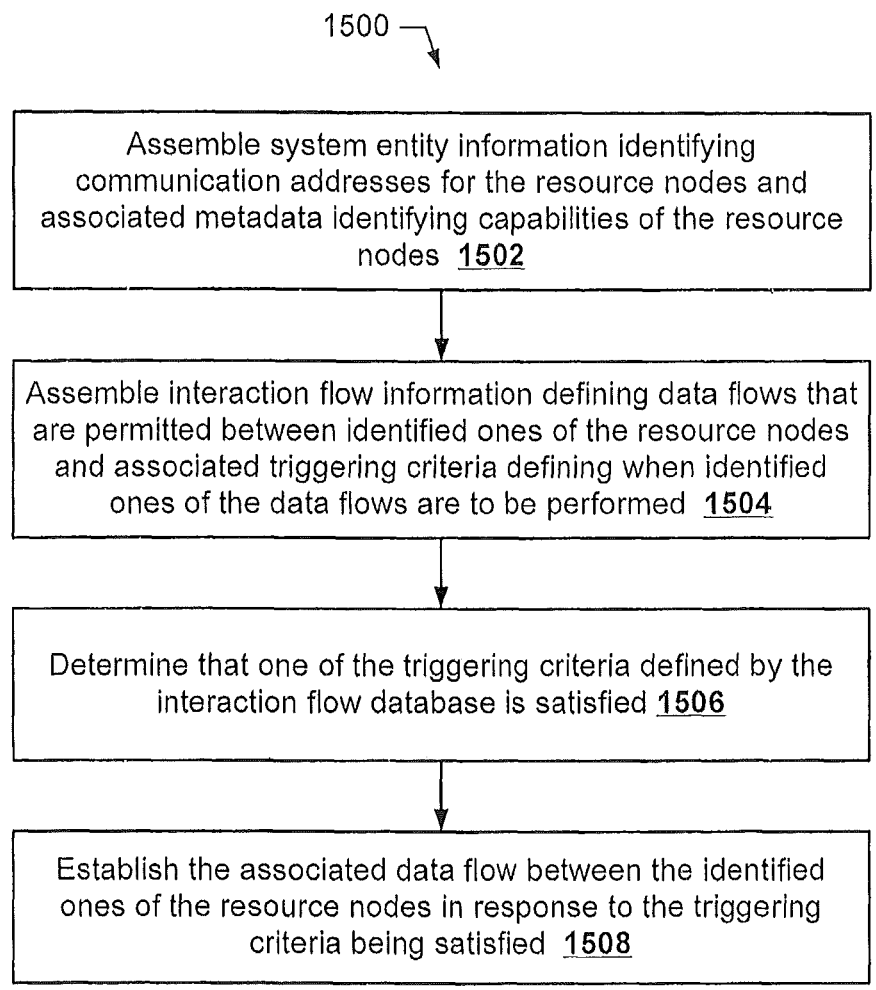
FIG. 15 is a flowchart depicting methods and operations for establishing data flows between resource nodes according to an example embodiment.

Various operations and methods 1500 of the resource management node 1300 are explained below with regard to the flowchart of FIG. 15. The system entity database 1304 contains (assembles) information that identifies communication (e.g., network 1380) addresses for the resource nodes 1330 and has associated metadata that identifies capabilities of the resource nodes 1330 (block 1502). Information in the system entity database 1304 may be supplied by the resource nodes 1330 themselves, such as during an initialization process when a resource node is first connected to the resource management node 1300 via the network. The information may alternatively or additionally be supplied by other entities 1322, such as application developers, device manufacturers, and/or device integrators.

The interaction flow database 1308 contains (assembles) information that defines data flows that are permitted between identified ones of the resource nodes 1330 and further defines associated triggering criteria for when identified ones of the data flows are to be performed (block 1504). Each data flow can identify two or more resource nodes 1330 that are to be communicatively connected so that the data output of one resource node is provided as a data input to another resource node, and may connect the respective output and input interfaces of a plurality of resource nodes to provide a serial daisy chain or other connection architecture between the identified resource nodes.

The interaction execution engine 1312 is configured to determine (block 1506) that one of the triggering criteria defined by the interaction flow database 1308 is satisfied and to respond by establishing (block 1508) the associated data flow between the identified ones of the resource nodes 1330. The interaction execution engine 1312 may, for example, provide a daisy chain data flow through three resource nodes, by controlling the first resource node to output data having certain characteristics (e.g. data format, data content, etc.) to an input interface of the second resource node, control the second resource node to operate on the data and to output data having certain characteristics (e.g. data format, data content, etc.) to an input interface of the third resource node. The interaction execution engine 1312 can similarly initiate and control the flow of data between resources nodes and further control operations performed by the resource nodes on the data.

Figure 14:
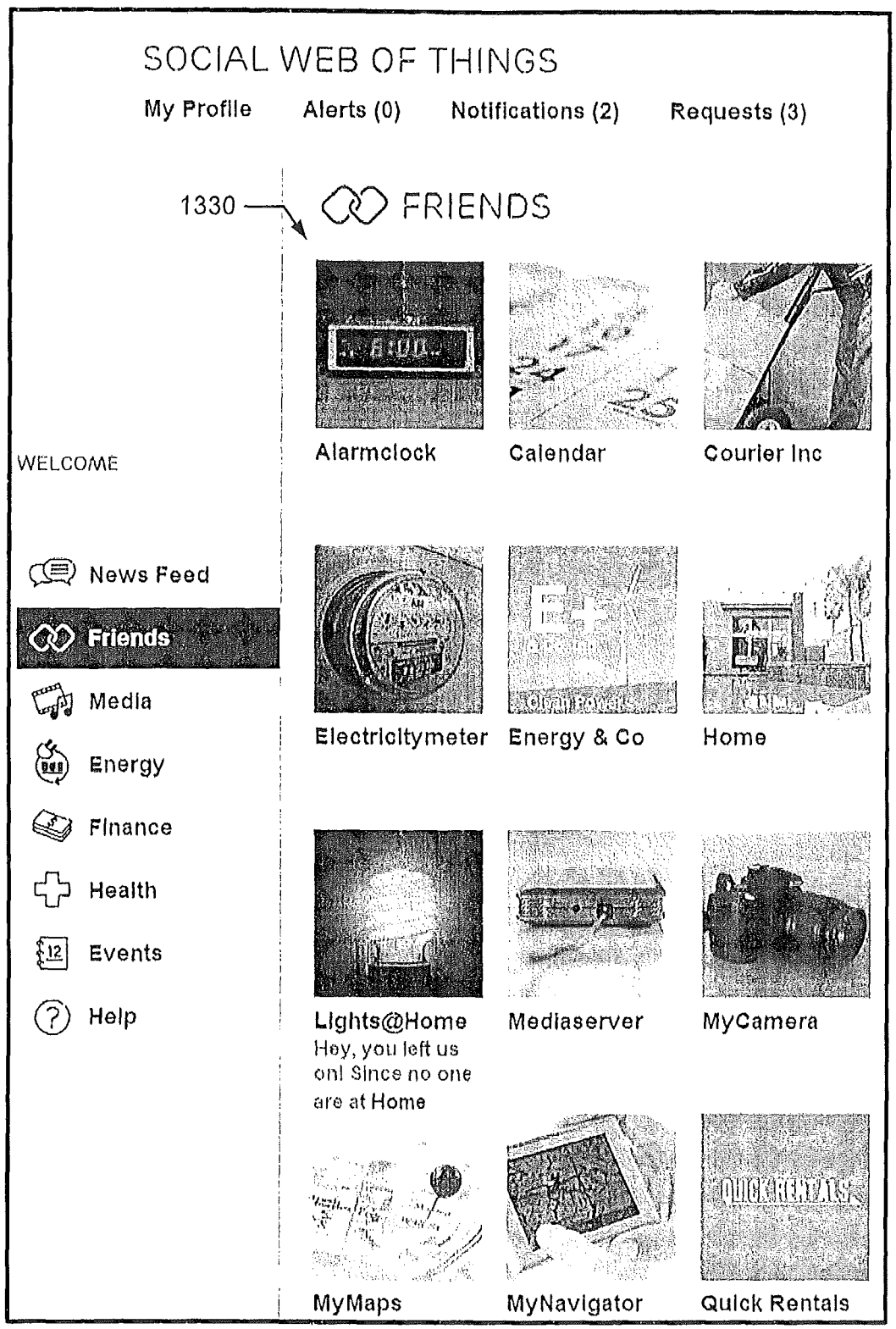
FIG. 14 illustrates example information that can be displayed to a user to indicate that the identified resource nodes have been functionally grouped as friends in a social web, and to indicate that data flows can be established between them according to an example embodiment.

FIG. 14 illustrates example information that can be displayed to a user, via the user equipment node 1320, to indicate that the identified resource nodes 1330 have been functionally grouped as friends in a Social Web of Things (SWoT), and to indicate that data flows can be established between them. Referring to FIG. 14, the resource management node 1300 has established a friendship relationship among various devices and applications that may be hosted on local computers, servers, and/or remote networked computer/servers.

The example devices and applications have established friendships include an alarm clock, a calendar application, a courier application, an electricity meter controller (e.g. configured to monitor power entering the user's home/business), and energy company application (e.g. configured to monitor the cost of power and/or to receive power control commands or money saving recommendations from energy company), home controllers (e.g. door locks, temperature thermostat, etc.), light controllers, a media server, a digital camera/camcorder, a map application, navigation application, and a rental service application (e.g. car rental and/or service).

The system entity database 1304 contains information that identifies communication (e.g., network) addresses for each of the resource nodes 1330 of FIG. 14 and metadata that identifies their respective capabilities (e.g., functional capabilities, data input/output format(s), data content characteristics, performance characteristics, etc.). The interaction flow database 1308 contains information that defines data flows that are permitted between identified ones of the resource nodes 1330 of FIG. 14 is and further defines associated triggering criteria for when identified ones of the data flows are to be performed. The interaction execution engine 1312 is configured to selectively establish the data flows between identified ones of the resource nodes 1330 of FIG. 14 in response to determining that associated triggering criteria defined by the interaction flow database 1308 are satisfied.

By making the relationship between resource nodes, as well as relationships between resource nodes and users, analogous to, e.g., social mapping principles like "friendship" (i.e. a notion of trust or ownership relationship and access control), example embodiments make data flows through resource node intuitive to understand and manage by users. Example embodiments utilize a recognizable resemblance to a social network in order to enable users to form a holistic mental model of potentially large numbers of networked resource nodes with simultaneous interconnections and interrelations with each other.

Referring again to FIG. 13, the recommendation engine 1310 is configured to generate recommended data flows between particular resource nodes 1330, and to provide the recommended data flows to the user for acceptance. The recommended data flows may be based on known characteristics of the user (e.g., personalized for the user), which may be recorded in the user profile database 1302, and/or may be the capabilities of the resource nodes 1330.

Figure 16:
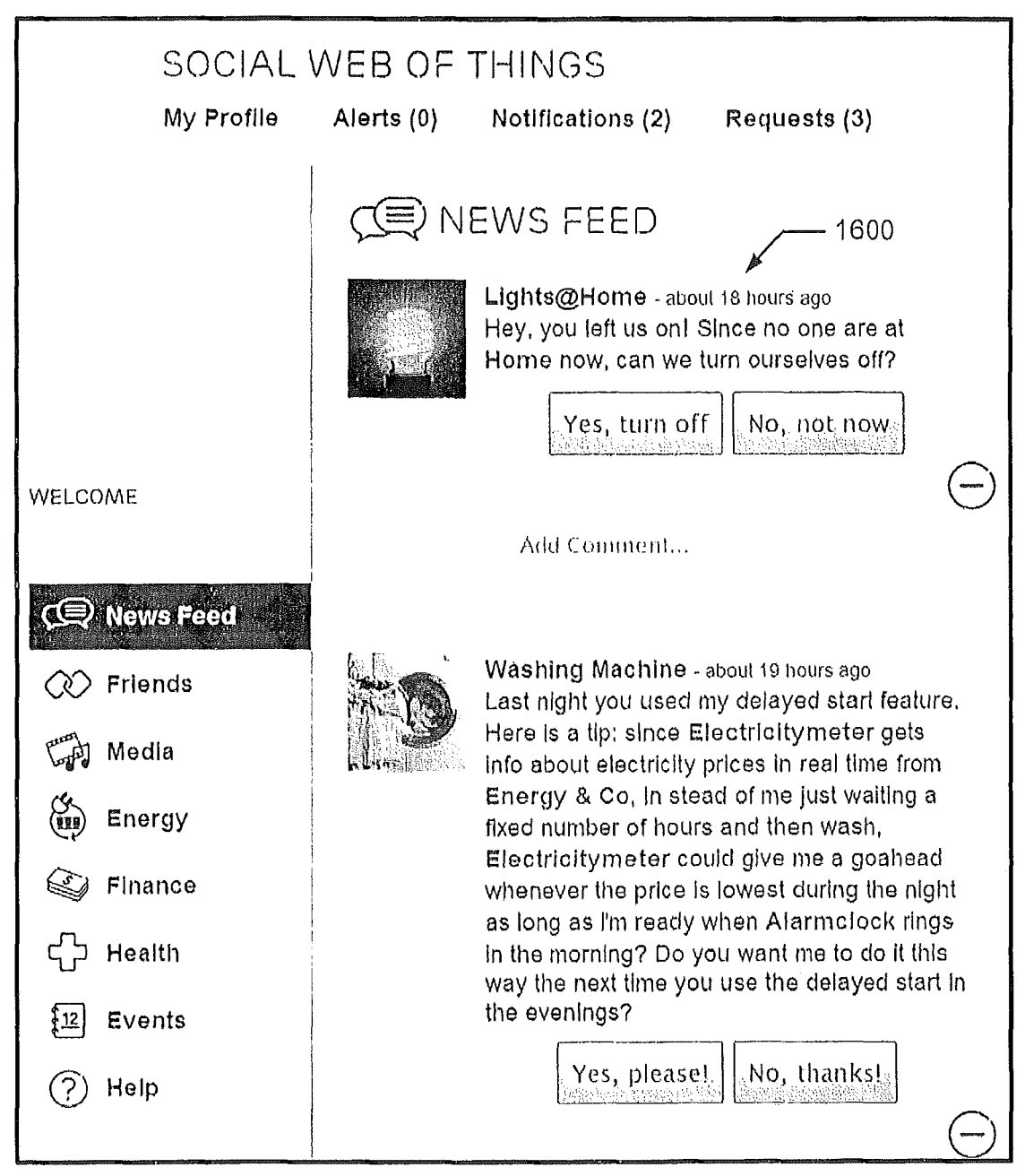
Figure 17:
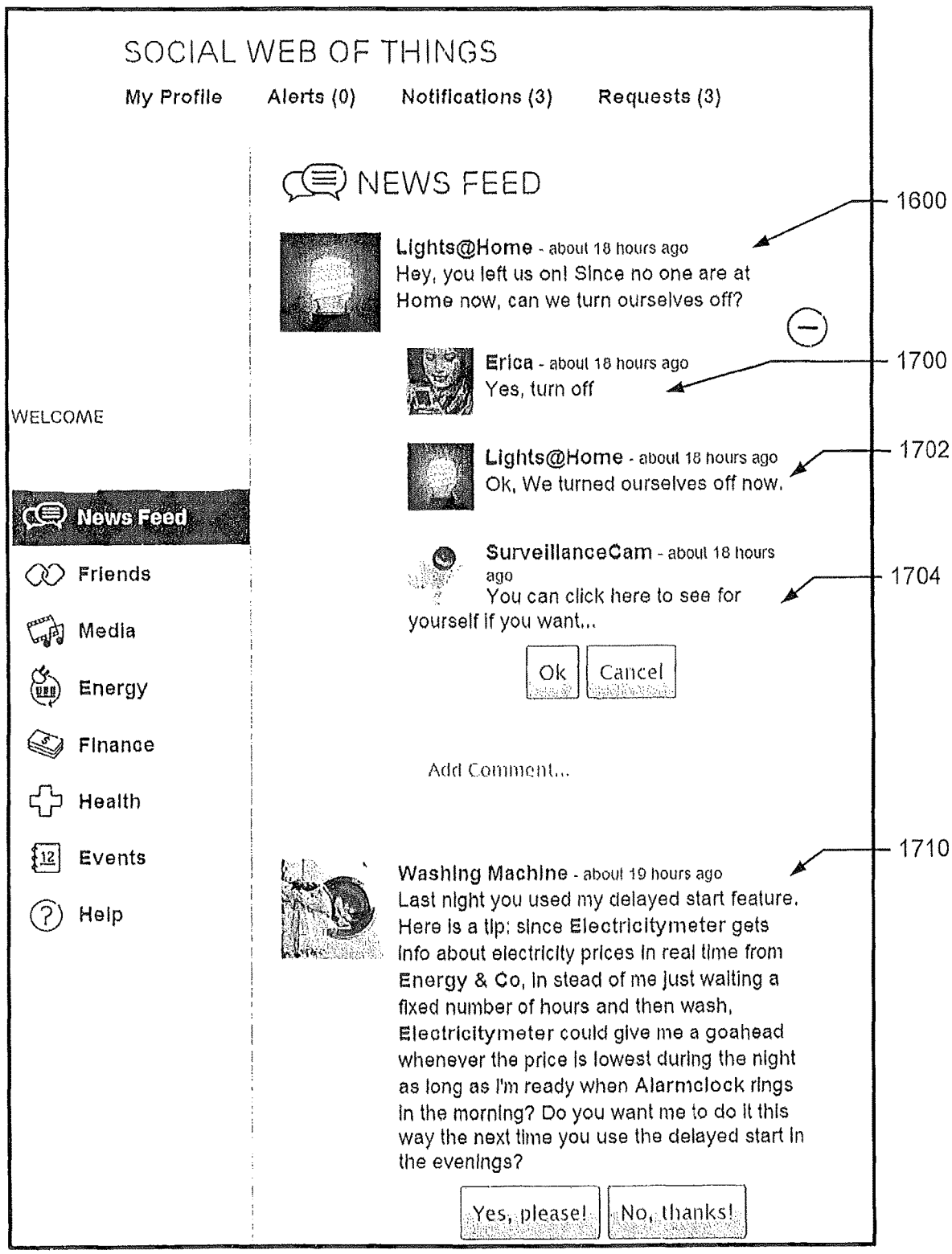
Figure 18:
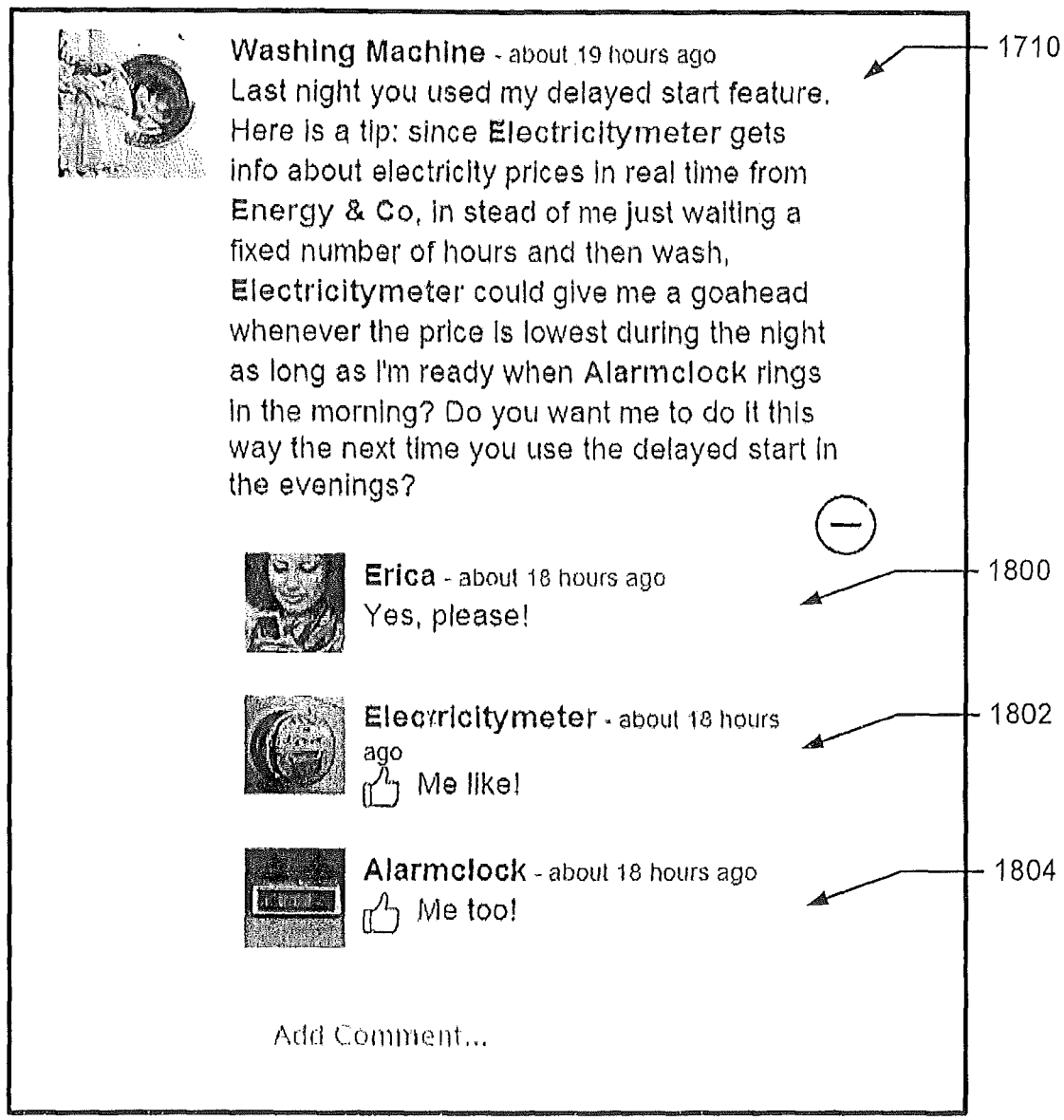

FIGS. 16-18 illustrate example information that can be displayed to a user to authorize and establish data flows between resource nodes according to example embodiments. Further operations and methods that may be performed by the resource management node 1300 in conjunction with the resource nodes 1330 are explained below with reference to FIGS. 16-18.

Referring to FIG. 16, the interaction execution engine 1312 determines that one or more lights have been left on more than a threshold time and responds by communicating a message to the user equipment node 1320 that displays information 1600 notifying the user of the extended operation of the lights and requesting the user's instructions for turning the lights off or leaving the lights on. In this example, the interaction execution engine 1312 may reside within the light controller or reside on a networked computing device that communicates with the light controller. The user equipment node 1320 can include a touch sensitive screen that allows a user to touch select one or more defined objects (e.g. buttons) that are displayed on the screen.

Referring to FIG. 17, the user has selected the illustrated "yes, turn off" button, which serves as a triggering event that causes the interaction execution engine 1312 to signal the light controller to turn off the lights, and to displayed a natural language response message 1702 informing the user that the lights have turned off. The interaction execution engine 1312 also determines, using information from the interaction flow database 1308, that a data flow has been established between the light controller and a, surveillance camera. In response to the triggering event, the interaction execution engine 1312 communicates another message to the user equipment node 1320 that displays information 1704 that queries whether the user wants to view a picture/video from the security camera to observe a room which may include the controlled lights. If the user selects the illustrated "Ok" button, a further triggering event causes the interaction execution engine 1312 to signal the security camera to output the picture/video that is supplied to the user equipment node 1320 for viewing by the user.

FIG. 17 also shows a natural language message 1710 that identifies a recommended data flow relating to the washing machine and provides an explanation of the functional capabilities that will be provided by the recommended data flow if accepted by the user. The recommended data flow may be generated by the recommendation engine 1310 using information from the system entity database 1304 which identifies capabilities of the washing machine, the electricity controller, the energy company controller interface, and the alarm clock. The recommendation engine 1310 has determined from information in the interaction flow database 1308 that the recommended data flow does not presently exist. The recommendation engine 1310 has further determined that the price of electricity can be obtained in real-time from the energy company controller interface, that the electricity controller can control the start time of the washing machine, and determined that the electricity controller can use the price of electricity and a planned wake-up alarm time defined in the alarm clock to make decisions for when the washing machine should be started.

Referring to FIG. 18, the user has selected the illustrated "yes" button, which serves as a triggering event that causes the recommendation engine 1310 to add information to the interaction flow database 1308 that identifies the recommended data flow from the energy company controller interface to the electricity meter, from the alarm clock to the electricity meter, and from the electricity meter to the washing machine. The information also identifies the triggering criteria that is used by the interaction execution engine to establish the recommended data flow, which may include when the price of electricity falls below a defined threshold value and/or a threshold time duration before a wake-up time defined by the alarm clock.

The interaction execution engine 1312 determines when the triggering criteria is satisfied (e.g., price of electricity has dropped below the define threshold value and/or less than a defined length of time remains before the wake-up time) and responds by turning on the washing machine.

The recommendation engine 1310 and/or the interaction execution engine 1312 can display a message 1800 confirming the user's acceptance of the recommended data flow, and can further display a messages 1802 and 1804 confirming establishment of the data flow with the electricity meter and the alarm clock, respectively.

Because at least some of the resource nodes 1330 may have incompatible input/output data formats, the interaction execution engine 1312 can be configured to determine from the system entity database 1304 when the data formats used to communicate between two or more of the resource nodes of a data flow are not compatible. The interaction execution engine 1312 can respond to the determination by using transcoding information that is defined in the system entity semantic description database 1306 to transcode data that is output by one of the resource nodes into a format that is compatible with the input of another one of the resource nodes to provide compatible communications. In this manner, communications between a greater number of resource nodes 1330 is enabled, and a data flows can then be created between those resource nodes 1330 to provide increased functionality for a user.

Figure 19:
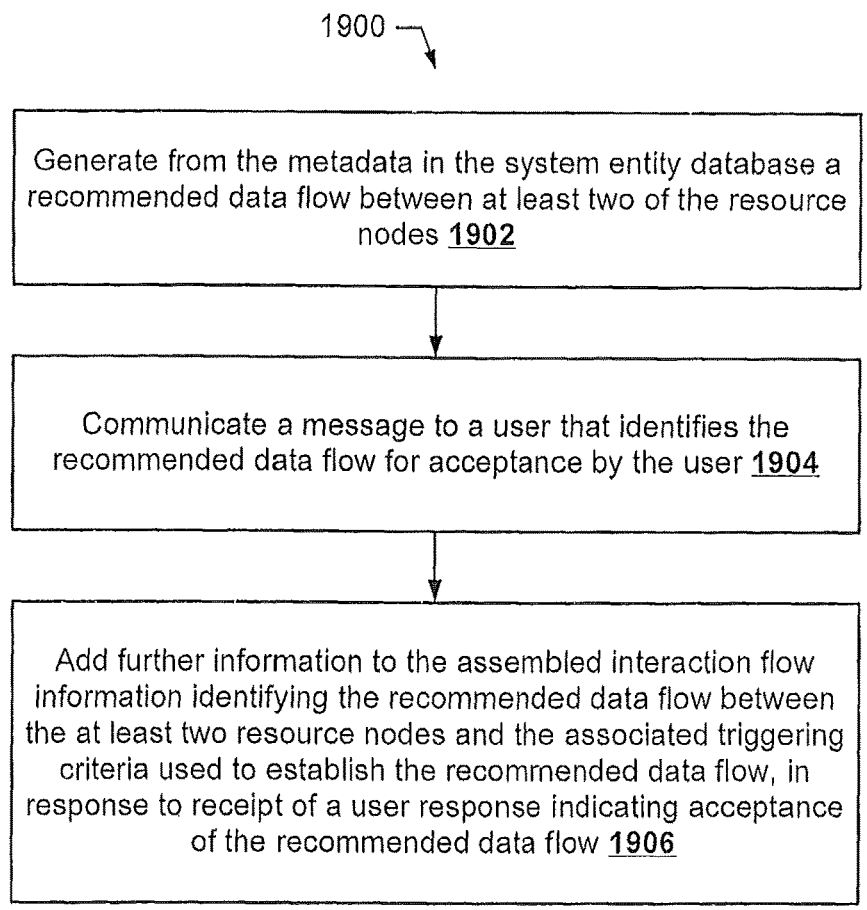
FIG. 19 is a flowchart depicting methods and operations for generating a recommended data flow for acceptance by a user according to an example embodiment.

These operations and methods 1900 for generating a recommended data flow for acceptance by a user are summarized by the flowchart of FIG. 19. Metadata in the system entity database 1304 is used to generate (block 1902) a recommended data flow between at least two of the resource nodes. A message is communicated (block 1904) to the user (e.g., the user equipment node 1320) that identifies the recommended data flow for acceptance by the user. Further information is added (block 1906) to the interaction flow database 1308 that identifies the recommended data flow between the lease to resource nodes and associated triggering criteria is used to establish the recommended data flow, in response to receipt of a user response indicating acceptance of the recommended data flow.

Figure 20:
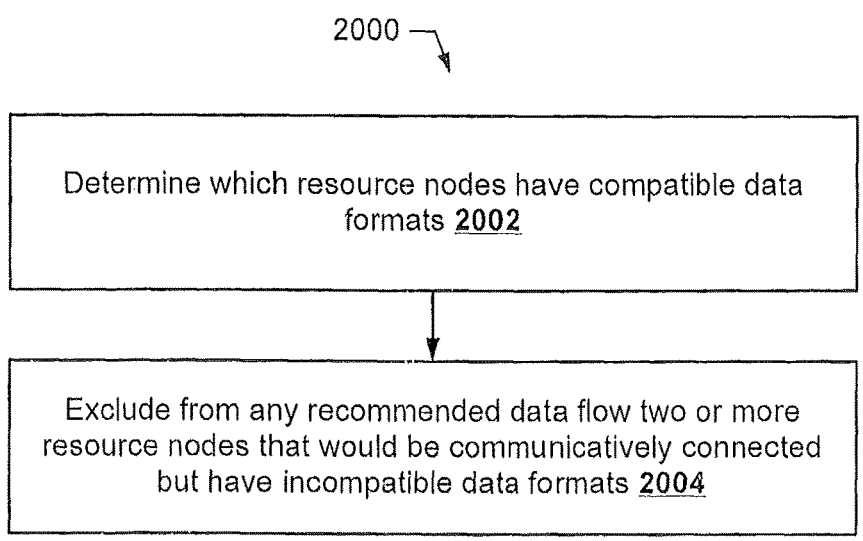
FIG. 20 is a flowchart depicting methods and operations for excluding incompatible resource nodes from any recommended data flow according to an example embodiment.

FIG. 20 is a flowchart depicting methods and operations 2000 for excluding incompatible resource nodes from any recommended data flow according to an example embodiment. The recommendation engine 1310 can determine (block 2002) which resource nodes have compatible data formats. The recommendation engine 1310 can then exclude (block 2004) from any recommended data flow two or more resource nodes that would be communicatively connected but have incompatible data formats.

Figure 21:
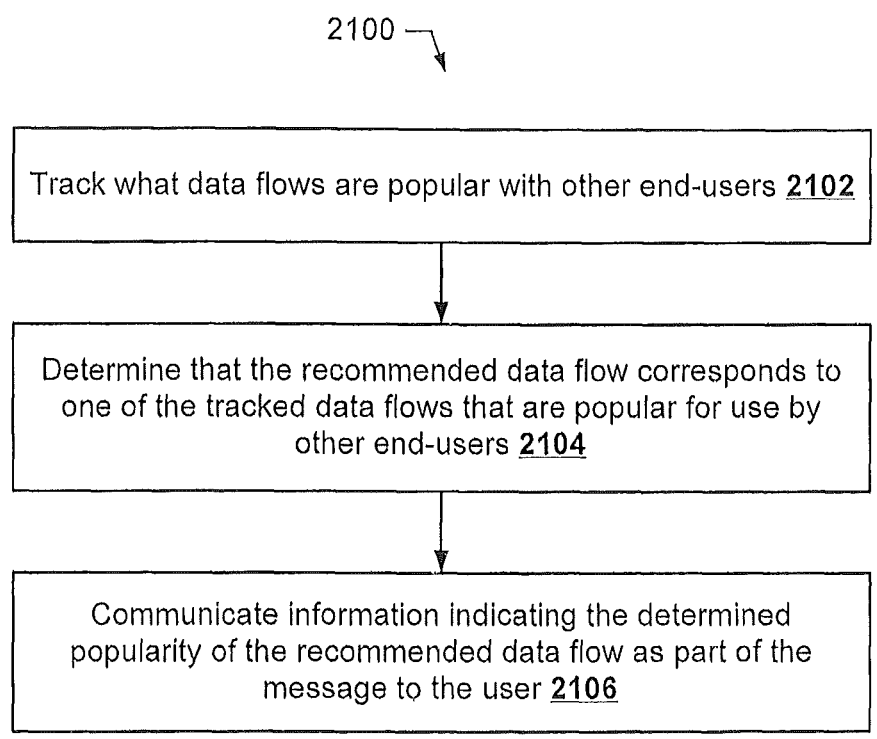
FIG. 21 is a flowchart depicting methods and operations for tracking popularity of data flows with other users and communicating an indication of the popularity of a recommended data flow to a user according to an example embodiment.

FIG. 21 is a flowchart depicting methods and operations 2100 for tracking popularity of data flows with other users and communicating an indication of the popularity of a recommended data flow to a user according to an example embodiment. The recommendation engine 1310 can track (block 2102) what data flows are popular with other end-users. Recommendation engine 1310 can further determine (block 2104) that the recommended data flow corresponds to one of the tracked data flows that are popular for use by other end-users, and can communicate (block 2106) information indicating the determined popularity of the recommended data flow as part of the message to the user. The popularity information can improve the user's ability to select more productive/enjoyable functional data flows which have been operationally confirmed by other users.

In some embodiments, the recommendation engine 1310 communicates with an interaction flow designer 1324 to receive one or more recommended data flows that are defined between at least two of the resource nodes. The interaction flow designer 1324 may be a user and/or electronic component having an access rights level that allows creation of data flows which define how applications and/or connected resource devices will communicate with each other and operate to provide defined functionality. The recommendation engine 1310 communicates the received one or more recommended data flows to the user equipment node 1320 for acceptance. The recommendation engine 1310 responds to one or more messages indicating the user's acceptance of a selected one or more of the recommended data flows by adding information to the interaction flow database 1308 that identifies the selected one or more of the recommended data flows and establishes the associated data flows and triggering criteria used by the interaction execution engine 1312 to establish the one or more of the recommended data flows.

In some embodiments, the user profile database 1302 contains information that identifies what data flows identified by the interaction flow database 1308 have been accepted by the user. The recommendation engine 1310 is further configured to generate the recommended data flow using the user profile database 1302, the system entity database 1304, and the interaction flow database 1308 to identify which resource nodes the user can access and identify at least one new data flow between user accessible ones of the resource nodes. The at least one new data flow is different than other data flows that are active for the user. Accordingly, the recommendation engine 1310 communicates the at least one new data flow as the recommended data flow to the user equipment node 1320 for acceptance by the user.

In some embodiments, the user profile database 1302 contains information identifying user access credentials that are used to access corresponding ones of the resource nodes. The recommendation engine 1310 is further configured to restrict the recommended data flow to being with the resource nodes having corresponding user access credentials identified by the user profile database. Accordingly, data flows are not offered to the user when the user's access credentials do not allow access to one or more of the resource nodes that would be involved in the data flows. The recommendation engine 1310 may be configured to test the user access credentials to confirm that the interaction execution engine 1312 can establish a data flow between corresponding resource nodes before adding the recommended data flow to the interaction flow database 1308. The interaction execution engine 1312 may be configured to use the user access credentials identified by the user profile database 1302 to connect when establishing a data flow between corresponding resource nodes.

Data for the user profile database 1302 may be imported or aggregated from existing user profiles of known web-based social network services such as Facebook, MySpace, and LinkedIn, SecondLife, and on-line gaming applications, or from the users' data connected to a subscription with an operator. Groups of users could be created among users living within the same household, or other attributes that the user has decided to share. User profiles can be made visible and linked with the profiles of other users of a group if the users wish to do so.

Figure 22:
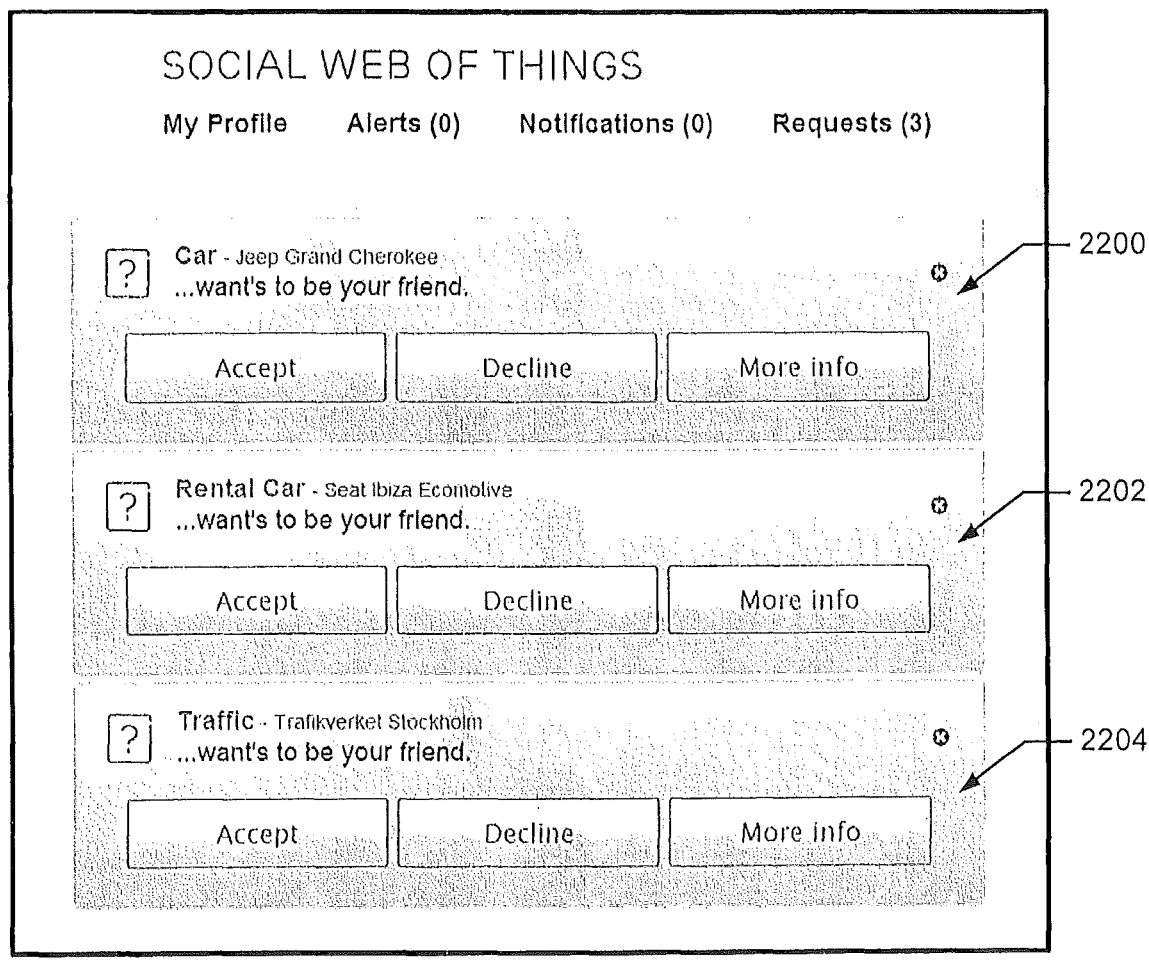
Figure 23:
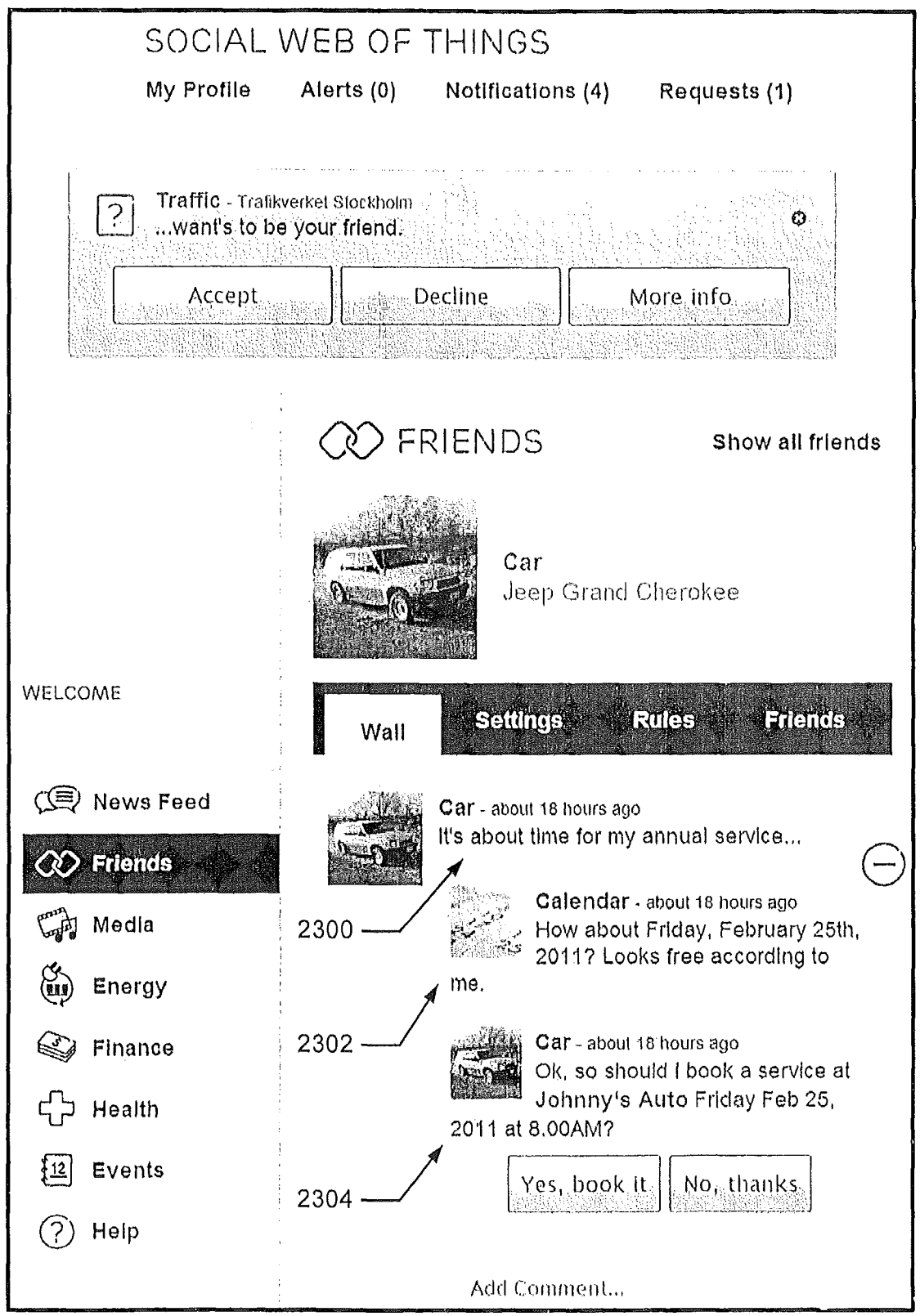

FIGS. 22-24 illustrate example information that can be displayed to a user, on a touch sensitive screen of the user equipment node 1320, to manage resource nodes and data flows therebetween using friendship requests according to example embodiments. Referring to FIG. 22, the recommendation engine 1310 generates a friendship request 2200 for electronics within the user's car, another friendship request 2202 for electronics within a rental car, and another friendship request 2204 for the traffic monitoring server. The requests 2200, 2202, and 2204 are displayed on the user equipment node 1320 for acceptance by the user. The user accept, decline, or request more information from the recommendation engine 1310 by selecting correspondingly marked "Accept", "Decline", or "More info" keys.

Referring to FIG. 23, example information is shown that may be displayed on the user equipment node 1320 when the user has accepted friendship request 2200 from the user's car by selected the "Accept" button. In response to the user selecting the friend request 2200, the recommendation engine 1310 can recommend to the user a data flow the established between a calendar application and the user's car and, if accepted, can add the data flow to the interaction flow database 1308. The interaction execution engine 1312 can establish the defined data flow to receive data from the user's car that identifies upcoming maintenance service events, and determine the user's availability for scheduling the maintenance service event using the user's schedule recorded in the calendar application.

The interaction execution engine 1312 may display a maintenance message 2300 that identifies the upcoming maintenance service event, display a scheduling message 2302 indicating a proposed date when the user's schedule is free according to the calendar application, and display an action message 2304 indicating that the car can book the service at the identified auto repair establishment at the indicated time of day and requesting the user's authorization to proceed with the booking.

FIG. 24 illustrates an example data flow recommendation message 2400 that the recommendation engine 1310 may communicate to the user equipment node 1320 for display to a user. The data flow recommendation message 2400 identifies, using natural language formatted description, a first recommended data flow between a rental car and a media server device and a phone terminal that will enable movies and music to be streamed from the media server device in the fund terminal through an entertainment system in the rental car, and will further enable the entertainment system to be used for hands-free calling through the phone terminal. The data flow recommendation message 2400 further identifies, using natural language formatted description, a second recommended data flow between the rental car, a map application, and a navigator application (e.g. street navigation application) that will enable driving routes and places that the user has stored in the map application to be used by the navigator to provide real-time driving instructions to the user.

The system entity semantic description database 1306 can contain transcoding information that is used by the recommendation engine 1310 for transcoding data from one or more data flows to a natural language description for communication to the user. The interaction execution engine 1312 may also use the transcoding information from the system entity semantic description database 1306 to transcode data in the established recommended data flow to a natural language description that is communicated to the user.

The user can establish a friendship status between the identified resource nodes by selecting the "Add All 4 . . . " button, or can select which of the resource nodes are to have friendship satisfy selecting the "Add some . . . " button. The interaction execution engine 1312 adds the selected friendship relationships and associated data flows to the interaction flow database 1308. These relationships and data flows are temporary, with the interaction execution engine 1312 removing them from the interaction flow database 1308 in response to the map application and/or the navigator application determining that the rental car has been returned to the rental company and/or in response to occurrence of a defined elapsed time, time of day, and/or date.

In response to the user authorizing the recommended data flows, the interaction execution engine 1312 may receive further information from the rental car indicating that it is ready be picked up at the identified rental company having the identified locations, and communicates a message 2402 containing that information to the user from another 1320 for display to the user.

Figure 25:
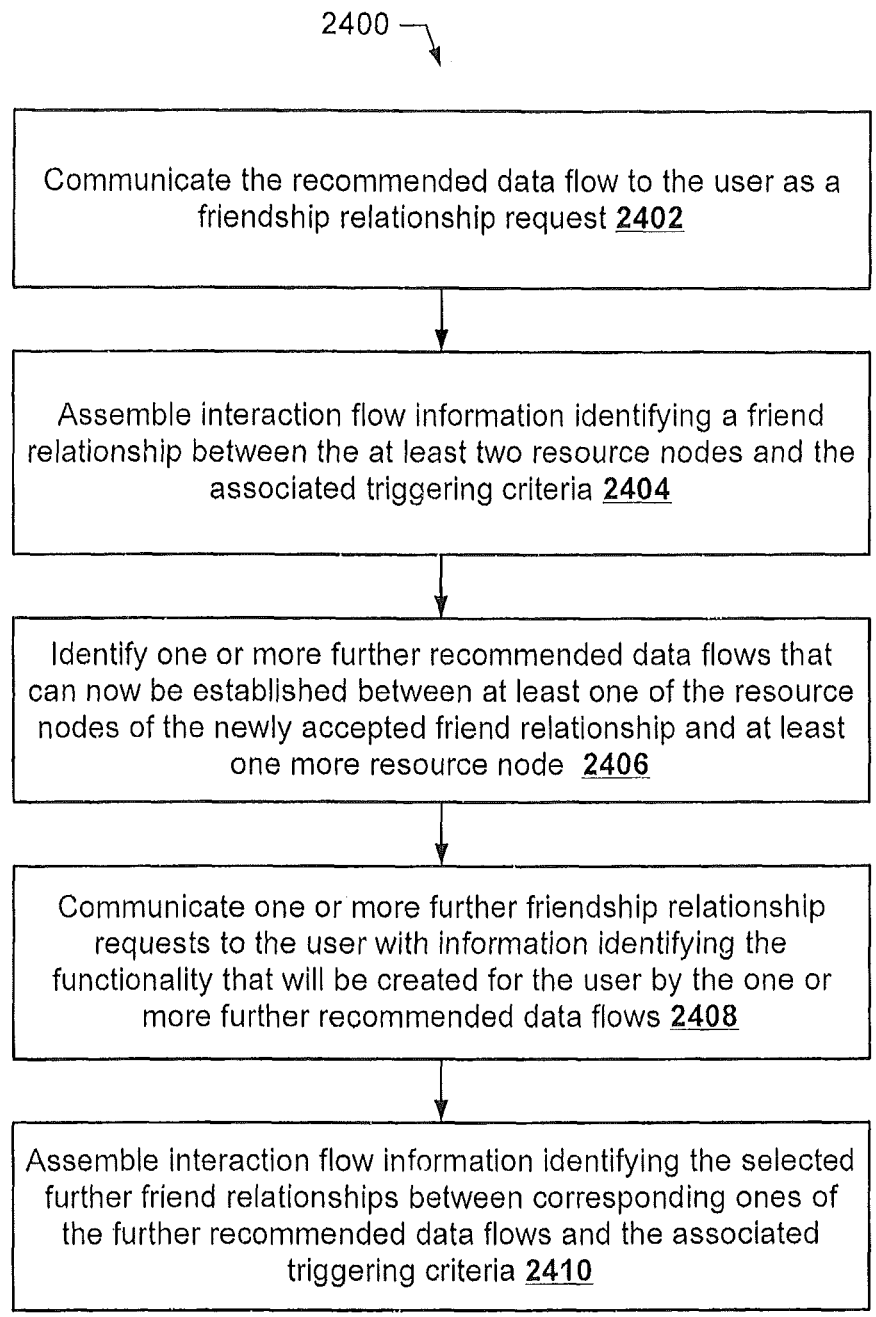
FIG. 25 is a flowchart depicting methods and operations for managing resource nodes and data flows therebetween using friendship requests in a social web according to an example embodiment.

These operations and methods 2400 for managing resource nodes and data flows therebetween using friendship requests in a social web are further illustrated by the flowchart of FIG. 25. The recommended data flow is communicated (block 2402) to the user as a friendship request.

Interaction flow information identifying a friend relationship between the at least two resource nodes and the associated triggering criteria is assembled (block 2404) (e.g. added to the interaction flow database 1308), in response to a message indicating the user's acceptance of the friendship request. The recommendation engine 1310 identifies (block 2406) one or more further recommended data flows that can now be established between at least one of the resource nodes of the newly accepted friend relationship and at least one more resource node, in response to the message indicating the user's acceptance of the friendship request.

The recommendation engine 1310 communicates (block 2408) one or more further friendship requests to the user with information identifying the functionality that will be created for the user by the one or more further recommended data flows. The recommendation engine 1310 then assembles interaction flow information (e.g., added to the interaction flow database 1308) identifying the selected further friend relationships between corresponding ones of the further recommended data flows and the associated triggering criteria, in response to one or more messages indicating the user's acceptance of selected one or more of the further friendship requests.

Figure 26:
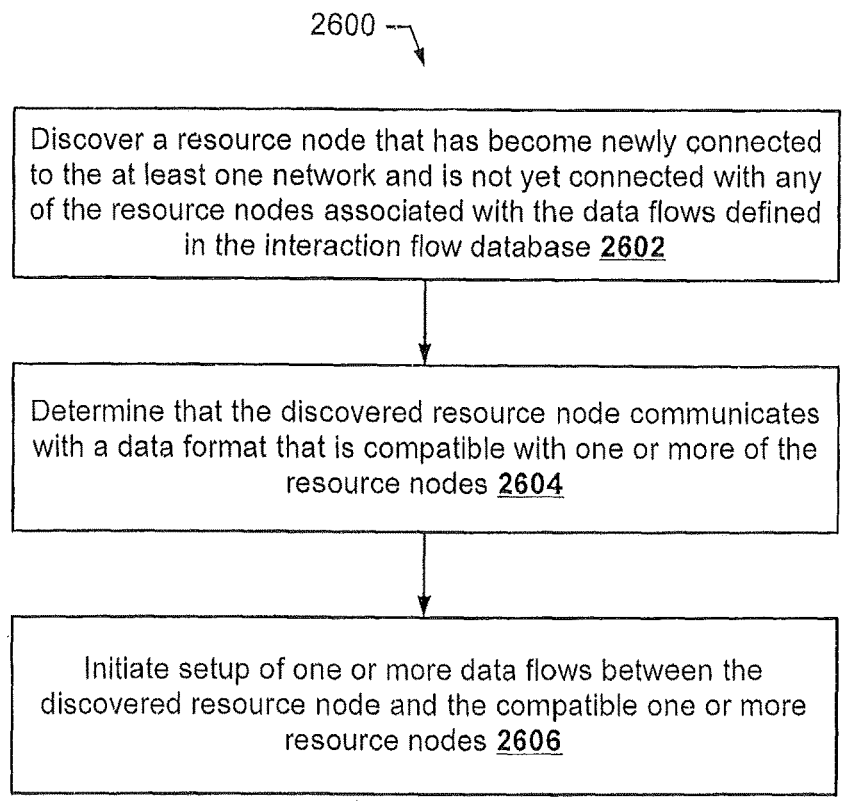
FIG. 26 is a flowchart depicting methods and operations for managing data flows between resource nodes responsive to discovery of a newly connected resource node according to an example embodiment.

FIG. 26 is a flowchart depicting methods and operations 2600, which may be performed by the recommendation engine 1310, for managing data flows between resource nodes responsive to discovery of a newly connected resource node according to an example embodiment. A resource node is discovered (block 2602) which has become newly connected to the network 1380 and has not yet connected with any of the resource nodes associated with the data flows defined in the interaction flow database 1308. It is determined (block 2604) that the discovered resource node communicates with a data format that is compatible with one or more of the resource nodes. Setup of one or more data flows between the discovered resource node and the compatible one or more resource nodes is initiated (block 2606) in response to the determination.

Figure 27:
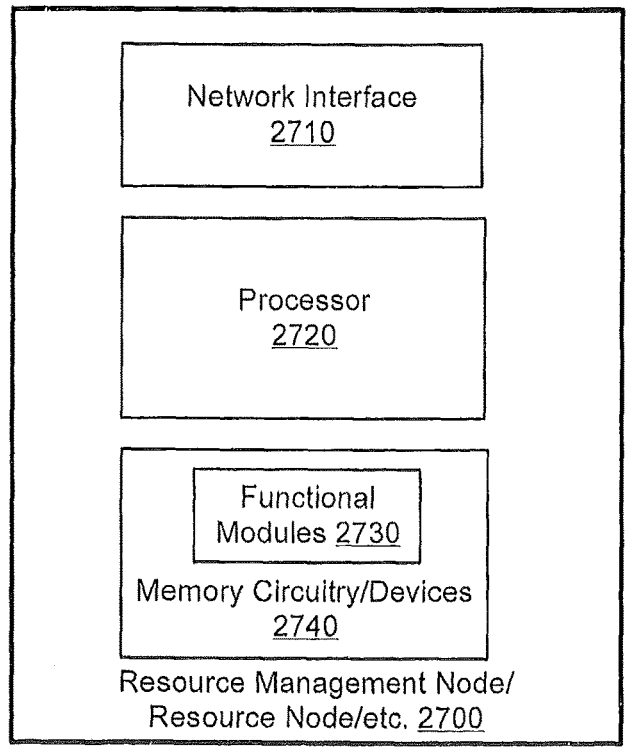
FIG. 27 is a block diagram of example components that may be included in the resource management node, one or more of the resource nodes, and/or the user equipment node of the system of FIG. 13 configured according to some embodiments.

FIG. 27 is a block diagram of example components that may be included in the resource management node 1300, one or more of the resource nodes 1330, and/or the user equipment node 1320 of the system of FIG. 13 configured according to some embodiments. Referring to FIG. 27, the node 2700 includes one or more network interfaces 2710 (e.g., wired and/or wireless interfaces (cellular, WLAN, Bluetooth, etc.)) for connection to the one or more networks 1380, one or more processors 2720, and memory circuitry/devices 2740 that contain functional modules 2730.

The processor(s) 2720 may include one or more data processing circuits, such as a general purpose and/or special purpose processor (e.g., microprocessor and/or digital signal processor). The processor(s) 2720 is configured to execute computer program instructions from the functional modules 2730 in the memory circuitry/devices 2740, described below as a computer readable medium, to perform some or all of the operations and methods that are described above for one or more of the embodiments, such as the embodiments of FIGS. 1-26.

Establishing Functional Interconnections Between Application Modules and Managing Communications Between the Application Modules to Provide a Social Web of Things Numerous embodiments have been explained above for managing data flows between networked resource nodes and generating recommendations for data flows that can be accepted or declined according to social mapping principles to provide, for example, a Social Web of Things (SWOT). Some further embodiments described below are directed to operations and methods for establishing functional interconnections between application modules that are executed by one or more resources nodes, and managing communications between the application modules.

There has been tremendous growth in the number of application modules that are available for use on resources nodes. It has become commonplace for users to select among large libraries of application modules that are available for download to smart phones, tablet computers, televisions, automobiles, and other types of resource nodes. While each of these application modules is designed to provide various defined functionality, the application modules typically lack the ability to communicate with one another. Consequently, an application module is rarely capable of being functionally integrated with another application module, even when both application modules are configured to be hosted on a same resource node. Moreover, application modules that are produced by different developers and/or written to be executed on different types of platforms (e.g., Android operating system, Apple operating system, Microsoft operating system, etc.) typically have incompatible interfaces.

Some embodiments disclosed herein are directed to enabling and automating establishment of functional interconnections between two or more application modules that are on a same resources node and/or between two or more application modules that are on different resources nodes. Communication traffic that is output by one application module can be translated to provide compatibility for use by, and routed to, another functionally interconnected application module. Accordingly, although traffic that is output by one application module is not compatible for directly input to, and functional use by, another application module, the traffic can be translated to provide translated traffic that is compatible for input and functional use by the other application module. Related translation operations and methods may, for example, be carried out to provide bidirectional communications between two or more functional modules, and/or may be carried out to provide sequential communications through daisy chained functional modules or any other interconnection architecture of functional modules.

Figure 28:
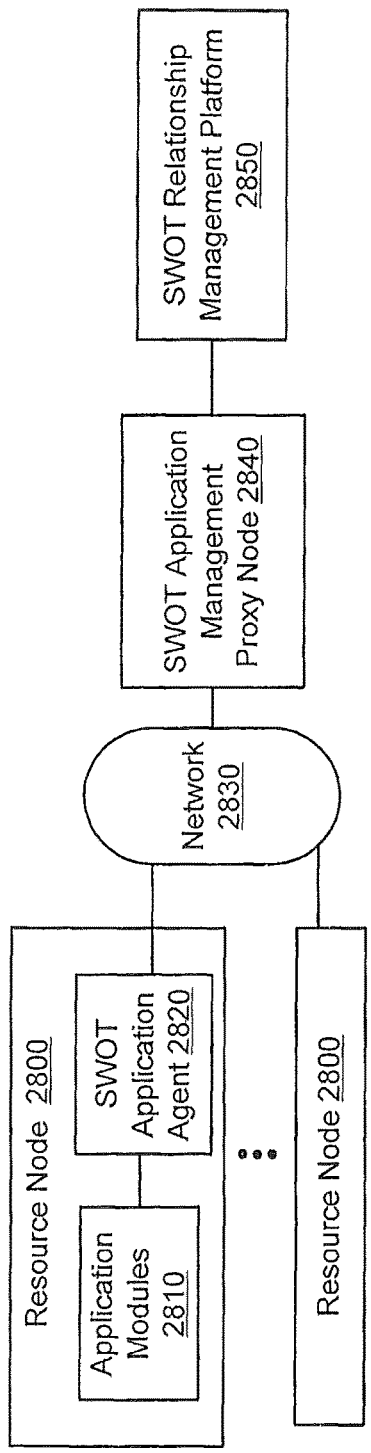
FIG. 28 depicts another architecture that includes application modules that are functionally interconnected by an application agent and an application management proxy node using operations and methods according to some embodiments.

FIG. 28 depicts an architecture that includes an application management proxy node 2840 that manages interconnections between application modules 2810 on a plurality of resource nodes 2800 that are connected to at least one network 2830 (e.g., a personal network (PN), a public network (Internet), etc.). Each of the resource nodes 2800 includes at least one application module 2810 and a SWOT application agent 2820.

Figure 30:
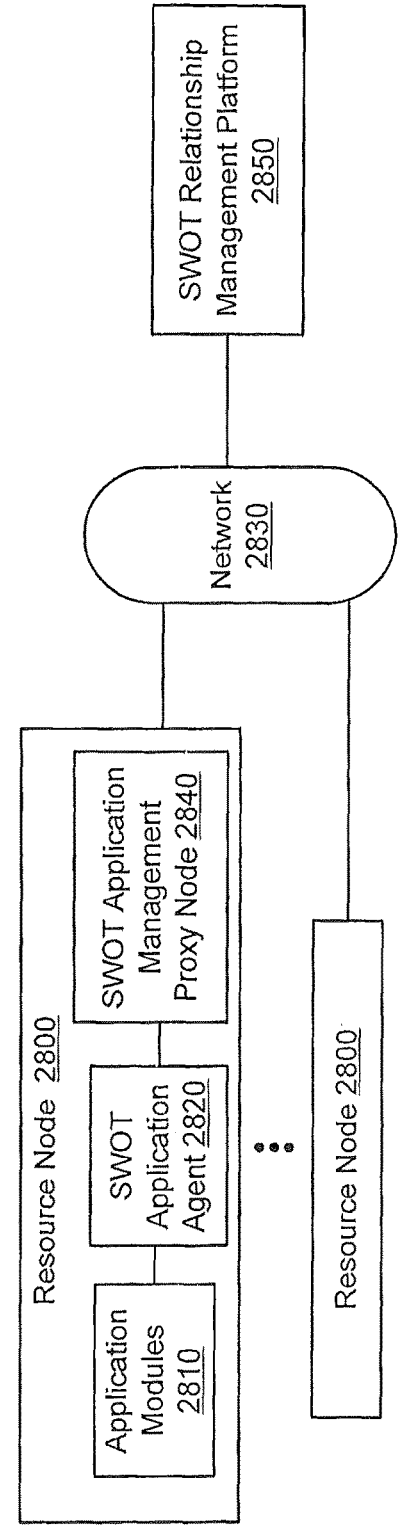
FIG. 30 depicts another architecture in which an application management proxy node is part of a resource node and operates to functionally interconnect an application agent to a relationship management platform through a network using operations and methods according to some embodiments.

Although some embodiments are explained in the context of the architecture of FIG. 28 where the application management proxy node 2840 is connected to the resource node 2800 through the network 2830, other embodiments are not limited thereto. For example, as shown in FIG. 30, the application management proxy node 2840 may be part of the resource node 2800 and connect to the relationship management platform 2850 through the network 2830. Other alternative architectures will become apparent in view of the present disclosure and are intended to be covered by the present disclosure.

Various operations and methods that can be performed by the resource node 2800, the application management proxy node 2840, and/or the relationship management platform 2850 are explained below with regard to the flowcharts of FIGS. 31-44.

Each of the application modules 2810 is configured to be executed by, and control operation of, the resource node 2800 to provide corresponding defined functionality. The resource nodes 2800 may each be configured as described above regarding FIG. 27, so that the application modules 2810 may comprise various components illustrated therein. The application modules 2810 may include, for example, applications that have been downloaded and installed from, for example, Internet accessible databases such as Apple's iTunes application store, the Android Market application store, Microsoft's application store, and/or resource node manufacturer affiliated application stores. Such applications can be executed by the processor 2720 from the memory 2740.

The application agent 2820 can establish and manage a communication interface between application modules 2810 and the application management proxy node 2840. Referring to the operations and methods of the flowchart of FIG. 31, the application agent 2820 is configured to communicate (block 3100) with the application management proxy node 2840 to establish functional interconnections between two or more of the application modules 2810 of the resource node 2800 and/or between at least one of the application modules 2810 of the resource node 2800 and at least one of the application modules 2810 of the other resource node 2800. The application agent 2820 is also configured to translate (block 3102) communication traffic to provide compatible communications between the application modules 2810 that are functionality interconnected.

In some embodiments, the application agent 2820 translates communications to provide compatible communications between application modules 2810 to enable them to be functionally interconnected to provide enhanced combined functionality. Referring to the operations and methods of the flowchart of FIG. 32, the application agent 2820 can be further configured to receive (block 3200) communications from source ones of the application modules 2810, where the received communications are incompatible for use by corresponding functionally interconnected destination ones of the application modules 2810. The application agent 2820 can translate (block 3202) the received communications into translated communications that are compatible for use by the corresponding functionally interconnected destinations application modules 2810.

In some embodiments, the application management proxy node 2840 operates to translate communications to provide compatible communications between application modules 2810. Referring to the operations and methods of the flowchart of FIG. 33, for a source application module that is functionally interconnected to a destination application module, the application agent 2820 is further configured to route (block 3300) communications from the source application module through the application management proxy node 2840. The application management proxy node 2840 translates the received communications into translated communications that are provided to the destination application module and which are compatible for use by the destination application module.

Accordingly, the application agent 2820 on the resource node 2800 and/or the application management proxy node 2840 can perform communication translation between application modules 2810 to facilitate functional interconnection of the application modules 2810.

The application modules 2810 may be communicatively interconnected (through respective agents and the application management proxy node) to provide a data packet (e.g., sensor data, instruction, command, or other digital information) from an output interface of an application module to an input interface of another application module. However, such one-to-one mapping between output and input interfaces of application modules is not required. In some embodiments, a data packet from the output interface of one application module can be converted into a plurality of data packets that are provided to the input interfaces of a plurality of application modules.

Figure 34:
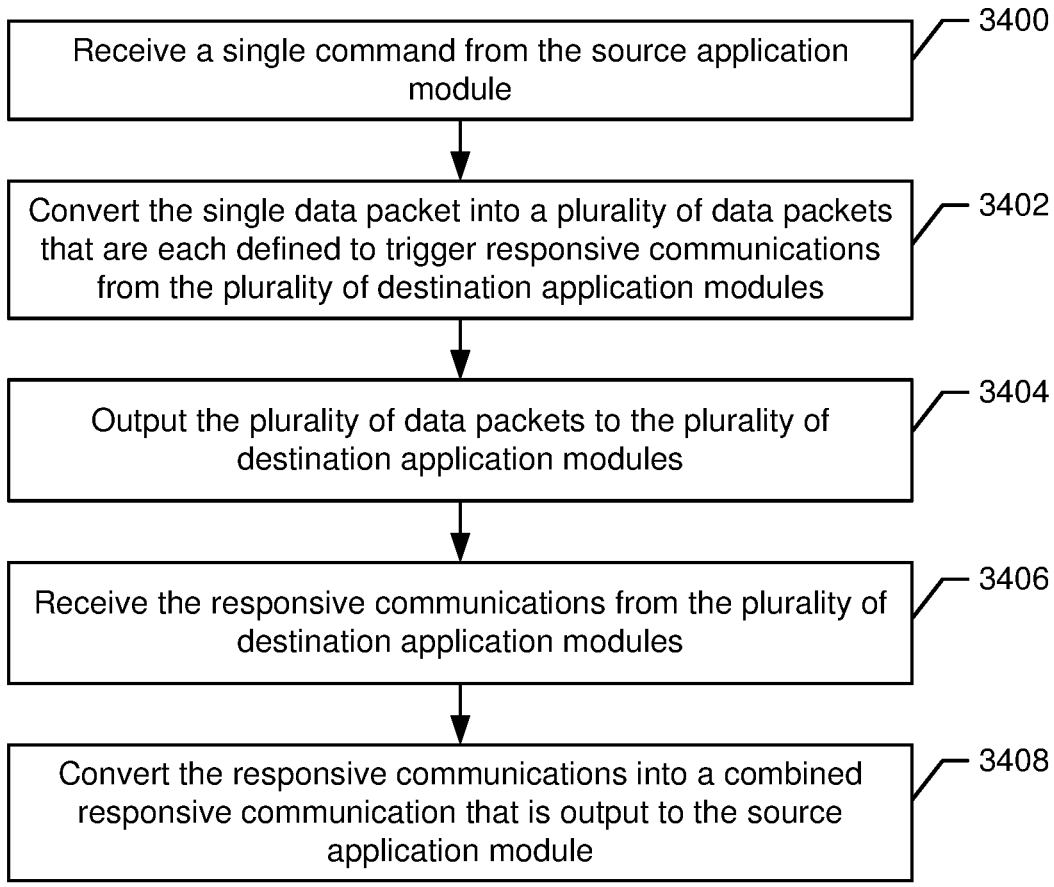
Figure 35:
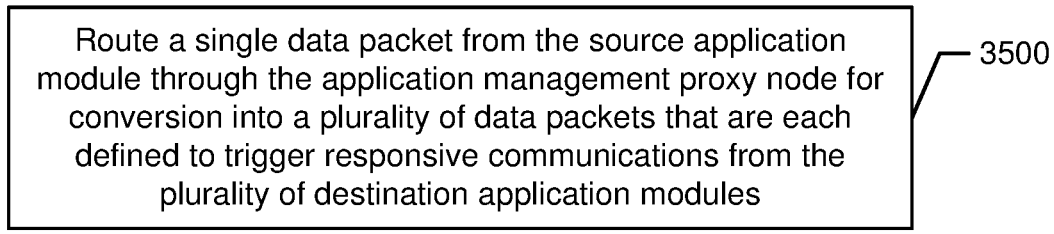
Figure 36:
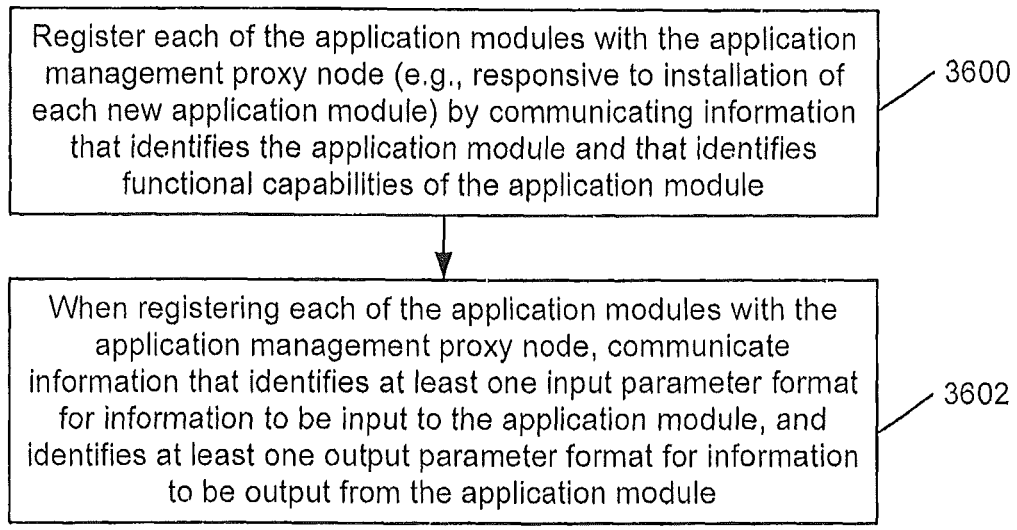

Accordingly, referring to the operations and methods of the flowchart of FIG. 34, for a source application module 2810 that is functionally interconnected to a plurality of destination application modules 2810, the application agent 2820 can be further configured to receive (block 3400) a single data packet from the source application module 2810, to convert (block 3402) the single data packet into a plurality of data packets that are each defined to trigger responsive communications from the plurality of destination application modules 2810. The application agent 2820 then outputs (block 3404) the plurality of data packets to the plurality of destination application modules 2810.

Similarly, data packets from a plurality of output interfaces of application modules can be combined into a single combined data packet that is provided to the input interface of an application module. For example, to facilitate bidirectional communications between the source application module 2810 and the plurality of destination application modules 2810, the application agent 2820 can be further configured to receive (block 3406) the responsive communications from the plurality of destination application modules 2810, and convert (block 3408) the responsive communications into a combined responsive communication that is output to the source application module 2810.

In some embodiments, the application management proxy node 2840 operates to convert a data packet from one output interface of an application module into a plurality of data packets that are provided to the input interfaces of a plurality of application modules. Referring to the operations and methods of the flowchart of FIG. 35, for a source application module 2810 that is functionally interconnected to a plurality of destination application modules 2810, the application agent 2820 is further configured to route (block 3500) a single data packet from the source application module 2810 through the application management proxy node 2840 for conversion into a plurality of data packets that are each defined to trigger responsive communications from the plurality of destination application modules 2810.

Functional interconnections between the application modules 2810 can be facilitated or automated by operations and methods that register the identities and functional capabilities of the application modules 2810 with a network node, such as the application management proxy node 2840, and that identify compatible functional capabilities of the application modules 2810 that can be combined to provide enhanced combined functionality. Referring to the operations and methods of the flowchart of FIG. 36, the application agent 2820 can be further configured to register (block 3600) each of the application modules 2810 with the application management proxy node 2840 by communicating, to the application management proxy node 2840, information that identifies the application module 2810 and that identifies functional capabilities of the application module 2810.

The application agent 2820 may further communicate, to the application management proxy node 2840, information identifying input and output parameter formats to be used when communicating traffic to/from particular application modules 2810. In one embodiment, when registering each of the application modules 2810 with the application management proxy node 2840, the application agent 2820 communicates (block 3602) information that identifies at least one input parameter format for information to be input to the application module, and identifies at least one output parameter format for information to be output from the application module.

Installation of an application module 2810 may automatically trigger its registration by the application agent 2820 with the application management proxy node 2840. In one embodiment, the application agent 2820 is further configured to respond (block 3600) to installation of a new application module on the resource node 2800 by registering the new application module with the application management proxy node 2840.

Figure 29:
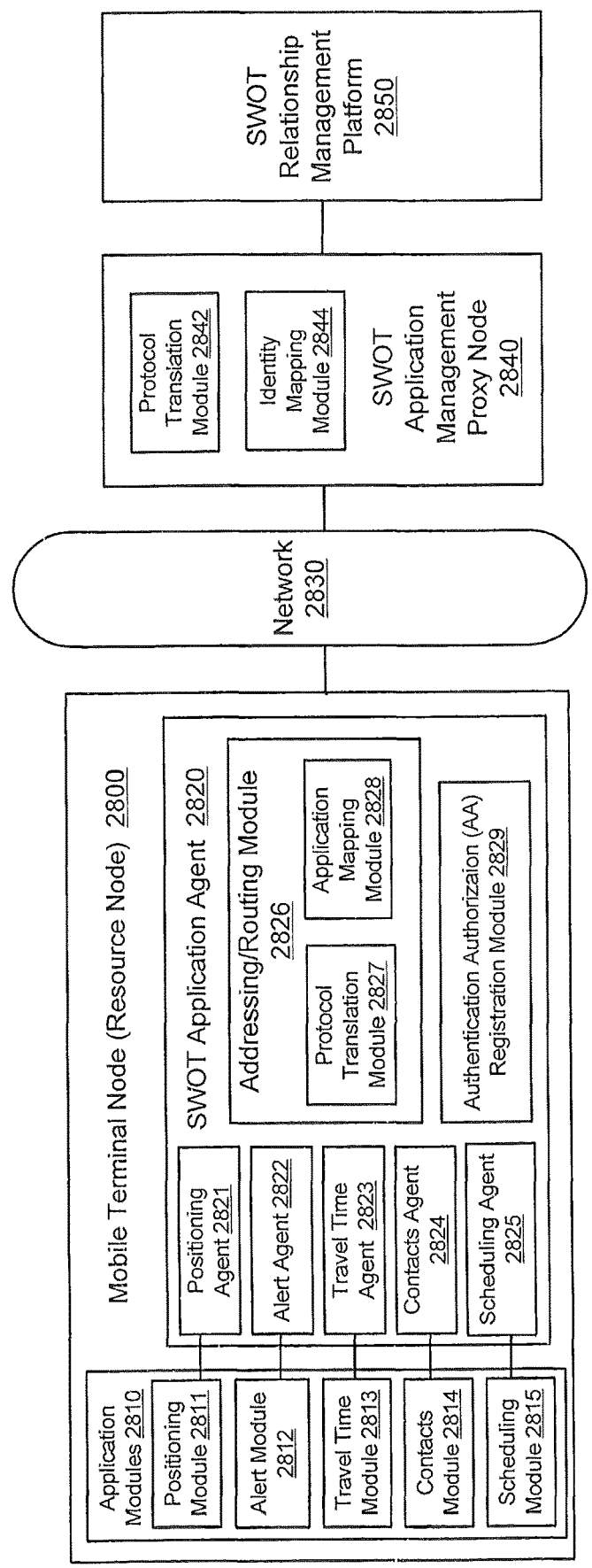
FIG. 29 is a block diagram of the resource node and the application management proxy node of FIG. 28 according to some embodiments.
Figure 31:
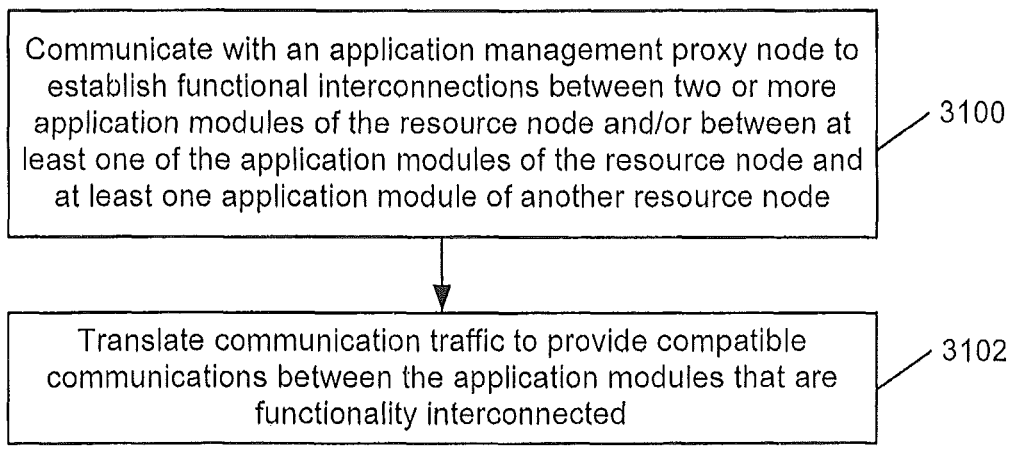
FIGS. 31-44 are flowcharts and data flow diagrams of operations and methods that can be performed to functionally interconnect application modules in accordance with some embodiments.
Figure 32:
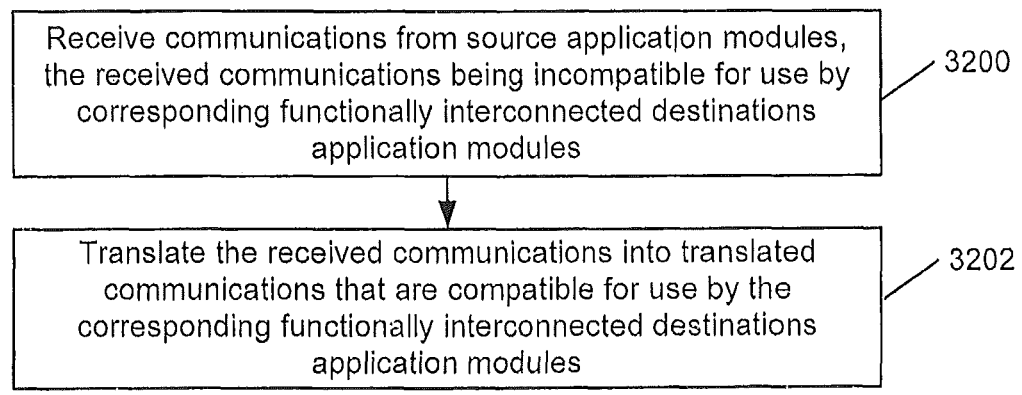
Figure 33:
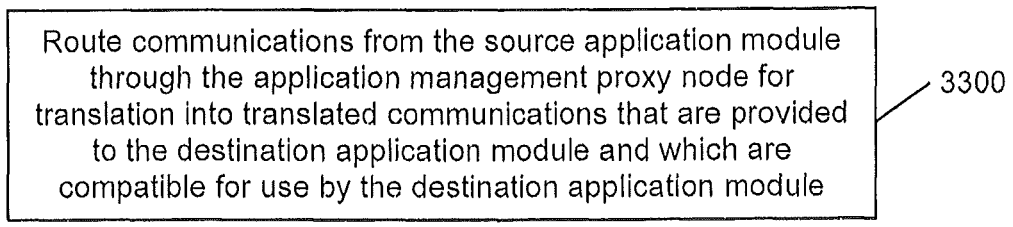

Further Configuration of the Resource Node and the Application Management Proxy Node FIG. 29 illustrates a more detailed block diagram of the architecture of FIG. 28 that is configured according to some further embodiments. Referring to FIG. 29, the resource node 2800 can be a mobile terminal node, which for purposes of explanation of various embodiments without limitation to other embodiments, has been illustrated as having a position module 2811, an alert module 2812, a travel time module 2813, a contacts module 2814, and a scheduling module 2815. The positioning module 2811 is configured to determine a present geographic location of the mobile terminal node. The alert module 2812 is configured to generate an audible, visual, and/or tactile (e.g. vibration) alert notification to a user. The travel time module 2813 is configured to determine a travel time between two locations (e.g., driving, cycling, and/or walking directions and the corresponding expected travel time). The context module 2814 is configured to maintain contact information for mobile terminals and other resource nodes. The scheduling module 2815 is configured to maintain and manage a schedule of activities relative to a calendar and clock.

The application agent 2820 can include a plurality of agents, each of which corresponds to one of the application modules 2810 and functions to establish and manage a communication interface between one of the application modules 2810 and an addressing/routing module 2826. Thus, for example, a positioning agent 2821 can establish and manage a communication interface with the positioning module 2811, an alert agent 2822 can establish and manage a communication interface with the alert module 2812, a travel time agent 2023 can establish and manage a communication interface with the travel time module 2813, a contacts agent 2824 can establish and manage a communication interface with the contacts module 2814, and a scheduling agent 2825 can establish and manage a communication interface with the scheduling module 2815.

The addressing/routing module 2826 can include a protocol translation module 2827 that is configured to translate communication traffic from one application module 2810 to be compatible with another chart for use with another application module 2810, such as described above with regard to FIG. 31. The protocol translation module 2827 may alternatively or additionally be configured to convert a data packet from one application module 2810 into a plurality of data packets that are each defined to trigger responsive communications from a plurality of other application modules, and/or to receive and combined communications from a plurality of application modules into a combined communication that is provided to another communication module, such as described above with regard to FIG. 34.

The addressing/routing module 2826 can further include an application mapping module 2828 that is configured to functionally interconnect the application modules 2810, responding to a communication received from a source application module 2810, and which may have been translated by the protocol translation module 2827, by identifying one or more destination application modules 2810 that are functionally interconnected to the source application module 2810 and forwarding to the communication (or translated communication) to the one or more destination application modules 2810.

The application agent 2826 may further include an authentication and authorization registration module 2829 that is configured to perform authentication processes to determine whether an application module 2810 satisfies one or more defined authentication criteria and, when properly authenticated, to authorize registration of that application module 2810 with the application management proxy node 2840. Conversely, registration is prevented when an application module 2810 is not properly authenticated. Accordingly, the authorization registration module 2829 can control which application modules 2810 are allowed to be communicatively interconnected with other application modules 2810.

The application agent 2826 may authenticate the application module 2810 in response to an application name and password (which may be supplied when an application is downloaded/installed), a mobile identifier for the node 2800, user account authentication information (e.g., social network user ID and password), OpenID information, etc.). Authentication may alternatively or additional be made based on whether the application module 2810 was downloaded from known on-line application stores and/or other information that identifies the application module 2810, a source of the application module 2810, and/or a user who has access to the application module 2810.

The application management proxy node 2840 manages interconnections between application modules 2810 on a plurality of resource nodes 2800 that are communicatively connected through the network 2830. The application management proxy node 2840 may include a protocol translation module 2842 and/or an identity mapping module 2844.

Figure 38:
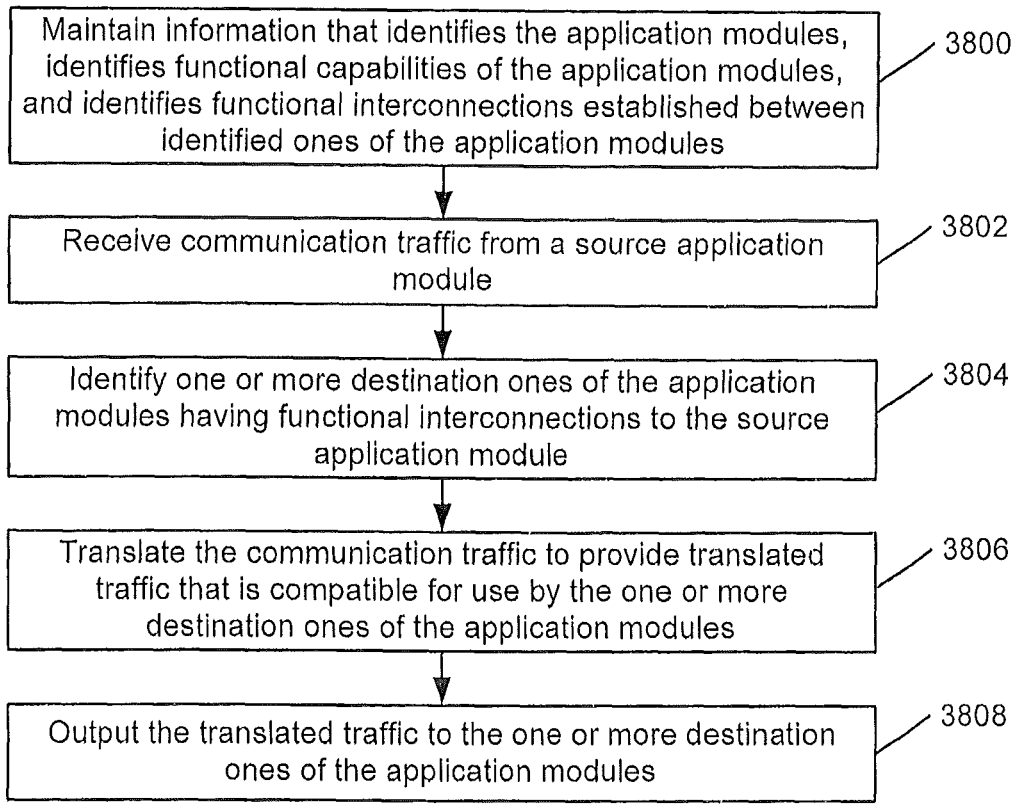
Figure 39:
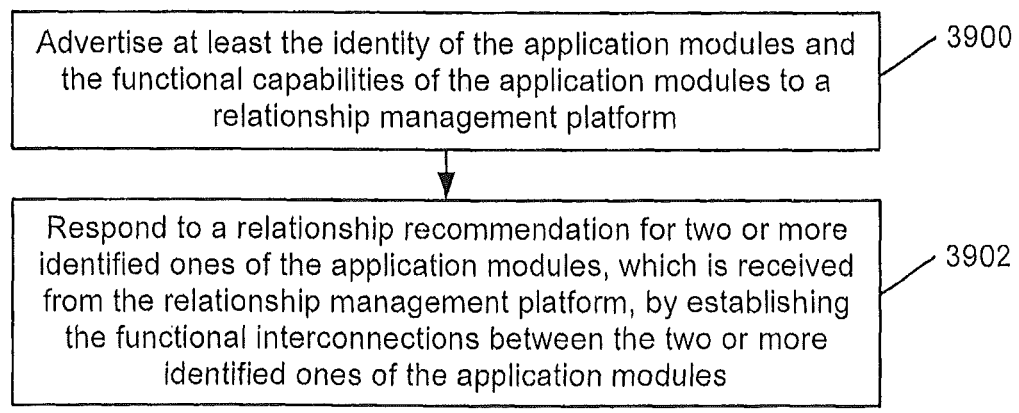
Figure 40:
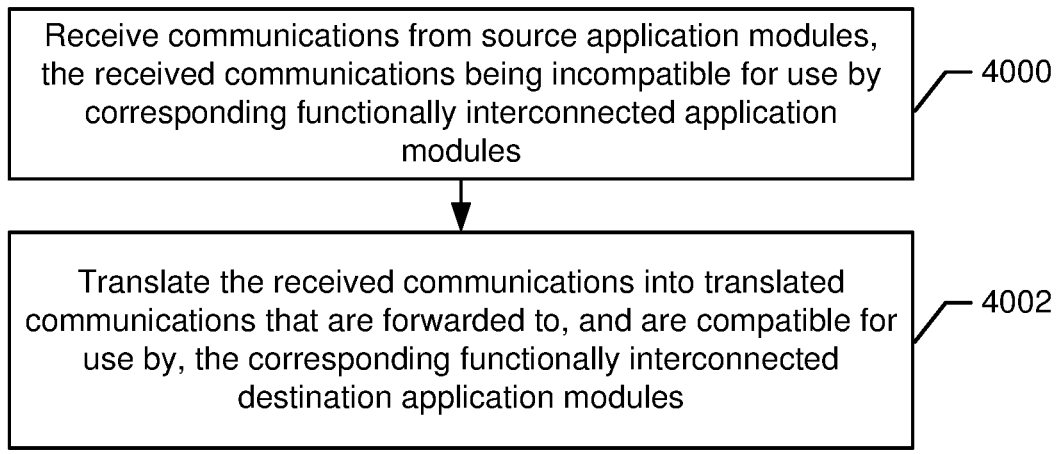

Referring to FIG. 29 and the operations and methods of FIG. 38, the identity mapping module 2844 can maintain (block 3800) information that identifies the application modules 2810, identifies functional capabilities of the application modules 2810, and identifies functional interconnections established between identified ones of the application modules 2810. The protocol translation module 2842 is configured to receive (block 3802) communication traffic from a source one of the application modules 2810. The protocol translation module 2842 identifies (block 3804), using the information maintained by the identity mapping module 2844, one or more destination application modules 2810 having functional interconnections to the source application module. The protocol translation module 2842 translates (block 3806) the communication traffic to provide translated traffic that is compatible for use by the one or more destination application modules 2810, and outputs (block 3808) the translated traffic to the one or more destination application modules 2810.

In some embodiments, the application management proxy node 2840 can establish functional interconnections between application modules 2810 responsive to relationship recommendations from a relationship management platform 2850. The identity mapping module 2844 can be configured, according to the operations and methods of the flowchart of FIG. 39, to advertise (block 3900) at least the identity of the application modules 2810 and the functional capabilities of the application modules 2810 to the relationship management platform 2850. The identity mapping module 2844 can respond (block 3902) to a relationship recommendation for two or more identified ones of the application modules 2810, which is received from the relationship management platform 2850, by establishing the functional interconnections between the two or more identified ones of the application modules 2810.

The relationship management platform 2850 can be configured to operate as described above for the resource management node 1300 of FIG. 13, the relation management function 22 of FIG. 1, the application server 46 of FIG. 6, and/or other embodiments disclosed herein that can apply social mapping principles to identify desirable or other possible (e.g., functionally compatible) interconnections that can be made between application modules 2810 on the resource nodes 2800. The relationship management platform 2850 may generate recommendations for data flows (functional interconnections) that can be setup between certain application modules 2810 and which can be accepted or declined by users according to social mapping principles disclosed herein to provide, for example, a Social Web of Things (SWOT) that comprises the application modules 2810.

The protocol translation module 2842 can be configured to translate communications to provide compatible communications between application modules 2810 to enable them to be functionally interconnected to provide enhanced combined functionality. Referring to the operations and methods of the flowchart of FIG. 40, the protocol translation module 2842 is further configured to receive (block 4000) communications from source ones of the application modules 2810, where the received communications are incompatible for direct use by corresponding functionally interconnected destination ones of the application modules 2810. The protocol translation module 2842 can translate (block 4002) the received communications into translated communications that are forwarded to, and are compatible for use by, the corresponding functionally interconnected destination application modules 2810.

As explained above, the application modules 2810 may be functionally interconnected to provide a data packet from an output interface of an application module to an input interface of another application module. One-to-one mapping between output and input interfaces of application modules is not required. In some embodiments, a data packet from the output interface of one application module can be converted by the protocol translation module 2842 into a plurality of data packets that are provided to the input interfaces of a plurality of application modules.

Figure 41:
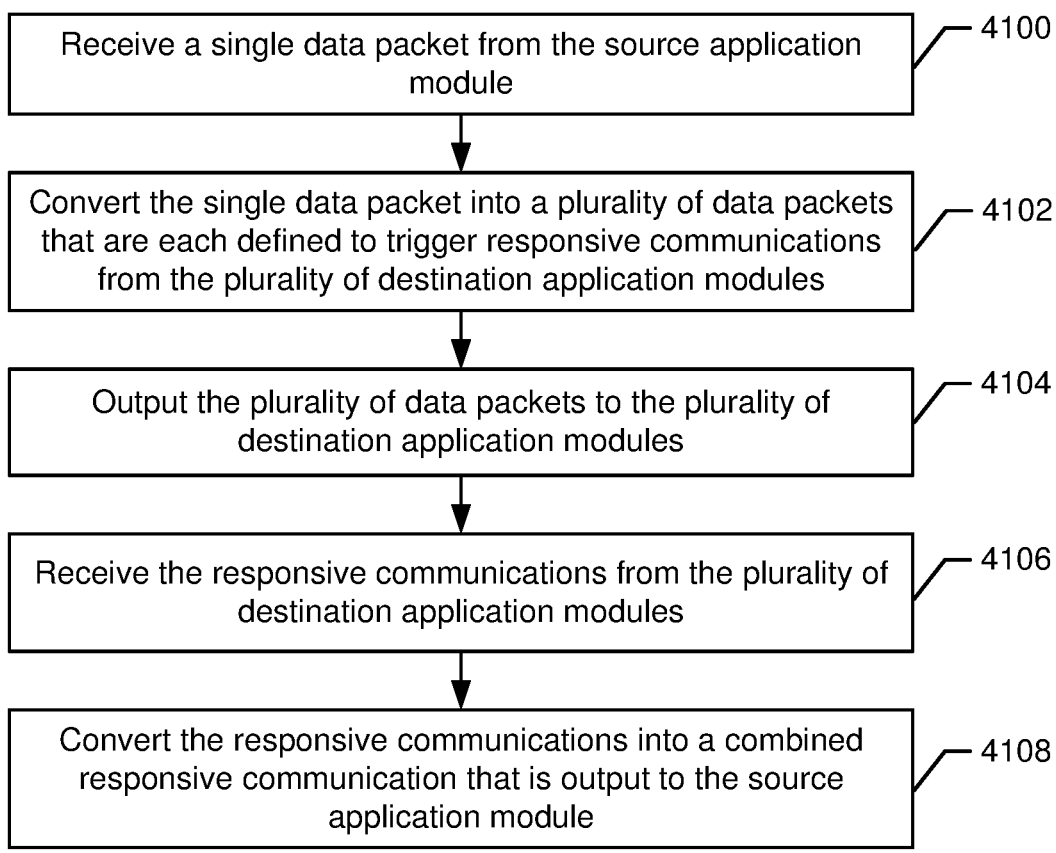
Figure 42:
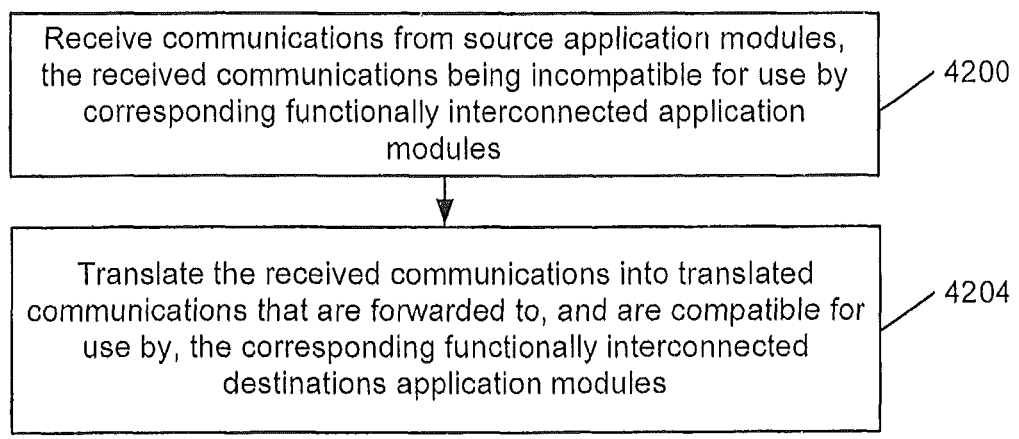

Accordingly, referring to the operations and methods of the flowchart of FIG. 41, for a source application module 2810 that is functionally interconnected to a plurality of destination application modules 2810, the protocol translation module 2842 can be further configured to receive (block 4100) a single data packet from the source application module 2810, to convert (block 4102) the single data packet into a plurality of data packets that are each defined to trigger responsive communications from the plurality of destination application modules 2810. The responsive communications may be directed back to the source application module 2810 and/or directed to another application module 2810 or resource node 2800. The protocol translation module 2842 then outputs (block 4104) the plurality of data packets to the plurality of destination application modules 2810.

Similarly, data packets from a plurality of output interfaces of application modules can be combined into a single combined data packet that is provided to the input interface of an application module. For example, to facilitate bidirectional communications between the source application module 2810 and the plurality of destination application modules 2810, the protocol translation module 2842 can be further configured to receive (block 4106) the responsive communications from the plurality of destination application modules 2810, and convert (block 4108) the responsive communications into a combined responsive communication that is output to the source application module 2810.

The application management proxy node 2840 can operate to facilitate or automate establishment of functional interconnections between the application modules 2810 by registering the identities and functional capabilities of the application modules 2810, and identifying compatible functional capabilities of the application modules 2810 that can be combined to provide enhanced combined functionality. Referring to the operations and methods of the flowchart of FIG. 42, the identity mapping module 2844 further receives (block 4200), during registration of each of the application modules 2810, and maintains parameter format information that identifies at least one input parameter format for information to be input to each corresponding destination application module, and identifies at least one output parameter format for information to be output from each corresponding source application module. The protocol translation module 2842 responds to receipt of communication traffic from an identified source application module by identifying corresponding parameter format information for the identified source application module, and translating (block 4204) the communication traffic to provide translated traffic that is compatible for use by an identified destination application module.

Figure 44:
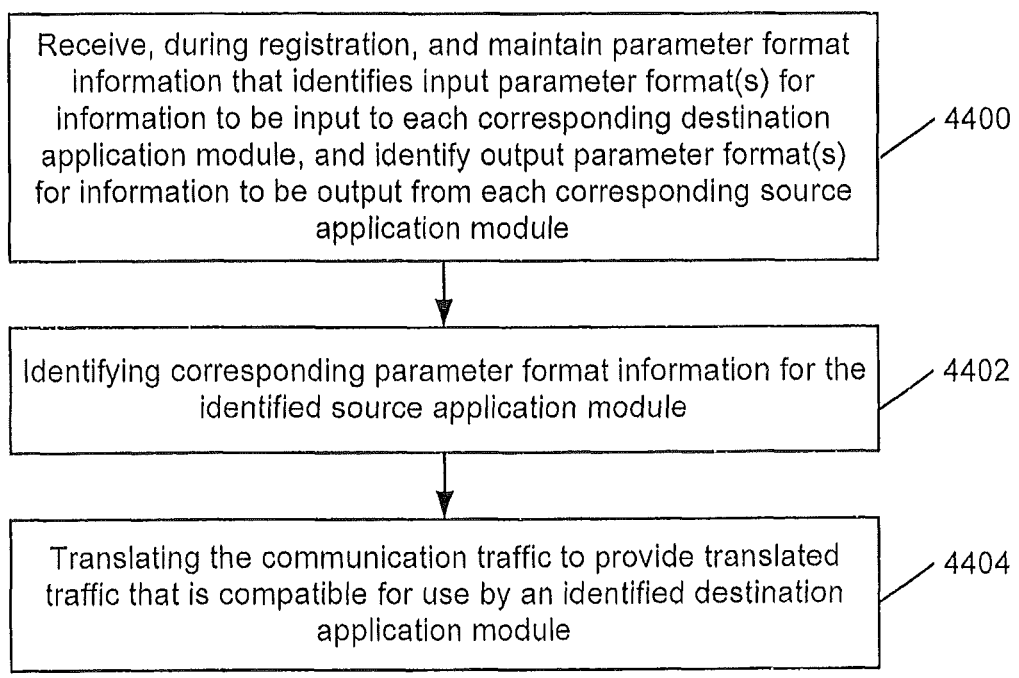

Further operations and methods that can be performed by the application management proxy node 2840 during registration of application modules 2810 are shown in the flowchart of FIG. 44. Referring to FIG. 44, the application management proxy node 2840 can receive (block 4400) and maintain parameter format information that identifies at least one input parameter format for information (e.g., a data packet) that can be input to each corresponding destination application module, and further identifies at least one output parameter format for information (e.g., a data packet) that is output from each corresponding source application module. Responsive to receiving communication traffic from an identified source application module, the application management proxy node 2840 can identify (block 4402) corresponding parameter format information for the identified source application module, and translate (block 4404) the communication traffic to provide translated traffic that is compatible for use by an identified destination application module. Accordingly, the application management proxy node 2840 can receive and maintain information that defines one or more types and/or formats of information (e.g., a data packet) that an application module 2810 is configured to receive and use to provide defined functionality, and/or that defines one or more types and/or formats of information (e.g., a data packet) that an application module 2810 is configured to output through providing the defined functionality.

By way of non-limiting example, information can be provided to the application management proxy node 2840 that defines that the travel time module 2813 can receive and use two data packets, one identifying a starting geographic location as a alphanumeric street address string, and another identifying an ending geographic location as an alphanumeric street address string. The provided information can further identify that the travel time module 2813 functions to calculate travel time, and will output the travel time as a string having a defined format that represents hours and minutes.

Example Functional Interconnection of Application Modules to Provide Enhanced Combined Functionality Further embodiments are now explained below in the context of certain types of application modules that are functionally interconnected to provide enhanced combined functionality. According to some embodiments, application modules 2810, which reside on the resource node 2800 and/or on other resource nodes, are functionally interconnected to provide combined functionality that facilitates the automatic determination of travel time to a scheduled event, and the use of the travel time to set an alert that will remind the user of the scheduled event with enough notice to allow the user to reach the destination for the scheduled event in a timely manner. Moreover, because the travel time can substantially vary due to traffic conditions, flight delays, the user being at a different starting location than the earlier used starting location, etc., further combined functionality is provided through the functionally interconnected modules that adjusts the timing for when the alert is generated responsive to the scheduled event being less than a defined threshold time away. Thus, for example, the user can be warned earlier when the present travel time has increased so that the user can reach the defined destination at the scheduled event time. Similarly, when the starting location has changed because the user has moved further away from the defined destination of the scheduled event, the user can be provided an earlier warning of the scheduled event to allow the user the additionally needed travel time.

Figure 37:
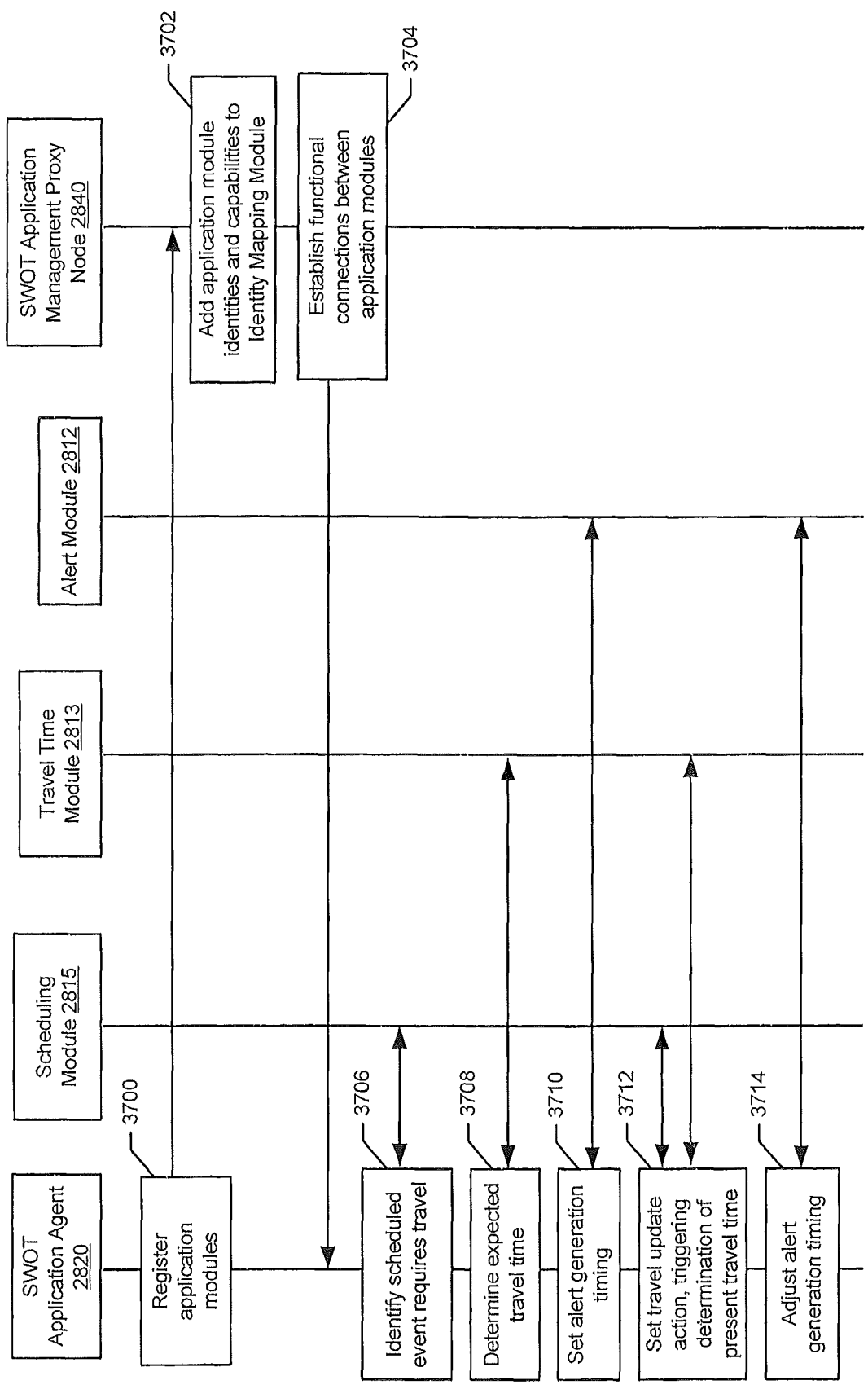

FIG. 37 illustrates operations and methods that are carried out by various identified elements of the architecture of FIG. 29 according to some embodiments. Referring to FIG. 37, the application agent 2820 registers (block 3700) each of the application modules 2810 with the application management proxy node 2840. In the present example, the positioning module 2811, the alert module 2812, the travel time module 2813, and the scheduling module 2815 are each registered, and may be separately registered responsive to win each application module was installed on the resource node 2800.

As part of the registration, the application agent 2820 communicates information identifying identities and functional capabilities of the positioning module 2811, the alert module 2812, the travel time module 2813, and the scheduling module 2815. The application management proxy node 2840 adds (block 3702) the application module identities and capabilities to a database maintained by the identity mapping module 2844. Functional connections are established (block 3704) between the application modules 2810. More particularly, a functional connection is established to communicate information from an output of the scheduling module 2815 to an input of the travel time module 2813, and a functional connection is established from an output of the travel time module 2813 to an input of the alert module 2812. The established functional connections can be communicated back to the application agent 2820 (e.g., for use by the application mapping module 2828) to carry out routing of communication traffic to provide the established functional connections.

The application agent 2820 operates, via the scheduling agent 2825, to identify (block 3706) that an event which is scheduled with the scheduling module 2815 will require travel to a defined destination. The application agent 2820 further operates, via the travel time agent 2823, to communicate the defined destination and a starting location to the travel time module 2813 to determine (block 3708) the expected travel time. The starting location may be determined by the positioning agent 2821 causing the positioning module 2811 to determine a present location of the resource node 2800 using, for example, GPS positioning. The application agent 2820 receives the expected travel time from the travel time module 2813, and determines how far in advance of the scheduled event a user should be reminded to begin/continue traveling to the event. The application agent 2820 communicates, via the alert agent 2822, with the alert module 2812 to set (block 3710) the timing for an alert to be generated by the alert module 2812.

Because the actual travel time will depend upon traffic and other factors that may not be predictable far in advance of the scheduled event, the application agent 2820 may also set (block 3712) a travel update action which will trigger determination of a present travel time from a defined starting location (which may correspond to a present location of the resource node 2800 and which may be different than the earlier starting location used to determine the expected travel time) to the defined destination. The travel update action may be triggered by less than a threshold time remaining before the scheduled event, and may cause a present location of the resource node 2800 to be determined and communicated with the defined destination to the travel time module 2813. The travel time module 2813 can respond by determining the present travel time, where the determination may be made responsive to presently known traffic conditions along the travel route, airport flight delays, weather along the travel route, etc. The application agent 2820, via the alert agent 2822, can use the present travel time to adjust (block 3714) the timing of the alert that will be generated by the alert module 2812.

Figure 43:
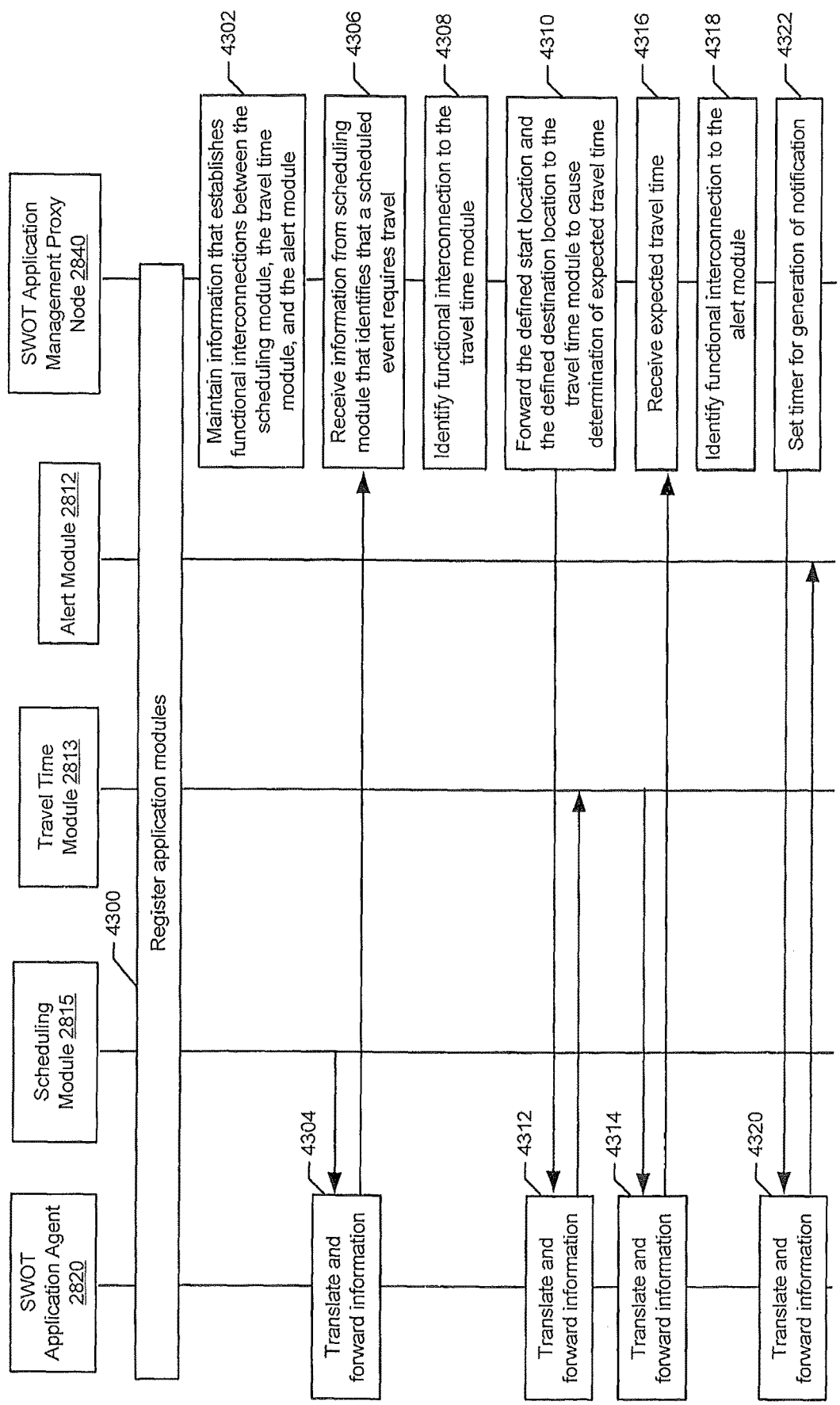

Another Example Functional Interconnection of Application Modules to Provide Enhanced Combined Functionality FIG. 43 illustrates operations and methods that can be carried out by various identified elements of the architecture of FIG. 29 according to some other embodiments. In contrast to the explanation of the similar FIG. 37, the application management proxy node 2840 is configured in FIG. 43 to perform at least some of the decision making and management of the functional interconnections between the application modules 2810 that were described for FIG. 37 as being performed by the application agent 2820.

Referring to FIG. 43, the application management proxy node 2840 maintains (block 4302) information that establishes functional interconnections between the scheduling module 2815, the travel time module 2813, and the alert module 2812, and may further establish a functional connection to the positioning module 2811. The application management proxy node 2840, e.g., via the protocol translation module 2842, responds to receipt (block 4306) of information from the scheduling module, via the scheduling agent 2825, that identifies that a scheduled event requires travel from a defined start location to a defined destination location, by identifying (block 4308) the functional interconnection to the travel time module and by forwarding (block 4310) the defined start location and the defined destination location to the travel time module 2813, via the travel time agent 2823. This causes determination of an expected travel time from the defined start location to the defined destination location.

The application management proxy node 2840, e.g., via the protocol translation module 2842, responds to receipt (block 4316) of the expected travel time from the travel time module 2813, via the travel time agent 2823, by identifying (block 4318) the functional interconnection to the alert module 2812 and forwarding (block 4322) the expected travel time to the alert module, via the alert agent 2822. This causes setting of a timer for generation of a notification to a user responsive to the expected travel time.

The scheduling agent 2825, the travel time agent 2823, and the alert agent 2822 may operate to provide and manage communication interfaces between the corresponding application modules 2810 and the application management proxy node 2840. In particular, the scheduling agent 2825 may translate and forward information from the application management proxy node 2840 to the scheduling module 2815 and vice versa. Similarly, the travel time agent 2823 may translate and forward information from the application management proxy node 2840 to the travel time module 2813 and vice versa. The alert agent 2822 may translate and forward information from the application management proxy node 2840 to the alert module 2812 and vice versa.

Further Definitions and Embodiments

In the above-description of various embodiments of the present invention, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When a node is referred to as being "connected", "coupled", "responsive", or variants thereof to another node, it can be directly connected, coupled, or responsive to the other node or intervening nodes may be present. In contrast, when an node is referred to as being "directly connected", "directly coupled", "directly responsive", or variants thereof to another node, there are no intervening nodes present. Like numbers refer to like nodes throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, nodes, steps, components or functions but does not preclude the presence or addition of one or more other features, integers, nodes, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-eRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

The above-described example embodiments are intended to be illustrative in all respects, rather than restrictive, of the present invention. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items. Additionally, the term "user" is meant to be inclusive of an individual, a group and an organization.

The invention claimed is:

1. A method by an application management proxy node that manages interconnections between application modules stored on a plurality of resource nodes that are connected to at least one network, the method comprising:
    maintaining information, which is received during registration of the application modules that have been authenticated and authorized to be registered, that identifies the application modules stored on the plurality of resource nodes, and for each application module that has been authenticated and authorized to be registered: identifies functional capabilities of the application module, identifies at least one input parameter format for data to be input to the application module, and identifies at least one output parameter format for data to be output from the application module;
    advertising at least an identity of the application modules that have been authenticated registered and the functional capabilities of the application modules that have been authenticated and registered to a relationship management platform, and responding to a relationship recommendation for two or more identified ones of the application modules, which is received from the relationship management platform, by establishing functional interconnections between the two or more identified ones of the application modules;
    receiving communication traffic from a source one of the application modules;
    identifying, using the information maintained by an identity mapping module that identifies functional capabilities of the application module, one or more destination ones of the application modules;
    determining which of the one or more destination ones of the application modules that are connected to the source one of the application modules have connections that require translation of communication traffic;
    responsive to determining which of the one or more destination ones of the application modules have functional interconnections to the source one of the application modules that require translation of communication traffic, translating the communication traffic to provide translated traffic that is compatible for use by the one or more destination ones of the application modules for the application modules that have connections that require translation of communication traffic, wherein the translation of communication traffic is performed based on the information that identifies the at least one input parameter format for data to be input to respective application modules and identifies at least one output parameter format for data to be output from respective application modules; and
    communicating the translated traffic to the one or more destination ones of the application modules.

2. The method of claim 1, further comprising:
    receiving, during registration of each of the application modules that have been authenticated and authorized to be registered, and maintaining parameter format information that identifies at least one input parameter format for information to be input to each corresponding destination application module, and identifies at least one output parameter format for information to be output from each corresponding source application module; and
    responsive to receiving communication traffic from an identified source application module, identifying corresponding parameter format information for the identified source application module, and translating the communication traffic to provide translated traffic that is compatible for use by an identified destination application module.

3. A resource node comprising a processor and a memory coupled to the processor and comprising a plurality of computer readable program codes, the memory of the resource node comprising:
    a plurality of application module program codes stored in the memory of the resource node and each configured to, when executed by the processor, control the resource node to provide corresponding defined functionality, each of the plurality of application module program codes configured to be functionally interconnected by an application management proxy node to at least one of one or more of the plurality of application module program codes and remote application module program codes stored on another resource node to provide combined functionality to a user; and an application agent program code that, when executed by the processor, is configured to:

for each of the plurality of application module program codes, responsive to the application module program code being authenticated and authorized to be registered, register the application module program code stored in the memory of the resource node that has been authenticated and authorized to be registered with the application management proxy node by communicating, to the application management proxy node, information that identifies for the application module program code: the application module program code, functional capabilities of the application module program code, at least one input parameter format for data to be input to the application module program code, and at least one output parameter format for data to be output from the application module program code;

communicate with the application management proxy node to establish functional interconnections, based on the information that identifies functional capabilities of each of the plurality of application module program codes that have been authenticated and authorized to be registered, for at least one of between two or more of the plurality of application module program codes stored in the resource node and between at least one of the plurality of application module program codes stored in the resource node and at least one of the remote application module program codes stored on the other resource node to form functionally interconnected application module program codes;

determine which of the functionally interconnected application module program codes that are functionally interconnected have connections that require translation of communication traffic between one or more destination application module program codes of the functionally interconnected application module program codes and one or more source application module program codes of the functionally interconnected application module program codes; and responsive to determining which of the one or more destination application module program codes of the functionally interconnected application modules have functional interconnections to one of the one or more source application module program codes that require translation of communication traffic, translate the communication traffic to provide compatible communications between the one or more destination application module program codes that are functionality interconnected to the one of the one or more source application module program codes that have functional interconnections that require translation of communication traffic, wherein the translation of the communication traffic is performed based on the information that identifies the at least one input parameter format for data to be input to respective destination application module program codes and identifies at least one output parameter format for data to be output from respective source application module program codes.

4. The resource node of claim 3, wherein the application agent program code is further configured to:

receive communications from the one or more source application module program codes, the communications being incompatible for use by corresponding functionally interconnected destination application module program codes; and translate the communications into translated communications that are compatible for use by the corresponding functionally interconnected destination application module program codes, wherein translation of the communications is performed based on the information that identifies the at least one input parameter format for data to be input to the functionally interconnected destination application module program codes.

5. The resource node of claim 3, wherein:

for a source application module program code of the one or more source application module program codes that is functionally interconnected to a destination application module program code of the one or more destination application module program codes, the application agent program code is further configured to route communications from the source application module program code through the application management proxy node for translation into translated communications that are provided to the destination application module program code and which are compatible for use by the destination application module program code.

6. The resource node of claim 3, wherein, for a source application module program code of the one or more source application module program codes that is functionally interconnected to a plurality of destination application module program codes of the one or more destination application module program codes, the application agent program code is further configured to:

receive a single data packet from the source application module program code;

convert the single data packet into a plurality of data packets that are each defined to trigger responsive communications from the plurality of destination application module program codes, wherein converting the single data packet is performed based on the information that identifies for each one of the plurality of destination application module program codes, the at least one input parameter format for data to be input to the one of the plurality of destination application module program codes; and output the plurality of data packets to the plurality of destination application module program codes.

7. The resource node of claim 6, wherein the application agent program code is further configured to:

receive responsive communications from the plurality of destination application module program codes; and convert the responsive communications into a combined responsive communication that is output to the source application module program code, wherein converting the responsive communications is performed based on the information that identifies the at least one output parameter format for data to be output from the plurality of destination application module program codes.

8. The resource node of claim 3, wherein:

for a source application module program code of the one or more source application module program codes that is functionally interconnected to a plurality of destination application module program codes of the one or more destination application module program codes, the application agent program code is further configured to route a single data packet from the source application module program code through the application management proxy node for conversion into a plurality of data packets that are each defined to trigger responsive communications from the plurality of destination application module program codes.

9. The resource node of claim 3, wherein:
the application agent program code is further configured to respond to installation of a new application module program code on the resource node by registering the new application module program code with the application management proxy node.

10. The resource node of claim 3, wherein:
the application agent program code is configured to communicate with the application management proxy node to establish functional interconnections between a scheduling module program code, a travel time module program code, and an alert module program code based on the information that identifies functional capabilities of the plurality of application module program codes;
the application agent program code is configured through the scheduling module program code to identify that a scheduled event requires travel to a defined destination location;
the application agent program code is configured through the travel time module program code to determine an expected travel time from a defined start location to the defined destination location; and
the application agent program code is configured through the alert module program code to set timing for generation of a notification to a user responsive to the expected travel time.

11. The resource node of claim 10, wherein:
the application agent program code is further configured through the schedule module program code to set a travel update action to occur a defined time before the timing for the generation of the notification, the travel update action triggering a determination by the travel time module program code of a present travel time from the defined start location to the defined destination location; and
the application agent program code is further configured through the alert module program code to adjust timing for generation of the notification to the user responsive to the present travel time.

12. The resource node of claim 3, wherein the application agent program code is configured to:
receive, from the application management proxy node, information that identifies a functional interconnection between a first application module program code of the plurality of application module program codes and a second application module program code of the plurality of application module program codes;
determine an occurrence of a triggering event corresponding to the functional interconnection; and
initiate communications between the first application module program code and the second application module program code based on the determining of the occurrence of the triggering event.

13. The resource node of claim 12, wherein the application agent program code is configured to define the triggering event based on information received by at least one of the first application module program code and the second application module program code.

14. An application management proxy node that manages communications between application modules on a plurality of resource nodes that are connected to at least one network, the application management proxy node comprising a processor and a memory coupled to the processor and comprising a plurality of computer readable program codes, the memory comprising:
an identity mapping module program code that, when executed by the processor, is configured to:
maintain information that identifies the application modules that have been authenticated and registered, and for each application module of the application modules that has been authenticated and registered: identifies functional capabilities of the application module, identifies at least one input parameter format for data to be input to the application module, and identifies at least one output parameter format for data to be output from the application module; and
advertise at least an identity of the application modules that have been authenticated and registered and the functional capabilities of the application modules that have been authenticated and registered to a relationship management platform, and to respond to a relationship recommendation for two or more identified ones of the application modules, which is received from the relationship management platform, by establishing functional interconnections between the two or more identified ones of the application modules;
a protocol translation module program code that, when executed by the processor, is configured to:
receive communication traffic from a source application module of the application modules;
identify, using the information maintained by the identity mapping module program code that identifies functional capabilities of the source application module, one or more destination ones of the application modules having functional interconnections to the source application module;
determine which of the one or more destination ones of the application modules have functional interconnections to the source application module that require translation of communication traffic;
responsive to determining which of the one or more destination ones of the application modules have functional interconnections to the source application module that require translation of communication traffic, translate the communication traffic to provide translated traffic that is compatible for use by the one or more destination ones of the application modules that have functional interconnections that require translation of the communication traffic, wherein the translation of communication traffic is performed based on the information that identifies the at least one input parameter format for data to be input to respective application modules and identifies at least one output parameter format for data to be output from respective application modules; and
output the translated traffic to the one or more destination ones of the application modules.

15. The application management proxy node of claim 14, wherein the source application module comprises a plurality of source application modules and the protocol translation module program code is further configured to:
receive communications from ones of the plurality of source application modules, the communications being incompatible for use by corresponding functionally interconnected destination ones of the application modules; and translate the communications into translated communications that are forwarded to, and are compatible for use by, the corresponding functionally interconnected destination ones of the application modules, wherein the translation of the communications is performed based on the information that identifies the at least one input parameter format for data to be input to the functionally interconnected destination ones of the application modules.

16. The application management proxy node of claim 14, wherein, for a source application module that is functionally interconnected to a plurality of destination application modules, the protocol translation module program code is further configured to:
receive a single data packet from the source application module;
convert the single data packet into a plurality of data packets that are each defined to trigger responsive communications from the plurality of destination application modules, wherein converting the single data packet is performed based on the information that identifies for each one of the plurality of destination application modules, the at least one input parameter format for data to be input to the one of the plurality of destination application modules; and
output the plurality of data packets to the plurality of destination application modules.

17. The application management proxy node of claim 16, wherein the protocol translation module program code is further configured to:
receive responsive communications from the plurality of destination application modules; and
convert the responsive communications into a combined responsive communication that is output to the source application module, wherein converting the responsive communications is performed based on the information that identifies the at least one output parameter format for data to be output from the plurality of destination application modules.

18. The application management proxy node of claim 14, wherein:

the identity mapping module program code further receives, during registration of each of the application modules that have been authenticated and authorized to be registered, and maintains parameter format information that identifies at least one input parameter format for information to be input to each corresponding destination application module, and identifies at least one output parameter format for information to be output from each corresponding source application module; and
the protocol translation module program code responds to receipt of communication traffic from an identified source application module by identifying corresponding parameter format information for the identified source application module, and translating the communication traffic to provide translated traffic that is compatible for use by an identified destination application module.

19. The application management proxy node of claim 14, wherein:
the identity mapping module program code maintains information that establishes functional interconnections between a scheduling module, a travel time module, and an alert module;
the protocol translation module program code responds to receipt of information from the scheduling module that identifies that a scheduled event requires travel from a defined start location to a defined destination location, by identifying the functional interconnection to the travel time module and by forwarding the defined start location and the defined destination location to the travel time module to cause determination of an expected travel time from the defined start location to the defined destination location; and
the protocol translation module program code responds to receipt of the expected travel time from the travel time module, by identifying the functional interconnection to the alert module and forwarding the expected travel time to the alert module to cause setting of a timer for generation of a notification to a user responsive to the expected travel time.

* * * * *